(12) United States Patent
Mladin et al.

(10) Patent No.: US 10,644,940 B2
(45) Date of Patent: May 5, 2020

(54) M2M CLUSTERING MANAGEMENT

(71) Applicant: Convida Wireless, LLC, Wilmington, DE (US)

(72) Inventors: Catalina M. Mladin, Hatboro, PA (US); Guang Lu, Thornhill (CA); Chonggang Wang, Princeton, NJ (US); Dale N. Seed, Allentown, PA (US); Hongkun Li, Malvern, PA (US); Xu Li, Plainsboro, NJ (US); Lijun Dong, San Diego, CA (US); Qing Li, Princeton Junction, NJ (US); William Robert Flynn, IV, Schwenksville, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/741,533

(22) PCT Filed: Jul. 8, 2016

(86) PCT No.: PCT/US2016/041446
§ 371 (c)(1),
(2) Date: Jan. 3, 2018

(87) PCT Pub. No.: WO2017/007990
PCT Pub. Date: Jan. 12, 2017

(65) Prior Publication Data
US 2018/0198680 A1     Jul. 12, 2018

Related U.S. Application Data

(60) Provisional application No. 62/189,814, filed on Jul. 8, 2015.

(51) Int. Cl.
*H04W 84/18* (2009.01)
*H04W 84/04* (2009.01)
(Continued)

(52) U.S. Cl.
CPC .......... *H04L 41/0816* (2013.01); *H04L 41/12* (2013.01); *H04W 4/70* (2018.02);
(Continued)

(58) Field of Classification Search
CPC ....... H04B 7/024; H04B 7/0413; H04W 4/08; H04W 4/18; H04W 4/38; H04W 48/08;
(Continued)

(56) References Cited

U.S. PATENT DOCUMENTS 7,035,240 B1 * 4/2006 Balakrishnan ........ H04W 84/18
370/338
2010/0090823 A1 * 4/2010 Park ........................ H04W 4/38
340/539.1

(Continued)

FOREIGN PATENT DOCUMENTS

EP         2552168 A1      1/2013
WO    2005/036666 A2      4/2005

OTHER PUBLICATIONS

Abbasi, et al., "A Survey on Clustering algorithms for Wireless Sensor Networks", Computer Communications 30, Jun. 2007, 16 pages.

(Continued)

*Primary Examiner* — Harun Chowdhury
(74) *Attorney, Agent, or Firm* — BakerHostetler

(57) ABSTRACT

Methods, systems, and apparatuses associated with the service layer may provide clustering management capabilities for sensor nodes in M2M/IoT SL platforms, via conventional clustering algorithm reselection and performance optimization, which may be based on service layer analytics. Clustering functionality may be adapted not only within the individual network model and optimization goals employed by each conventional clustering algorithm, but the conventional clustering algorithms themselves may be changed or (Continued)

reconfigured using service layer functionality. These reconfigurations may be based on analytics indicating that performance of a sensor node is sub-optimal and may occur within a significantly larger time scale when compared to dynamic routing decisions on a per-message basis.

15 Claims, 30 Drawing Sheets

(51) Int. Cl.
    *H04L 12/24*     (2006.01)
    *H04W 4/70*     (2018.01)
    *H04W 24/02*     (2009.01)

(52) U.S. Cl.
    CPC ........... *H04W 24/02* (2013.01); *H04W 84/18* (2013.01); *H04W 84/04* (2013.01)

(58) Field of Classification Search
    CPC ....... H04W 84/18; H04W 4/70; H04W 24/02; H04W 84/04; H04L 41/0816
    USPC ................. 370/252, 254, 337, 338, 328, 331
    See application file for complete search history.

(56) References Cited

U.S. PATENT DOCUMENTS

2013/0016625 A1    1/2013    Murias et al.
2017/0170881 A1*  6/2017    Chae ...................... H04B 7/024

OTHER PUBLICATIONS

Akyildiz et al., "A Cross-Layer Protocol for Wireless Sensor Networks" Computer Science and Engineering, Department of CSE Conference and Workshop Papers, University of Nebraska—Lincoln, 2006, 7 pages.
Alkhatib et al., "Wireless Sensor Network Architecture" 2012 International Conference on Computer Networks and Communications Systems (CNCS 2012) IPCSIT vol. 35 (2012) © (2012) IACSIT Press, Singapore, 2012, 5 pages.
Ersue, et al., "Management of Networks with Constrained Devices: Problem Statement and Requirements, draft-ersue-opsawg-coman-probstate-regs-00" Internet Engineering Task Force, Oct. 25, 2013, 56 pages.
ETSI TS 102690 V 1.1.1 "Machine-to-Machine Communications (M2M); Functional Architecture", Oct. 2011, 280 pages.
Heinzelman, et al., "Energy-Efficient Communication Protocol for Wireless Microsensor Networks" Proceedings of the 33rd Hawaii International Conference on System Sciences—2000, 2000, 10 pages.
Hemappa, et al., "An Energy Efficient Remote Data Collection and Reprogramming of Wireless Sensors Networks" International Journal of Computer Trends and Technology vol. 3 Issue 3, 2012, 7 pages.
Liu, "A Survey on Clustering Routing Protocols in Wireless Sensor Networks", Sensors ISSN 1424-8220, Aug. 9, 2012, 41 pages.
Manjeshwar et al., "Apteen: A Hybrid Protocol for Efficient Routing and Comprehensive Information Retrieval in Wireless Sensor Networks", Proceedings of the International Parallel and Distributed Processing Symposium, IPDPS 2002, Apr. 15-19, 2002, 8 pages.
Marin-Perianu et al., "Cluster-based Service Discovery for Heterogeneous Wireless Sensor Networks" International Journal of Parallel, Emergent and Distributed Systems, 2008, 35 pages.
OMA Open Mobile Alliance "Lightweight Machine to Machine Technical Specification" Approved Version 1.0, Feb. 8, 2017, 138 pages.
OneM2M Technical Specification TS-0007 V0.3.0, "Service Component Architecture", Jun. 17, 2014, 105 pages.
Singh, et al., "The Comparative Study of Hierarchical or Cluster Based Routing Protocol for Wireless Sensor Network" International Journal of Engineering Research & Technology (IJERT) vol. 2 Issue 6, Jun. 2013, 8 pages.
Stathopoulos et al., "A Remote Code Update Mechanism for Wireless Sensor Networks" CENS Technical Report #30, Center for Embedded Networked Sensing, UCLA, Department of Computer Science, Los Angeles, CA 2003, 16 pages.
Yamabe, et al., "A Study on Contruction Method for Autonomous Decentralized Wireless Sensor Network" The institute of Electronics, Information and Communication Engineers, Jan. 2008, 5 pages.
Zhang et al., "The Beauty of the Commons: Optimal Load Sharing by Base Station Hopping in Wireless Sensor Networks" IEEE Journal on Selected Areas in Communications, vol. 33, No. 8, Aug. 2015, 12 pages.

* cited by examiner

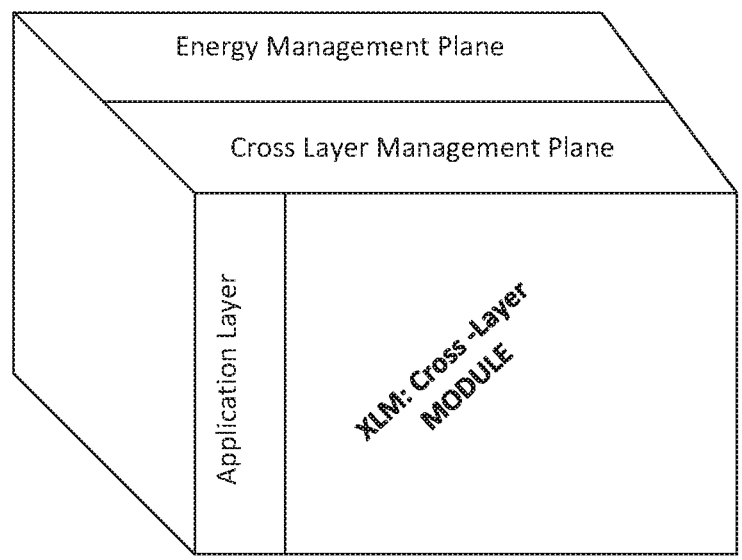
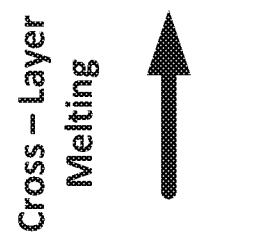
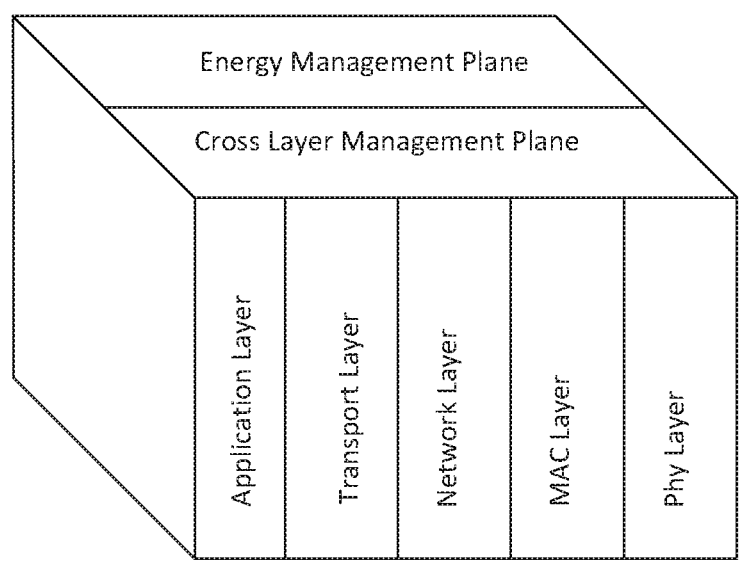
FIG. 5

M2M CLUSTERING MANAGEMENT

CROSS-REFERENCE TO RELATED APPLICATIONS

This application is a National Stage Application filed under 35 U.S.C. § 371 of International Application No. PCT/US2016/041446, filed Jul. 8, 2016, which claims the benefit of U.S. Provisional Patent Application No. 62/189,814, filed Jul. 8, 2015, entitled "M2M Clustering Management", the contents of which are hereby incorporated by reference herein.

BACKGROUND

Clustering in WSN

A wireless sensor network (WSN) is composed of a large number of spatially distributed usually low-cost, low-power sensors collaborating to accomplish a common task and capable of short-range wireless communications over an area of deployment. Compared to traditional communication systems, WSNs may be characterized by the following: high deployment density (several orders of magnitude higher than mobile ad hoc network—MANET); low-power nodes (usually powered by battery, may be deployed in a harsh or hostile environments); no global identification (due to the large number of sensor nodes); relatively severe energy constraints, severe computation constraints, and severe storage constraints; and requiring topology changes, etc. See generally J. Zheng, A. Jamalipour, "Wireless Sensor Networks: A Networking Perspective", John Wiley & Sons, 2009 (hereinafter Zheng), which is incorporated by reference in its entirety.

FIG. 1 illustrates an exemplary sensor network architecture 100. Sensors 101 (e.g., nodes) cooperate in order to transmit the sensed data via gateways and to make it available to wider networks such as the Internet 103, via one or more sinks 102 or base stations (BSs). The capability constraints of the sensor nodes (limited memory, processing power, energy supply, and bandwidth) combined with the typical deployments consisting of large numbers of nodes, pose many challenges to the design and management of such networks such as scalability and energy consumption. Solutions targeting this specific application have been developed to include energy awareness at different layers of the protocol stack and to affect some WSN aspects such as routing and topology.

Some WSN specific optimizations have departed from the use of Internet protocol (IP), considering that assignments and updates based on a global addressing scheme impose heavy overheads for large-scale WSN with dynamic and unpredictable topology changes, especially in a mobile environment. Optimizations also take in consideration the high probability of data redundancy, while providing mechanisms for timely delivery in time-constrained applications of WSNs. An additional consideration is that in many WSNs the communication burden may be heavily directional, from multiple sources to one particular sink, rather than multicast or peer to peer, while still requiring bi-directionality.

Non-IP WSNs deployments may employ flat or hierarchical topologies. Flat topologies are characterized by all nodes having similar properties and functions, and performing similar tasks at the network level. In this case all sensor nodes are peers. Without a global addressing scheme data gathering is usually accomplished through queries to all nodes via flooding.

FIG. 2A and FIG. 2B illustrate flat and cluster-based hierarchical WSN topologies. In the latter, topologies nodes perform different networking tasks and are typically grouped in clusters according to specific requirements or metrics. In cluster-based topologies the communications are encapsulated within the group and are addressed to a cluster head (CH).

Nodes with lower energy levels or more constrained resources may perform sensing tasks, with the resulting data being routed via CHs 105 and collected at a sink or base station (BS) 106. BSs 106 act as a gateway within the WSN and typically communicate with M2M servers. Within a cluster, BS 106 role is primarily a communication role, however BS 106 might be itself CH 105 (communicating directly with end nodes), may communicate only with CHs 105 (becoming a data sink) or both. In the cluster group belonging to a CH 105 some nodes may be CHs 105 coordinating other sub-clusters. FIG. 3 illustrates another exemplary cluster that includes elements such as CH, BS, and nodes (e.g., sensors, etc.).

Clusters may help support for data aggregation or fusion, scalability, load reduction, or energy savings. The cluster-based protocols take advantage of these unique characteristics to provide significant advantages over flat strategies. Many applications of WSNs such as environmental and natural phenomena monitoring, security control and traffic flow estimation, monitoring and tracking for military applications, rely on clustering techniques to increase network scalability and extend their lifetime.

Clustering Algorithms in WSN

Conventional clustering algorithms described in the reference literature are designed for cluster-based topology management to determine and optimize CH selection and at the same time to determine and optimize routing. A cluster protocol, as discussed herein, may be a particular implementation of a clustering algorithm. They have been designed specifically for the scalability and efficient communication within WSNs, and may involve one or multiple hop communication. Clustering may affect routing (e.g., when higher energy nodes are used for routing while the low energy nodes are used for sensing). Cluster based routing advantages may include higher scalability, employment of data aggregation/fusion, lower loads, and lower energy consumption.

There is extensive research work and literature addressing clustering protocol designs and demonstrating the need for optimization of the communication protocols in WSN, and of clustering protocols in particular. A considerable number of novel schemes have been proposed, compared and surveyed. The following are references that contain multiple examples: 1) Atul Pratap Singh, Nishu Sharma; "The Comparative Study Of Hierarchical Or Cluster Based Routing Protocol For Wireless Sensor Network", International Journal of Engineering Research & Technology (IJERT), Vol. 2 Issue 6, June—2013 (hereinafter Singh); 2) Liliana M. Arboleda C. and Nidal Nasser: "Comparison of clustering algorithms and protocols for wireless sensor networks" (hereinafter Arboleda); 3) Ameer Ahmed Abbasi, Mohamed Younis, "A survey on clustering algorithms for wireless sensor networks", Computer Communications 30 (2007) 2826-2841 (hereinafter Abbasi); and 4) Xuxun Liu, "A Survey on Clustering Routing Protocols in Wireless Sensor Networks", Sensors 2012 (hereinafter Liu). The examples are incorporated by reference in their entirety.

The variety reflects a wide range of approaches as well as considerable variations in the problems proposed and the framework for analysis and modeling. Each clustering algorithm optimizes based on a specific context created by the network models, by the clustering process attributes and with specific optimization objectives.

Network models considered when selecting a clustering algorithm reflect characteristics of the given network and its individual nodes. For example, considerations may include the following:

Node capabilities (at various levels: BS, CH, end-nodes)
  Mobility: stationary/mobile/re-locatable (which may be different by level BS/CH/sensor)
  Resources (e.g., computational, memory, etc.): constrained or rich
  Role: relaying/sink/data aggregation/sensing, etc.
  Diversity: homogeneous vs. heterogeneous (for whole network or at CH level only)
Clustering attributes:
  Cluster count: preset/variable
  Cluster size: preset/variable
  Topology: fixed/adaptive
  CH to BS connectivity: provisioned/assumed
  Routing capabilities: singe or multi-hop.
  Re-clustering methodology: periodic/event based/etc.
Clustering process attributes are mainly related to procedural aspects of the algorithm such as:
  Proactivity: Proactive/Reactive/Hybrid
  Clustering methodology: Distributed/Centralized/Hybrid
  CH selection: Random/Adaptive/Deterministic
  Algorithm complexity
  Convergence time: Fixed/Variable
  Execution type: Probabilistic/Iterative
  Cluster overlap: None/Low/High It should be noted that many of the characteristics noted above are tightly coupled and as such the compartmentalization of the attributes is not meant to be static and it certainly varies in the referenced literature. For example, the adaptive, deterministic or random nature of the CH selection process is strongly related to the overall node characteristics and especially those of the CHs, as well as to the level of heterogeneity present in the given network. Similarly cluster overlap is a process attribute which may be dictated by the network model and enforced in algorithm selection.

Optimization objectives (e.g., goals) of the individual clustering algorithms may include energy efficiency, load balancing, fault tolerance, increased connectivity and reduced delay, minimal cluster count, maximal network longevity, maximal residual energy, and quality of service.

Clustering algorithm designs tout a variety of advantages over flat routing in single or multi-hop networks, as provided in Liu. Examples may include lower latencies and energy consumption, collision avoidance, data aggregation/fusion, increased robustness and network lifetime, fault-tolerance, better guarantee of connectivity, and energy-hole avoidance, among other things. These advantages add to the optimization objectives a number of qualitative improvements, which may not always be the goal behind the choice of a specific algorithm.

Herein, the use of the term "optimization objectives" refers to the features of the algorithm for which there are specific methods to determine if the network optimization objectives are achieved. For example, it has been determined that LEACH achieves the optimization objective of minimizing global energy usage in comparison to a minimum transmission routing (MTE) system for a network model of randomly positioned sensors with short communication distances, where randomization of the CH among the nodes is possible. See generally W. Heinzelman, A. Chandrakasan and H. Balakrishnan, "Energy-efficient communication protocol for wireless microsensor networks", Proceedings of the 33rd Annual Hawaii International Conference on System Sciences, 2000, no. 10, vol. 2, January 2000 (hereinafter Heinzelman), which is incorporated by reference in its entirety. In order to make this determination "optimization metrics" such as the energy dissipated, system lifetime and number of nodes alive after a certain number of iterations have been quantified and evaluated. Qualitative optimization objectives may include the ability to obtain sensed information in specific query formats, but, in the end, all such requirements provides for avenue of quantification in order to provide system improvements. The term "conventional algorithm metric," as used herein, denotes the attributes used by a conventional clustering algorithm to operate, such as the received power and a node's own energy level for LEACH.

Tables below have been compiled by experts and presented in surveys or comparison papers. The information of Tables 1-3 provide quick overviews of the characteristics, advantages, and disadvantages presented by each reviewed algorithm.

TABLE 1

Clustering Algorithms—advantages and disadvantages (See Singh)

| Protocol | Energy Efficiency | Load balancing | Delivery Delay | Advantages | Disadvantages |
|---|---|---|---|---|---|
| LEACH | Very low | Medium | Very small | Each node equally shares the load and TDMA schedule prevents CHs from unnecessary collisions. | Not applicable for large region, Energy is not considered for Cluster head selection and dynamic clustering brings extra overhead. |
| HEED | Medium | Medium | Medium | Fully distributed clustering method, Multi-hop routing, uniform CH selection, more energy conservation and long range communication. | Unbalanced energy consumption, overhead of cluster head selection in each round and CH near to the base die soon because of extra work load. |
| DWECH | Very high | Very good | Medium | Fully distributed clustering method, Consider energy | Single-hope communication, not applicable for large |

TABLE 1-continued

Clustering Algorithms—advantages and disadvantages (See Singh)

| Protocol | Energy Efficiency | Load balancing | Delivery Delay | Advantages | Disadvantages |
|---|---|---|---|---|---|
| | | | | for CH selection and clustering process of terminates in a few iterations. | region and high control message overhead. |
| TL-LEACH | Low | Bad | Small | Better energy load distribution, localized coordination and reduces the total energy consumption. | Not applicable for large regions, energy is not considered for CH selection and bad load balancing. |
| UCS | Very low | Bad | Small | More uniform energy consumption among the CHs and two-hop communication method. | It lacks universality, residual energy not consider for CH selection and still not applicable for large region. |
| EEUC | High | Medium | Medium | An unequal clustering mechanism to balance the energy consumption among CHs, multi-hop routing mechanism. | Significant overhead, extra global data aggregation and The routing scheme can result in new hot spots. |
| BCDCP | Very low | Good | Small | Ensures similar power dissipation of CHs control by BS. Allows sensor nodes to open communication interfaces | Worse scalability and robust to large networks, more design complexity and more energy consumption. Single hop routing and not suitable for reactive network |
| PEGASIS | Low | Medium | Very large | It reduces the overhead of dynamic cluster formation, decreases data transmission volume through the chain of data aggregation and The energy load is dispersed uniformly | Unsuitable for networks with a time varying topology, not suitable for large network, large delay and difficult to maintenance database. |
| TEEN | Very high | Good | Small | Two thresholds reduces the energy transmission consumption and suitable for reactive scenes and time critical applications. | Not suitable for periodic reports application, the BS may not be able to distinguish dead nodes from alive ones and data may be lost. |
| APTEEN | Medium | Medium | Small | Suitable for both proactive and reactive application and flexibility by setting the count-time interval for control the energy consumption. | High overhead complexity for design and implementation of cluster construction in multiple levels. |
| CCS | Low | Very bad | Large | Multi-hop routing, a considerable amount of energy is also conserved during data transmission. | Node distribution in each level is unbalanced, Residual energy is not considered for CH election, long chain would cause large delay |

TABLE 2

Clustering Algorithms—differentiation criteria (See Arboleda)

| | Network Type | | Sensors Mobility | | Sensors Type | | Clustering Process | | Cluster Head Election | | | Clustering Formation | | |
|---|---|---|---|---|---|---|---|---|---|---|---|---|---|---|
| | Pro-active | Re-active | Stationary | Mobile | Homo-geneous | Hetero-geneous | Static | Dynamic | Fixed | Random | Attribute Based | Centra-lized | Distri-buted | Fixed |
| DCATT | | X | X | | | X | | Partially | X | | | Partially | | |
| LEACH | X | | X | Partially | X | | | X | | X | | | X | |
| LEACH-C | X | | X | Partially | X | | | X | | X | | X | | |
| LEACH-F | X | | X | | X | | | X | | X | | X | | X |
| TEEN | | X | X | Partially | X | | | X | | | X | | X | |
| APTEEN | | X | X | Partially | X | | | X | | | X | | X | |
| HEED | X | | Partially | Partially | X | | | X | | | X | | X | |
| EECS | X | | X | | X | | | X | | | X | | X | |
| Sensor Aggregation | X | | X | | X | | | X | | | X | | X | |
| ACE | X | | X | | X | | | X | | | X | | X | |
| CAG | | X | X | | X | | | X | | | X | | X | |
| Upgraded CAG | | X | X | | X | | | X | | | X | | X | |
| EEDC | X | | X | | X | | | X | | | X | X | | |
| TASC | X | | X | | X | | | X | | | X | | X | |

TABLE 3

Clustering Algorithms—differentiation in applicability (See Abbasi)

| Clustering approaches | Convergence time | Node mobility | Cluster overlapping | Location awareness | Energy efficient | Failure recovery | Balanced clustering | Cluster stability |
|---|---|---|---|---|---|---|---|---|
| LCA | Variable O(n) | Possible | No | Required | No | Yes | OK | Moderate |
| Adaptive clustering | Variable O(n) | Yes | No | Required | N/A | Yes | OK | Low |
| CLUBS | Variable O(n) | Possible | High | Not required | N/A | Yes | OK | Moderate |
| Hierarchical control clustering | Variable O(n) | Possible | Low | Not required | N/A | Yes | Good | Moderate |
| RCC | Variable O(n) | Yes | No | Required | N/A | Yes | Good | Moderate |
| GS3 | Variable O(n) | Possible | Low | Required | N/A | Yes | Good | Moderate |
| EEHC | Variable O(k1 + k2 + . . . + kh) | No | No | Required | Yes | N/A | OK | N/A |
| LEACH | Constant O(1) | Fixed BS | No | Not required | No | Yes | OK | Moderate |
| FLOC | Constant O(1) | Possible | No | Not required | N/A | Yes | Good | High |
| ACE | Constant O(d) | Possible | Very Low | Not required | N/A | Yes | Good | High |
| HEED | Constant O(1) | Stationary | No | Not required | Yes | N/A | Good | High |
| Extended HEED | Constant O(1) | Stationary | No | Not required | Yes | N/A | Very good | High |
| DWEHC | Constant O(1) | Stationary | No | Required | Yes | N/A | Very good | High |
| MOCA | Constant O(1) | Stationary | Yes | Not required | Yes | N/A | Good | High |
| Attribute-based clustering | Constant O(1) | No | No | Required | Yes | Yes | Very good | High |

Herein the term "conventional clustering functionality" is used to encompass all the lower layer functionality which traditionally accomplishes the clustering operations (e.g., CH assignment/re-assignment, routing, or topology management).

There are different views of the WSN protocol stack. Conventionally, the most common follow the layered models in the traditional protocol stacks and comprise of Application, Transport, Network, Data Link, and Physical layers. The WSN-specificity is reflected in the delineation of vertical/functional planes focused on providing Task, Connection, and Power Management, as shown in FIG. 4.

Other WSN-specific optimizations have resulted in proposals such as the unified Cross-Layer Module XLM. See generally I. F. Akyldiz, I. F., M C. C. Vuran and O. B. Akan. "A cross layer protocol for wireless sensor networks." Proc. Conference on Information Sciences and Systems (CISS'06) (2006): 1102-1107 (hereinafter Akyldiz), which is incorporated by reference in its entirety. FIG. 5 illustrates XLM cross layer module vs. the WSN layered model. The XLM cross layer module is designed to optimize overall energy expenditure in the WSN and to achieve efficient and reliable event communications. A single cross-layer module for resource-constrained sensor nodes merges the traditional protocol layer entities, while keeping the operations distributed and adaptive. The conventional clustering algorithms in this context are implemented within the XLM Cross-Layer module.

FIG. 6A-FIG. 6C are exemplary illustrations of protocol stack models and mapping of the conventional clustering functionality for TCP/IP, WSN, and WSN cross layer model. Based on the WSN protocol model of FIG. 4 the conventional clustering functionality as disclosed herein maps to the transport, network, data link and physical layers as depicted in FIG. 6B, and may be mapped to the Connection Management Plane in FIG. 4. Although the WSN Protocol model depicted is widely recognized in literature, the "Management Planes" tend to differ depending on authors and are not standardized. They are a reflection of the WSN-specific tasks which in fact drive the effort for optimizations in this domain.

FIG. 6A-FIG. 6C also depicts the parallels between the TCP/IP and the WSN protocol models. The WSN stack is used for intra-cluster communications and as such is supported by sensors, CHs, BSs, and other nodes. Usually the WSN is connected to larger networks such as the Internet as shown in FIG. 1. Nodes which are part of WSN, but at the same time provide gateway functionality (e.g., BS, CH), support dual stacks, which integrates the WSN with networks using the Internet protocol family.

The conventional clustering algorithms enumerated herein (e.g., Table 1-Table 3) and described in the reference material have a number of common attributes. A first attribute is that conventional clustering algorithms are designed for cluster-based topology management, to determine and optimize CH selection and at the same time to determine and optimize routing. The optimization portion of each algorithm provides re-clustering. Some algorithms specify cluster-based in-network data processing such as aggregation and fusion.

A second attribute is that conventional clustering algorithms are adaptive within their given optimization goal. For example, in DWEHC the CHs are chosen using metrics for expected residual energy which is considered a function of distance between nodes. Should this scheme prove to be inefficient, for example, because the energy expanded on non-communication tasks is more significant, the algorithm cannot be changed to be based on an abstract metric such as capability grade. See generally P. Ding, J. Holliday and A. Celik, "Distributed Energy Efficient Hierarchical Clustering for Wireless Sensor Networks", Proc. The IEEE International Conference on Distributed Computing in Sensor Systems 2005, Marina Del Rey, Calif., (2005), pp. 322-339 (hereinafter Ding), which is incorporated by reference in its entirety. "Capability grade" is an attribute used by algorithms such as C4SD and is based on node characteristics such as device hardware and firmware capabilities. See generally R. S. Marin-Perianu, J. Scholten, P. J. M. Havinga and P. H. Hartel, "Cluster-based service discovery for heterogeneous wireless sensor networks", International Journal of Parallel, Emergent and Distributed Systems, 2008 (hereinafter Marin-Perianu), which is incorporated by reference in its entirety.

A third attribute is that conventional clustering algorithms are designed to be implemented below the Application Layer. Some protocol designs adapted WSN present differentiated application protocol and service layers, as shown in FIG. 6B. The application protocol layer may use protocols such as HyperText Transfer Protocol (HTTP) or Constrained Application Protocol (CoAP) and may have functions such as messaging and congestion control. The Service Layer (SL) may support functions such as data collection, device management, security, etc. which are provided as services to the application layer. Other modeling methodologies (e.g. XLM cross-layer module (Akyldiz)) combine functionality from two or more layers in cross-layer designs, as shown in FIG. 6C.

A fourth attribute is that conventional clustering algorithms use information available below the Application Layer for optimization, and as such service layer (SL) information is unavailable. In order to preserve the functionality of the layered model, these conventional clustering algorithms have been designed to use information available within their own layer, which is normally the Network/Routing layer. Even in cross-layer designs the information used for clustering optimization is the one available below the Application Layer.

Service Layer in M2M Communications

The oneM2M standard (oneM2M-TS-0001 oneM2M Functional Architecture-V-1.6.1, which is incorporated by reference in its entirety) under development defines a service layer called common service entity (CSE), as illustrated in FIG. 7. Mca reference point 111 interfaces with application entity (AE) 112. Mcc reference point 113 interfaces with another CSE 115 within the same service provider domain and Mcc' reference point 116 interfaces with another CSE (not shown) in a different service provider domain 117. Mcn reference point 118 interfaces with the underlying network service entity (NSE) 119. NSE 119 provides underlying network services to the CSEs, such as device management, location services and device triggering. CSE contains multiple logical functions called "Common Service Functions (CSFs)", such as "Discovery" or "Data Management & Repository."

In M2M communications the service layer (SL) aims to enable platforms for delivery of third-party value-added services and applications by supporting secure end-to-end data/control exchange between M2M devices and customer applications and to provide capabilities for remote provisioning & activation, authentication, encryption, connectivity setup, buffering, synchronization, aggregation and device management. SL provides interfaces to the underlying networks and may enable capabilities using servers owned by service providers (SP) accessed through third-party content providers through application programming interfaces (APIs), for example.

An M2M/IoT service layer is specifically targeted towards providing value-added services for M2M/IoT type devices and applications. Standardization bodies such as ETSI M2M and oneM2M are developing M2M service layers specifically targeting sensor and device networks. Device Management (DM) is among the value-added services targeted by most SL platforms in order to provide solutions for issues such as firmware and software management, security and access control, device monitoring and logging, etc.

The oneM2M architecture is based on a Common Services Entity (CSE) which can be hosted on different types of network nodes in a network (e.g. infrastructure node, middle node, application-specific node).

Within the oneM2M RESTful architecture, (also known as resource oriented Architecture or RoA) the CSE supports the instantiation of a set of common service functions (CSFs), as shown in FIG. 8. CSF functionality is implemented via resources which are uniquely addressable entities having a representation that can be manipulated via RESTful methods such as Create, Retrieve, Update, and Delete. These resources are addressable using universal resource identifiers (URIs). A resource supports a set of attributes that store relevant information about the resource and may contain references to other resources termed child resources(s). A child resource is a resource that has a containment relationship with a parent resource and whose lifetime is limited by the resource lifetime of the parent.

oneM2M is providing specifications using a service oriented architecture (SoA) approach in addition to the RoA architecture introduced. See generally Service Component Architecture" oneM2M-TS-0007, oneM2M Service Component Architecture-V-0.6.0, which is incorporated by reference in its entirety. The SoA architectural concept is based on considering as building blocks the functionality provided by distinct software modules and known as services. Services are provided to applications via the specified interfaces which are independent of vendor, product or technology. The SoA representation of a CSE 121 in oneM2M is shown in FIG. 9.

From a deployment perspective, FIG. 10 depicts configurations supported by the oneM2M architecture. oneM2M architecture enables the application service node (ASN), application dedicated node (ADN), the middle node (MN), and the infrastructure node (IN). The ASN is a node that contains one CSE and contains at least one AE. An example of physical mapping is an ASN residing in an M2M Device. The ADN is a node that contains at least one AE and does not contain a CSE. An example of physical mapping is an ADN residing in a constrained M2M Device. An MN is a node that contains one CSE and contains zero or more AEs. An example of physical mapping for an MN is an MN residing in an M2M Gateway. The IN is a node that contains one CSE and contains zero or more AEs. An example of physical mapping for an IN is the IN residing in an M2M Service Infrastructure. There also may be a non-oneM2M node, which is a node that does not contain oneM2M Entities (neither AEs nor CSEs). Such nodes represent devices attached to the oneM2M system for interworking purposes, including management.

Reprogramming in WSN

Sensor network deployments should be designed with the ability to perform software and firmware maintenance without having to physically reach each individual node. The widespread adoption of mobile devices in recent years has led to great advances in the field of mobile device management (DM). While many DM methods address resource rich devices such as mobile phones, some protocols and methods, such as LWM2M (see Marin-Perianu), provide solutions for constrained devices. Related issues are under active evaluation in other standardization bodies. See generally M. Ersue, D. Romascanu, J. Schönwälder, "Management of Networks with Constrained Devices: Problem Statement and Requirements" IETF Draft, URL: https://datatracker.ietforg/doc/draft-ersue-opsawg-coman-probstate-reqs/, which is incorporated by reference in its entirety. The research community is also addressing such methods with specific interest in methods targeted to multi-hop code distribution systems wireless sensor networks. See generally 1) B. Hemappa, B. T. Shylaja, D. H. Manjaiah, B. Rabindranath, "An Energy Efficient Remote Data Collection and Reprogramming of Wireless sensors Networks" International Journal of Computer Trends and Technology, volume 3, Issue 3, 2012 (hereinafter Hemappa); and 2) T. Stathopoulos, J. Heidemann, D. Estrin, "A Remote Code Update Mechanism for Wireless Sensor Networks" CENS Technical Report #30, Center for Embedded Networked Sensing, UCLA, Los Angeles, Calif., USA, 2003 (hereinafter Stathopoulos). Hemappa and Stathopoullos are incorporated by reference in their entirety.

SUMMARY

Cluster-based topologies in wireless sensor networks (WSN) use groups of sensors communicating via cluster heads (CHs) to sinks or base stations (BS) and are based on conventional clustering algorithms for CH reassignment, routing, or topology management, among other things.

Conventional clustering protocols are designed to be chosen and configured based on an initial context which includes the network model and optimization objectives, usually at deployment time. Sensor networks however are usually large and long lived and as such have a dynamic context, with changing network use, purpose, topology, node configuration, etc. Conventional clustering algorithms provide for network re-organization, but they are chosen to optimize based on a specific initial configuration (optimization goal, network model, etc.) which is static. The results, as shown in the papers and examples summarized in Tables 1 through Table 3, may be considered to demonstrate that many performance gains can be fully achieved by each clustering algorithm only within specific contexts such as network models, clustering process attributes and specific optimization objectives. Once the context changes other algorithms may be better suited to meet the demands of the deployment or application.

Disclosed herein are exemplary methods, systems, and apparatuses through which the service layer (SL) may provide clustering management capabilities for WSNs in M2M/IoT SL platforms, via conventional clustering algorithm reselection and performance optimization, which may be based on SL analytics. Clustering functionality may be adapted not only within the individual network model and optimization goals employed by each conventional clustering algorithm, but the conventional clustering algorithms themselves may be changed or reconfigured using SL functionality. These re-configurations may be based on analytics indicating that a WSNs performance is sub-optimal and may occur within a significantly larger time scale when compared to dynamic routing decisions on a per-message basis.

In an example, there may be cluster profiles within a cluster profile registry (CPR) for maintaining cluster information (e.g., topology) and associating it with service oriented information. There also may be cluster management policies and specialized metrics (dedicated to clustering management and performance optimizations) as part of the cluster profiles.

In an example, there may be an enhanced cluster management function (ECMF) using the CPR in conjunction with SL-based analytics and logic to enhance conventional clustering.

In an example, there may be intra-cluster optimization methods for ECMF, which may enhance the conventional clustering algorithms for single clusters. A first method may be used to request and maintain in SL cluster relevant information via information such as cluster profiles or CPR. A second method may be used to trigger conventional clustering algorithm re-selection or optimization automatically or based on SP or other prompts. A third method may be used to adapt conventional clustering algorithm selection based on service metrics (e.g., cost, utility, service redundancy) or service characteristics (e.g. query types, parameters, etc.). A fourth method may be used to adapt conventional clustering algorithm parameters (e.g., timers or thresholds) based on the given or new optimization goals.

A fifth method may be used to provide ways to introduce new or separate clustering optimization goals for the conventional clustering algorithms, using clustering policies and metrics. For example a service provider may have high level requirements such as communication reliability together with energy efficiency, which result in competing goals. Depending on the level of sophistication of the user interface, the high level requirements may be translated into several metrics such as transmission delay, minimum and maximum data retransmissions, etc. Each combination of these metrics in turn may result in a different candidate conventional clustering algorithm. A sixth method may be used to trigger cluster reconfigurations, including new cluster formation.

In an example, there may be inter-cluster optimization methods for ECMF that enhance performance of multiple SL enabled clusters using global, SL-specific information, and additional analytics. These methods may also be used to optimize procedures for cluster transfer between BSs. These methods may be further used by clusters using integrated, cross-layer-based platforms for integration with other clusters and cluster types within the same SL.

In an example, there may be APIs based on the described methods or extensions thereof to be made available to other entities in the SL and users (e.g., devices of end users or service providers), to further enable applications on the infrastructure domain and support user interactions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 5 illustrates XLM cross layer module vs. the WSN layered model;

DETAILED DESCRIPTION OF ILLUSTRATIVE EXAMPLES

The algorithms in Table 1, Table 2, and Table 3 are conventional clustering algorithms and are described in the references cited by Zheng, Singh, Arboleda, and Abbasi. Specific examples referenced herein are LEACH, TEEN, and APTEEN, among other others. This disclosure addresses the comparison results detailed in Table 1, Table 2, and Table 3, rather than the details of each individual algorithm. Given the state of the art, this disclosure assumes that suitable reprogramming methods are available in the context of M2M Service Platforms integrating WSN. These methods may apply to the WSN resource constrained nodes, not just the CH and BS.

Device Management (DM) services provided by M2M service layer platforms methods also provide solutions for firmware/software update methods which are referred to as "reprogramming." Some high-level methods used for reprograming may be the same or similar to those used by other management functions, so in the context of firmware updates in WSN the terminology "DM" and "reprogramming" methods may be used interchangeably. However, while the update method used in a SL enabled node such as a BS might be provided by a LWM2M server, the re-programming of the resource constrained nodes, by the BS and via CH may be provided via remote code update mechanisms such as those referenced herein. See Stathopoulos. Examples of remote code update mechanisms include crossbow network programming (XNP) and multi-hop over the air programming (MOAP) as well as Deluge and CORD found in Stathopoulos.

Conventional clustering protocols are designed to be chosen and configured based on an initial context which includes the network model and optimization objectives, usually at deployment time. Sensor networks may be large and long lived and as such have a dynamic context, with changing network use or purpose, topology, node configuration, etc. Conventional clustering algorithms provide for network re-organization, but they are chosen to optimize based on a specific initial configuration (optimization goal, network model, etc.) which is static. Disclosed herein are methods, systems, and apparatuses for reselection and subsequent implementation of clustering algorithms and performance optimization, among other things.

Note: For the below use case and in general throughout this paper the terms User and User/SP are used interchangeably for any stakeholders interested to achieve improved clustering performance. Their interactions with the functions introduced are provided through specialized APIs in the Service Layer. It is assumed that any multi-user access is arbitrated within the SL and it is not in the scope of this paper.

Figure 11:
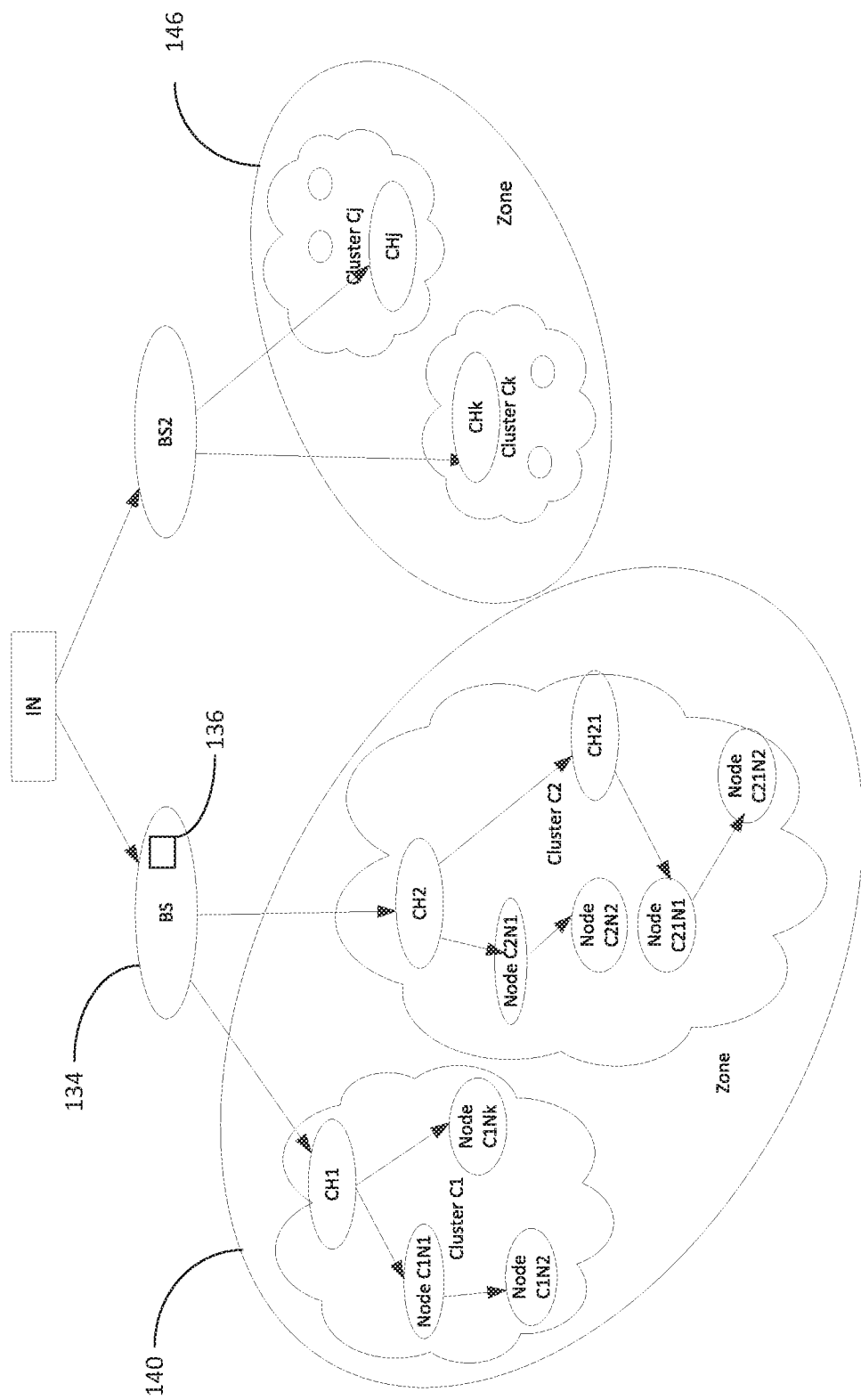
FIG. 11 illustrates an exemplary cluster-based sensor network.

Below is a scenario that gives further context with regard to the disclosed subject matter. FIG. 11 illustrates an exemplary cluster-based sensor network. Consider a scenario where the sensors around a factory compound form zone 140 in FIG. 11, with a network initially set up to respond to periodic user queries (e.g., tracking ambient temperature averages only). The system is initially configured based on what is known as a proactive approach. For example, the sensor nodes of zone 140 periodically switch on, sense the environment and send a pre-defined set of data regularly to CPR 136 of BS 134, which a device of a user may query. Based on the measurement reporting requirements resulting from the periodic query configuration the nodes are initially configured with a proactive conventional clustering protocol (e.g. LEACH), resulting in a cluster-based sensor network. For additional context, it should be understood that there is an underlying expectation for WSN to be power-efficient; otherwise everything may be on all the time.

After the initial configuration (at a time T1), it may be determined that the environmental conditions significantly affect new fabrication processes, so new operational requirements or other uses are developed in the factory for queries such as the following: 1) send alarm if temperature in a certain wing goes below a first threshold; 2) retrieve average temperature in a certain quadrant over the last three hours; 3) for the next three hours report if the temperature goes above threshold B; or 4) report areas which had a temperature between threshold A and threshold B in the past three hours.

At time T1 the original, proactive set-up based on LEACH becomes significantly less efficient because data is transmitted often (even under unchanging conditions) and critical information needs to be extracted from CPR 136 of BS 134. If a reactive approach were used at time T1, the sensors would be configured to detect abrupt changes in the value of a sensed attribute (based on a pre-set threshold), but there may be unacceptable delays for the queries concerning time critical data. A hybrid conventional clustering protocol, such as APTEEN, probably would perform better after time T1. For APTEEN, see generally A. Manjeshwar and D. P. Agrawal. "APTEEN: a hybrid protocol for efficient routing and comprehensive information retrieval in wireless sensor networks." Proceedings of the 2nd International Workshop on Parallel and Distributed Computing Issues in Wireless Networks and Mobile computing (2002): 48, (hereinafter Manjeshwar), which is incorporated by reference in its entirety. In this case, data analytics may be used to change the conventional clustering protocol. Data analytics may help determine best settings for algorithm parameters such as thresholds and timers, as well as full re-configuration of the sensor network. Normally analytics and the re-configuration are implemented as distinct functions which do not interact to provide optimizations.

In this scenario, it can be seen that conventional clustering algorithms may become sub-optimal with changes in the sensor network, application needs, or external conditions. With conventional solutions there is a lack of efficient methods for enabling cluster optimizations to use different algorithms (or parameters) than initially configured.

Continuing the scenario with reference to FIG. 11, at a later time (T2), an adjacent industrial campus has a sensor network in zone 146, which is integrated with the same SL platform used by zone 140. Zone 140 and zone 146 may contain some similar sensors (e.g., atmospheric pressure sensors). With regards to conventional clustering algorithm selections, even if the individual clusters are optimized, the information redundancy between the atmospheric pressure sensors may not be utilized to reduce unnecessary reporting. There is an opportunity for further optimization of the entire integrated network that includes zone 141 and zone 146. As discussed herein, the service layer (SL) is positioned to gather and analyze sensor network related information and to employ analytics to determine optimal functioning within clusters. Methods discussed herein enable the use of the SL, for example, to optimize the functionality of multiple clusters in a coordinated manner.

Disclosed is a service layer enhanced clustering (SLEC) functionality that assists conventional clustering functionality. SLEC functionality may be differentiated based on the node on which it is implemented, as the enhancements necessary or possible on an infrastructure node, for example, may be different than the enhancements necessary or possible for implementation on another device.

Also disclosed is an enhanced cluster management function (ECMF) that may provide SL logic in the management of clusters and sub-clusters, in addition to the logic provided by the conventional clustering algorithms in the lower layers of the traditional protocol stacks. ECMF functionality may be provided for intra-cluster management or inter-cluster management. In addition, disclosed herein are cluster profiles describing the service-related context of sensor networks managed within clusters, in addition to non-service related information (e.g., device characteristics, topology, etc.). A cluster profile registry (CPR) as disclosed may be a logical function in the M2M Service Layer which manages cluster profiles.

Figure 12:
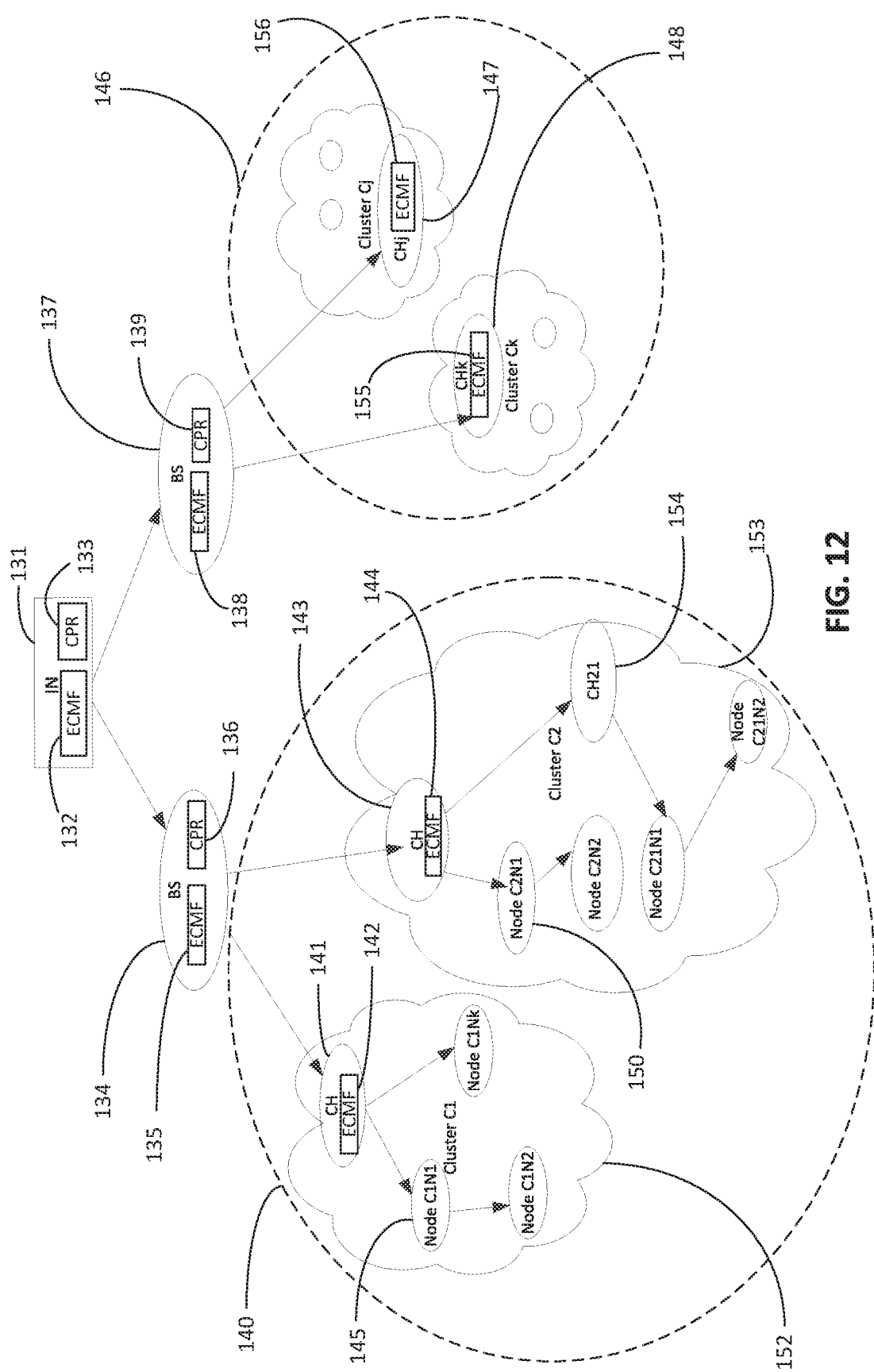
FIG. 12 illustrates an exemplary wireless sensor network (WSN) with enhanced clustering functionality.

FIG. 12 illustrates an exemplary wireless sensor network (WSN) with enhanced clustering functionality. In FIG. 12, infrastructure node (IN) 131 includes ECMF 132 and CPR 133. IN 131 is communicatively connected with BS 134 and BS 137. BS 134 includes ECMF 135 and CPR 136. BS 134 is also communicatively connected with zone 140, which includes connections with CH 141 and CH 143. CH 141 includes ECMF 142 and is communicatively connected with a plurality of nodes such as node 145. CH 143 includes ECMF 144 and is communicatively connected with a plurality of nodes such as node 150 and CH 154. BS 137 includes ECMF 138 and CPR 139. BS 137 is communicatively connected with zone 146, which includes connections with CH 148 and CH 149. CH 148 includes ECMF 155 and CH 147 includes ECMF 156.

Figure 1:
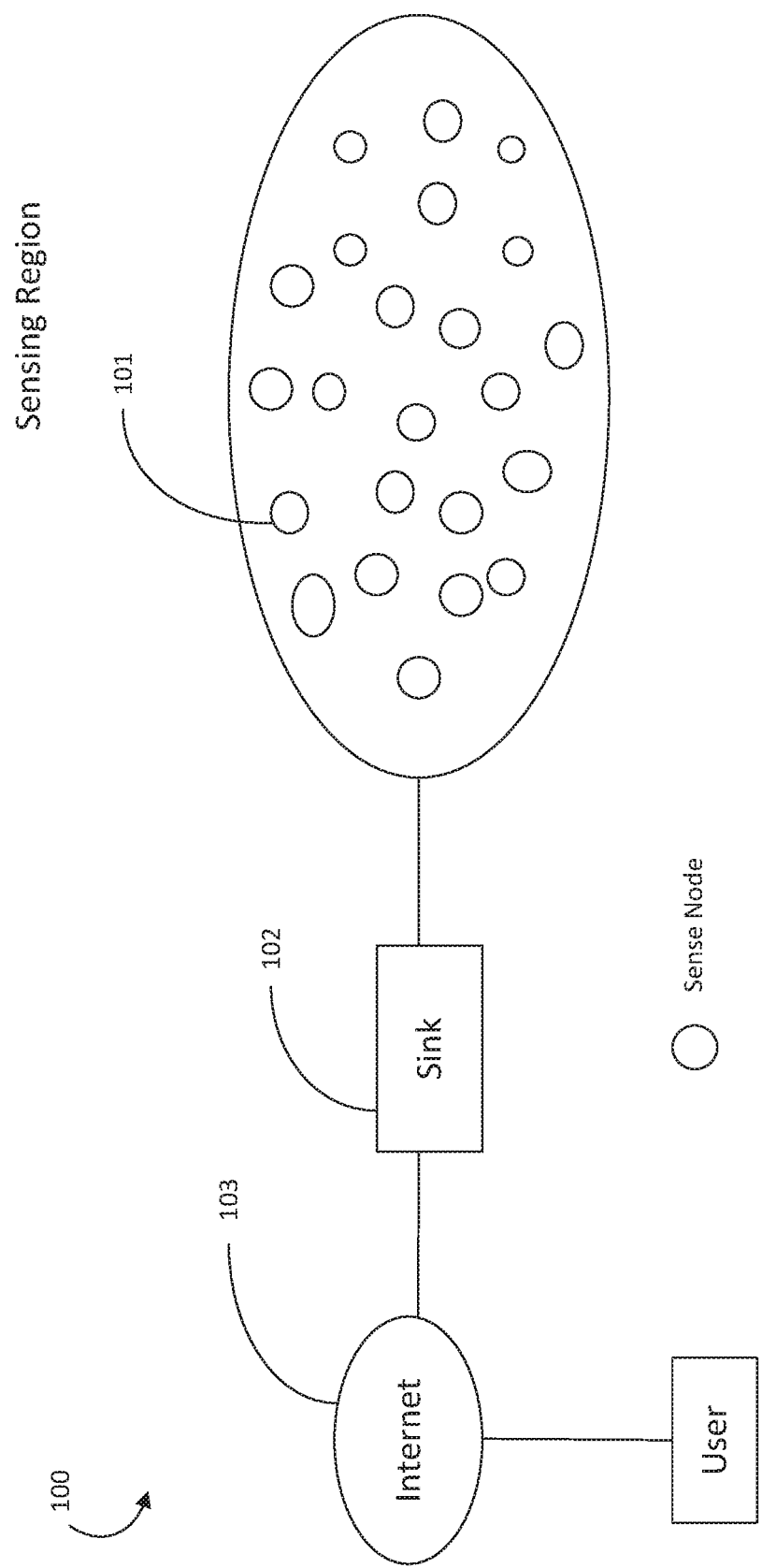
FIG. 1 illustrates an exemplary sensor network architecture.
Figure 2:
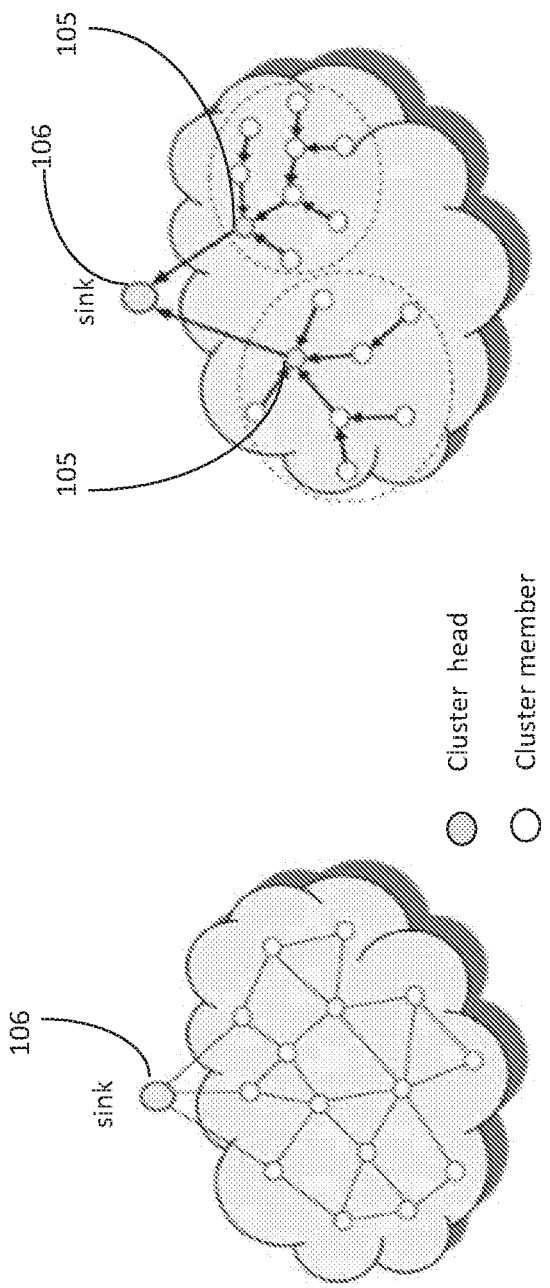
FIG. 2A illustrates flat and cluster-based hierarchical WSN topologies.
FIG. 2B illustrates flat and cluster-based hierarchical WSN topologies.
Figure 3:
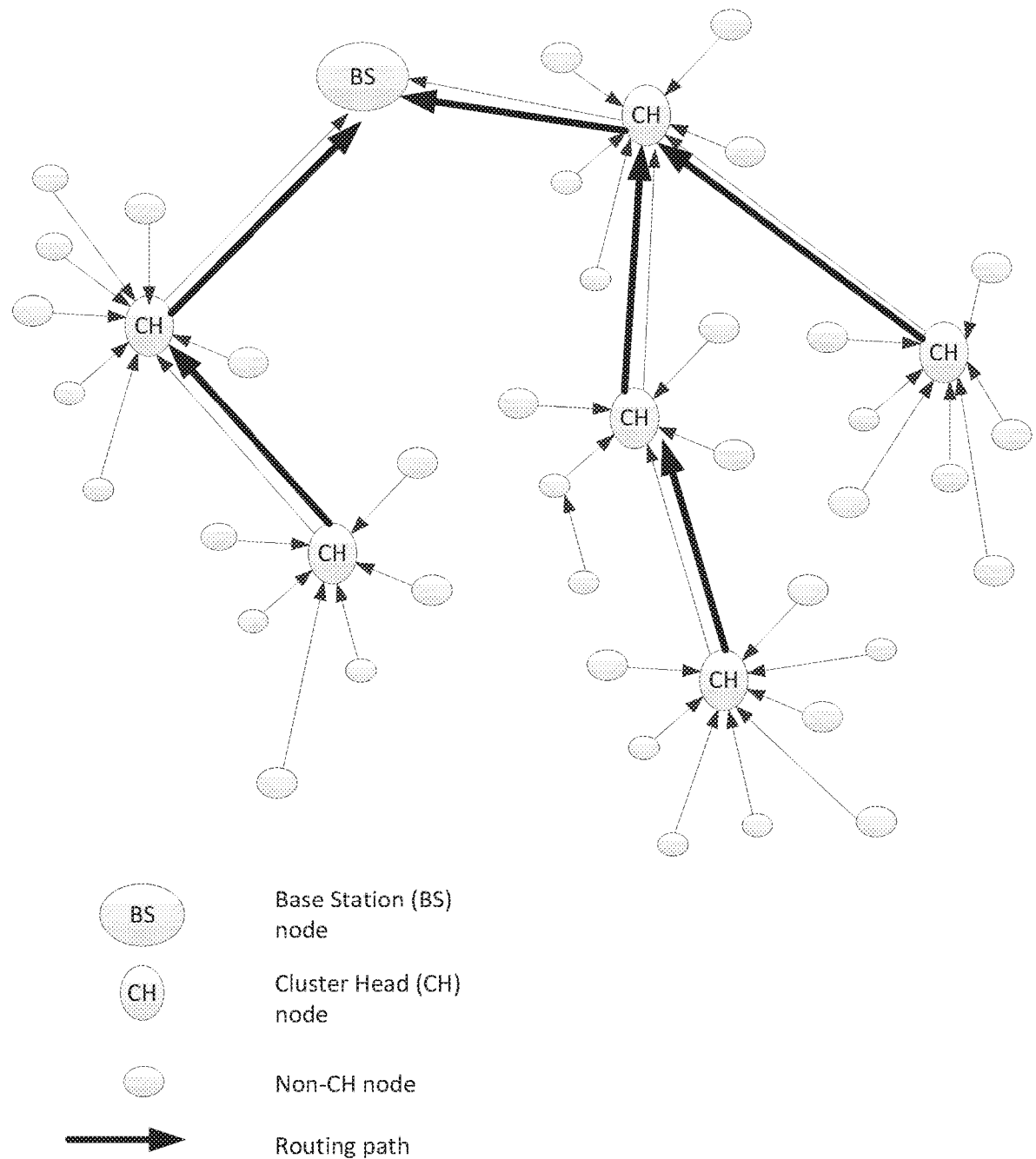
FIG. 3 illustrates another exemplary cluster that includes elements such as CH, BS, and nodes.
Figure 4:
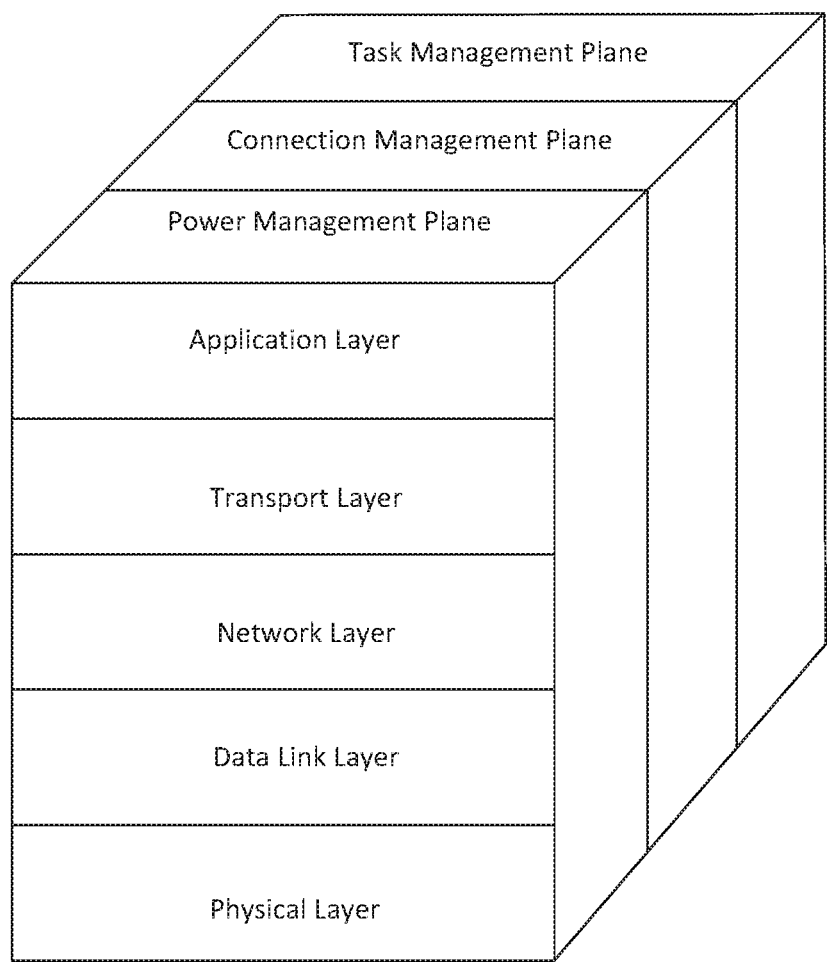
FIG. 4 illustrates delineation of vertical/functional planes focused on providing Task, Connection, and Power Management.
Figures 6A, 6B, 6C:
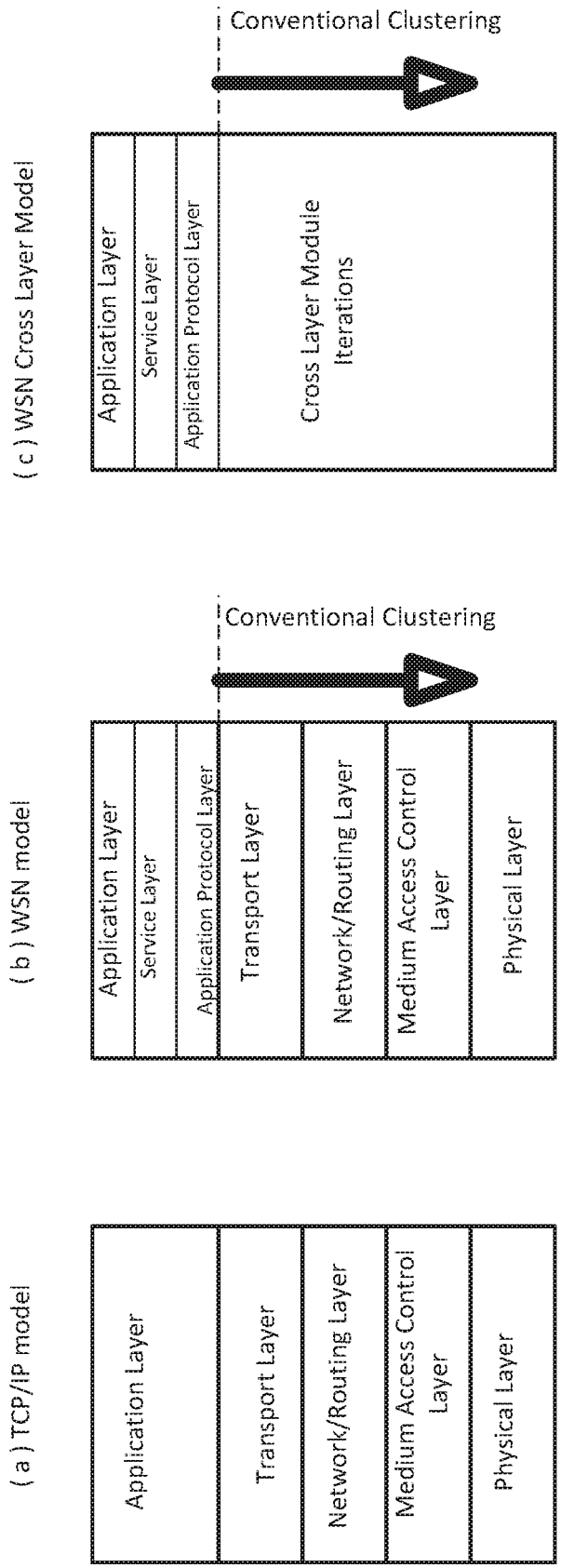
FIG. 6A are illustrates protocol stack model and mapping of the conventional clustering functionality for TCP/IP, WSN, and WSN cross layer model in conjunction with FIG. 6B and FIG. 6C.
FIG. 6B are illustrates protocol stack model and mapping of the conventional clustering functionality for TCP/IP, WSN, and WSN cross layer model in conjunction with FIG. 6A and FIG. 6C.
FIG. 6C are illustrates protocol stack model and mapping of the conventional clustering functionality for TCP/IP, WSN, and WSN cross layer model in conjunction with FIG. 6A and FIG. 6B.
Figure 7:
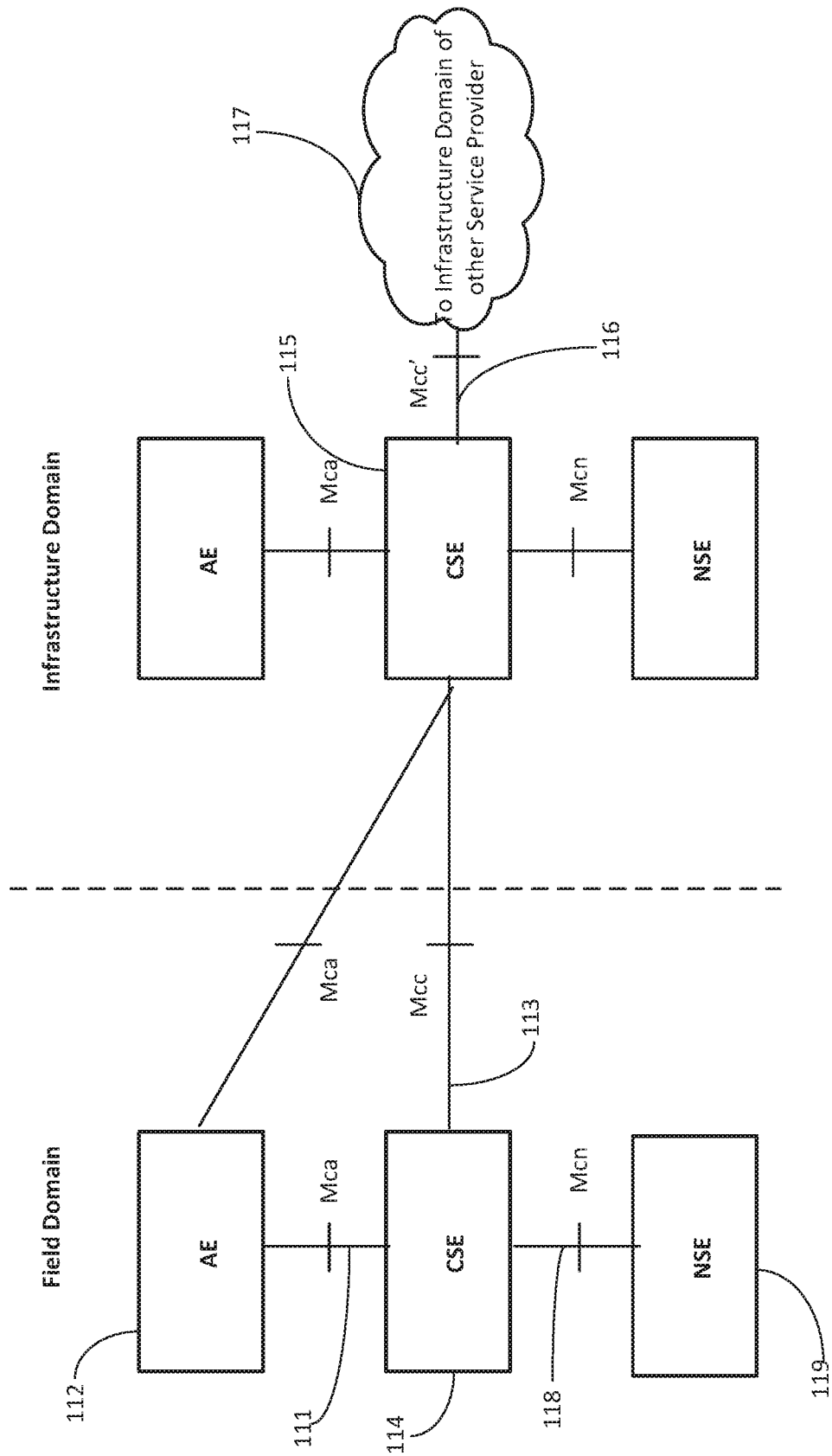
FIG. 7 illustrates oneM2M standard that defines a service layer called common service entity.
Figure 8:
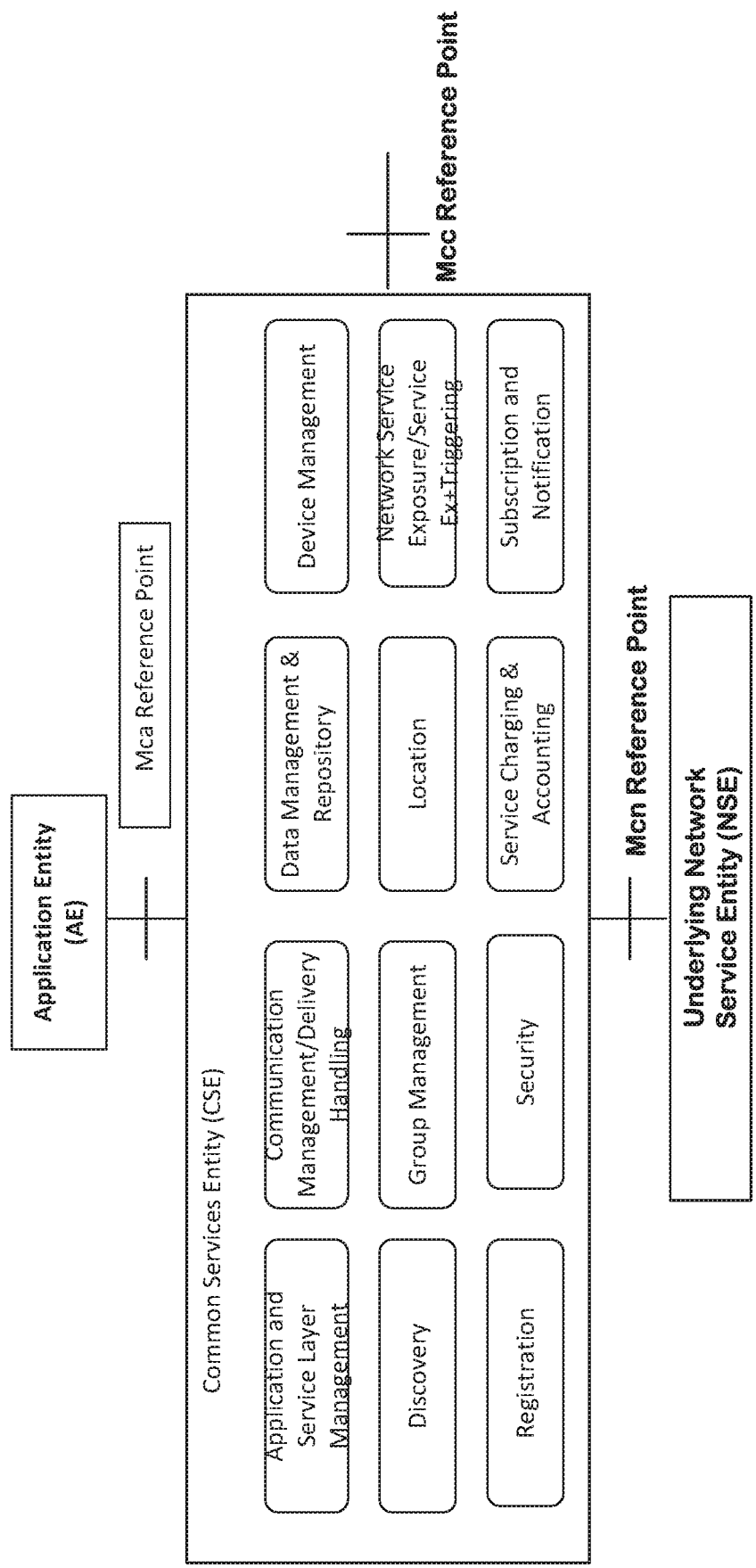
FIG. 8 illustrates oneM2M RESTful architecture.
Figure 9:
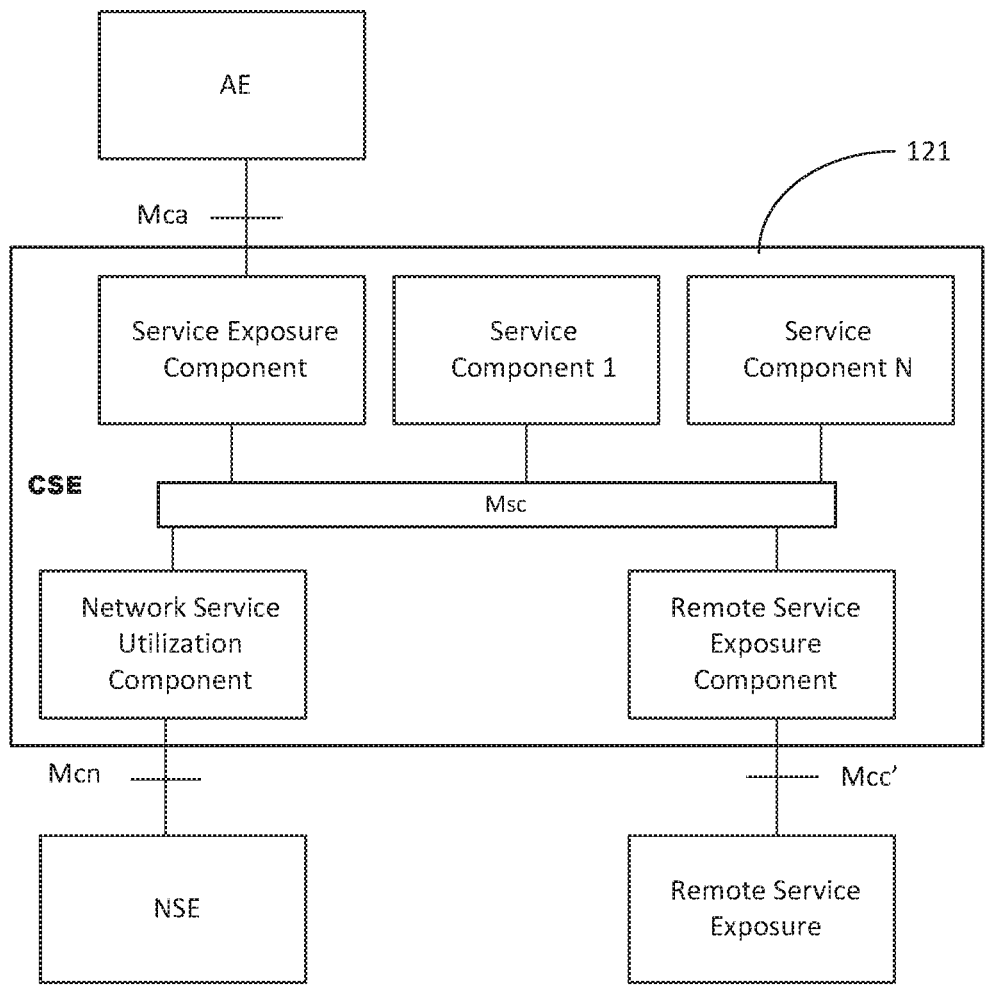
FIG. 9 illustrates SoA representation of a CSE in oneM2M.
Figure 10:
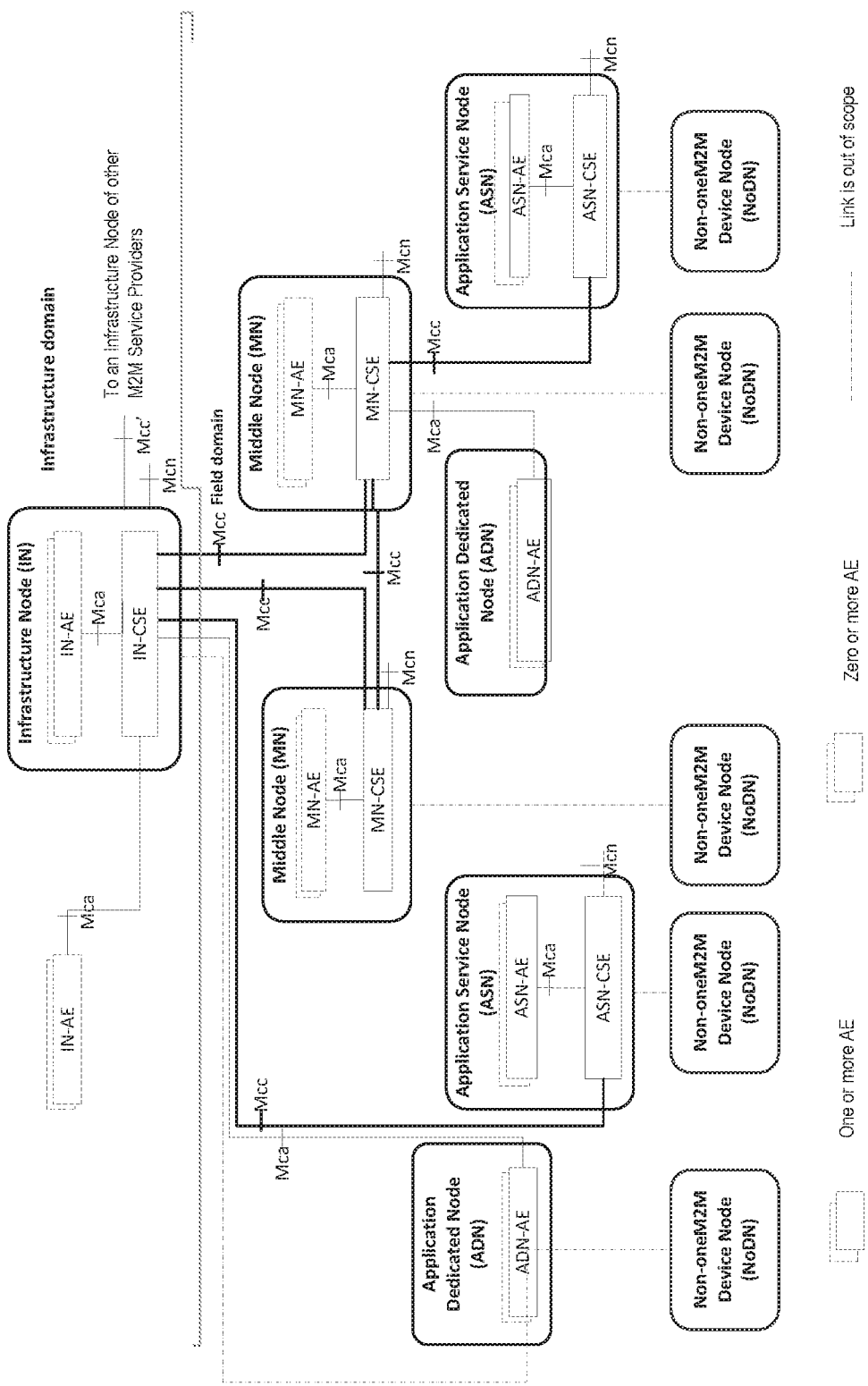
FIG. 10 illustrates configurations supported by the oneM2M architecture.

The ECMF (e.g., ECMF 132, ECMF 144, etc.) manages clusters (e.g., zone 140) and sub-clusters (e.g., cluster 152 or cluster 153), in addition to the conventional logic provided by the conventional clustering algorithms (e.g., the algorithms of Table 1, etc.) in the lower layers (e.g., layers below the application layer or SL as shown in FIG. 4 or FIG. 6A). As discussed in more detail herein, ECMF 144, for example, may be used to register cluster 153 with CPR 136 and provide access control information for a cluster profile (not shown) associated with cluster 153 created in CPR 136 as a result of the registration. In another example, ECMF 144 may be used to update parameters of the cluster profile associated with cluster 153.

Figure 13B:
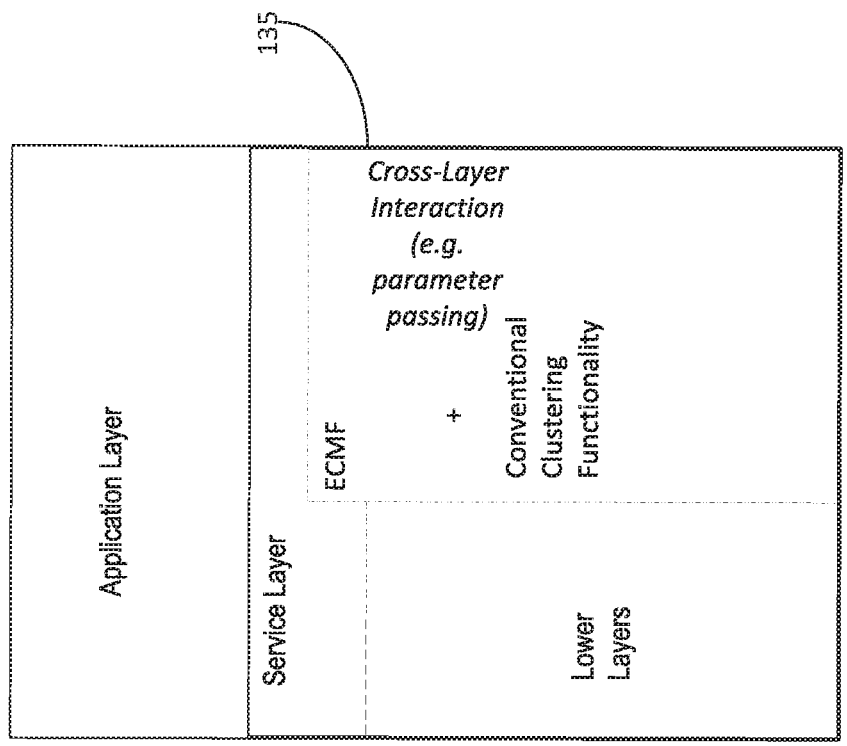
FIG. 13B illustrates an example of ECMF, which may be implemented in conjunction with a service layer.
Figure 13A:
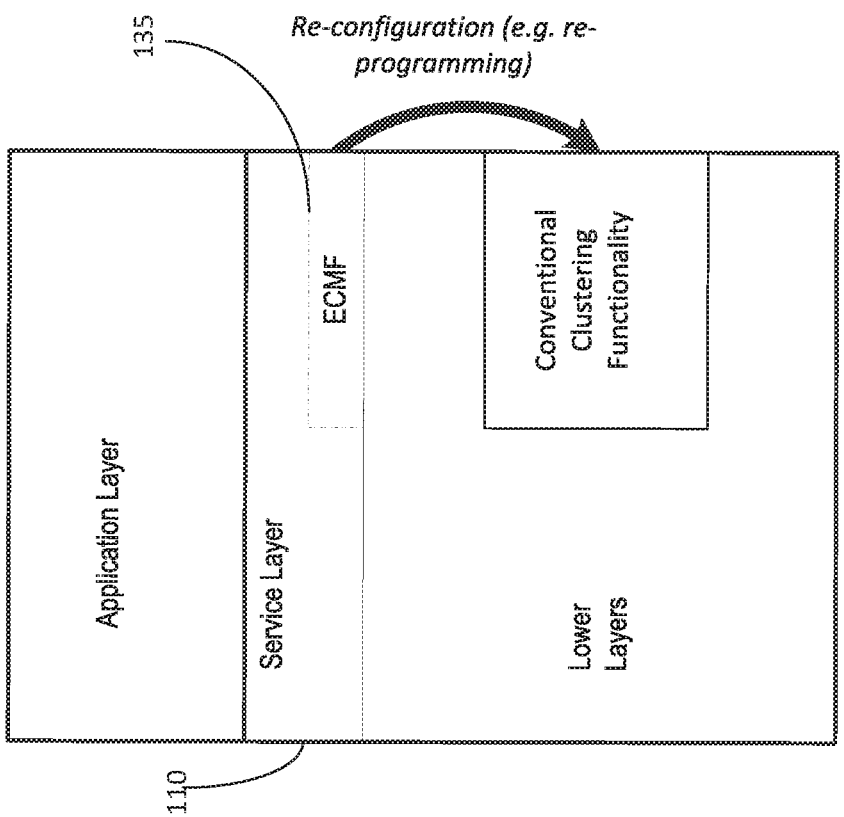
FIG. 13A illustrates an example of ECMF, which may be implemented in conjunction with a service layer.

FIG. 13A and FIG. 13B illustrate examples of ECMF, which may be implemented in conjunction with a service layer. FIG. 13A and FIG. 13B also illustrate possible interactions of an ECMF with conventional clustering algorithms. In FIG. 13A, ECMF 135 is implemented as a function of a SL following the conventional protocol stack layered model. So EMCF 135 provides services to the layer above (application) using the layers below. In FIG. 13A, ECMF 135 provides instructions for re-programming the lower layers to optimize the conventional clustering functionality, but the lower layers function independently of ECMF 135. For example, conventional clustering algorithms (e.g., Table 1-Table 3 or similar algorithms not yet developed), may be implemented in this case, without modifications, within the lower layers.

In FIG. 13B, ECMF 144 is integrated with the conventional clustering functionality implemented in the lower layers on platforms specialized for cross layer implementations. See generally J. Marron, et al., "TinyCubus: a flexible and adaptive framework sensor networks." Proceedings of the Second European Workshop on Wireless Sensor Networks (2005): 278-289 (hereinafter Marrón), which is incorporated by reference in its entirety. Marrón supports the idea that you can integrate layers to provide the most optimization. As such there are no more horizontal lower layers (e.g. physical, MAC, transport) but just one Cross-Layer module instead. This may be the case in which one of the conventional algorithms is enhanced with ECMF functionality, or in which a whole new algorithm is designed to provide both conventional clustering functionality (CH selection/re-selection, routing, topology management) and ECMF functionality. This creates de-facto new cross-layer algorithms including the lower layers and the SL-level functionality. The clustering management related data exchanges between layers may be implemented in a variety of ways: local function calls, re-configurations, integrated protocols, etc.

ECMFs (e.g., ECMF 132, ECMF 144, ECMF 156, etc.) may be provided for intra-cluster management as well as for inter-cluster management. With regard to intra-cluster management, ECMF 135 may be implemented on nodes with a cluster coordinating role, such as a CH or a BS. In an example, with reference to FIG. 12, ECMF 142 and ECMF 144 reside in nodes with a CH role and may provide intra-cluster management. ECMF 142 and ECMF 144, for example, are in charge of maintaining relevant information about the respective cluster 152 and cluster 153, such that at time T1 (as discussed in relation to FIG. 11) the conventional clustering algorithm used by cluster 152 and cluster 153 in zone 140 is reconfigured in order to optimize performance in view of one or more optimization goals (e.g., threshold energy expenditure by the cluster of devices when considered as whole, threshold communication delay, threshold memory usage, threshold processing performance metrics, etc.). More details on the methods enabling this functionality are below. ECMF functionality is usually implemented on nodes that can support increased computational functional levels (e.g., in energy, communications, memory or processing required).

In order to provide inter-cluster management ECMF may reside at SL on BS nodes (e.g., BS 134) or may reside on separate nodes outside the cluster (not shown); where the inter-cluster management functionality may be implemented as a stand-alone function or an enhancement to intra-cluster management functionality. For ease of description, it is assumed that the reference to ECMF below has the specific level of functionality required by the deployment. With continued reference to FIG. 12, ECMF 135 and ECMF 138 residing on BS 134 and BS 137, respectively, may be in charge of maintaining relevant information about the clusters they each coordinate. CPR 133 may be considered centralized and located in IN 133, but, as shown, BS 134 and BS 137 may include a local CPR (e.g., CPR 136 and CPR 139) and locally relevant profiles. Some metrics and topology updates may be sent to CPR 133 (the central CPR) periodically, e.g. as snapshots, averages, etc. In an example, ECMF 132 in IN 131, after time T2 (as discussed in relation to FIG. 11) may detect the redundant measurements obtained from zone 140 and zone 146, such that sensor scheduling may be altered (e.g., the reports from the redundant sensors are scheduled alternatively).

As discussed in more detail herein, CPR (e.g., CPR 133, CPR 136, etc.) is a logical function which manages cluster profiles and associated mappings to other services and resources. Depending on implementation, a network of a service provider (SP), for example, may use one or more CPRs within its domain, a CPR may be shared among SPs, or CPR functionality may be distributed among nodes or integrated with other logical functions. For example, CH 141 may be a node in which ECMF 142 provides intra-cluster management only. CPR 136 may be local to BS 134, accessible by ECMF 135 and may be implemented containing only the profile of coordinated cluster 140. In a different implementation, only a part of CPR 136 may be local to ECMF 135, the remainder residing on a different entity (e.g., IN 131) and being accessed by ECMF 135 as needed.

reflect whole lists, databases, or links to external resources, rather than single entries. An example of whole lists (lists of several parameters) may be a list of ordered lists (includes sub-lists) to represent topology. Each sub-list may contain the nodes in a cluster where the first entry is a CH. An example of links to external resources may be where each entry is a link to one more servers that include information about location, semantics, etc. Categories of parameters and profile sub-types have been separated for ease of description, the categorization is not mandatory. The use of parameters may be based on implementation choices. Additional details about each category are found below.

TABLE 4

Cluster Profile Registry Entry Example

| | | | | | Policy | Enrichment E.g. Ontology, | Topology Membership (nof nodes, nof | Metrics Clustering |
|---|---|---|---|---|---|---|---|---|
| ID | Name | Owner/ACL | Designation | Service List | Cluster management info | Semantic & analytic server links | CH, node list, CH list, topology) | metrics. Rankings, etc. |
| ID 1 | Zone 140 | Owner: O1 Admin: SP1 | Zone 140 | Temp, humidity, perimeter | Goal1: network lifetime; Node types: heterogeneous; Node mobility: low BS mobility: none CH: random Algorithm Threshold N/A Clustering protocols LEACH Metric rankings | Semantic server S1 Location Server L1 | (100, 10, . . . ) | Interference, signal strength |
| ID 2 | Zone 146 | Owner: SP1 Admin: SP1 | Zone 146 | Temp, humidity, flood alert | Goal1: CH lifetime; Goal2: total residual energy; Node types: homogeneous; Node mobility: low BS mobility: none CH: list Algorithm Hard Threshold: 400 F. Algorithm Soft Threshold 25 F. Current protocol TEEN | Semantic server S1 Location Server L1 | (534, 25 . . . ) | Service usefulness rating by user |

Figure 14:
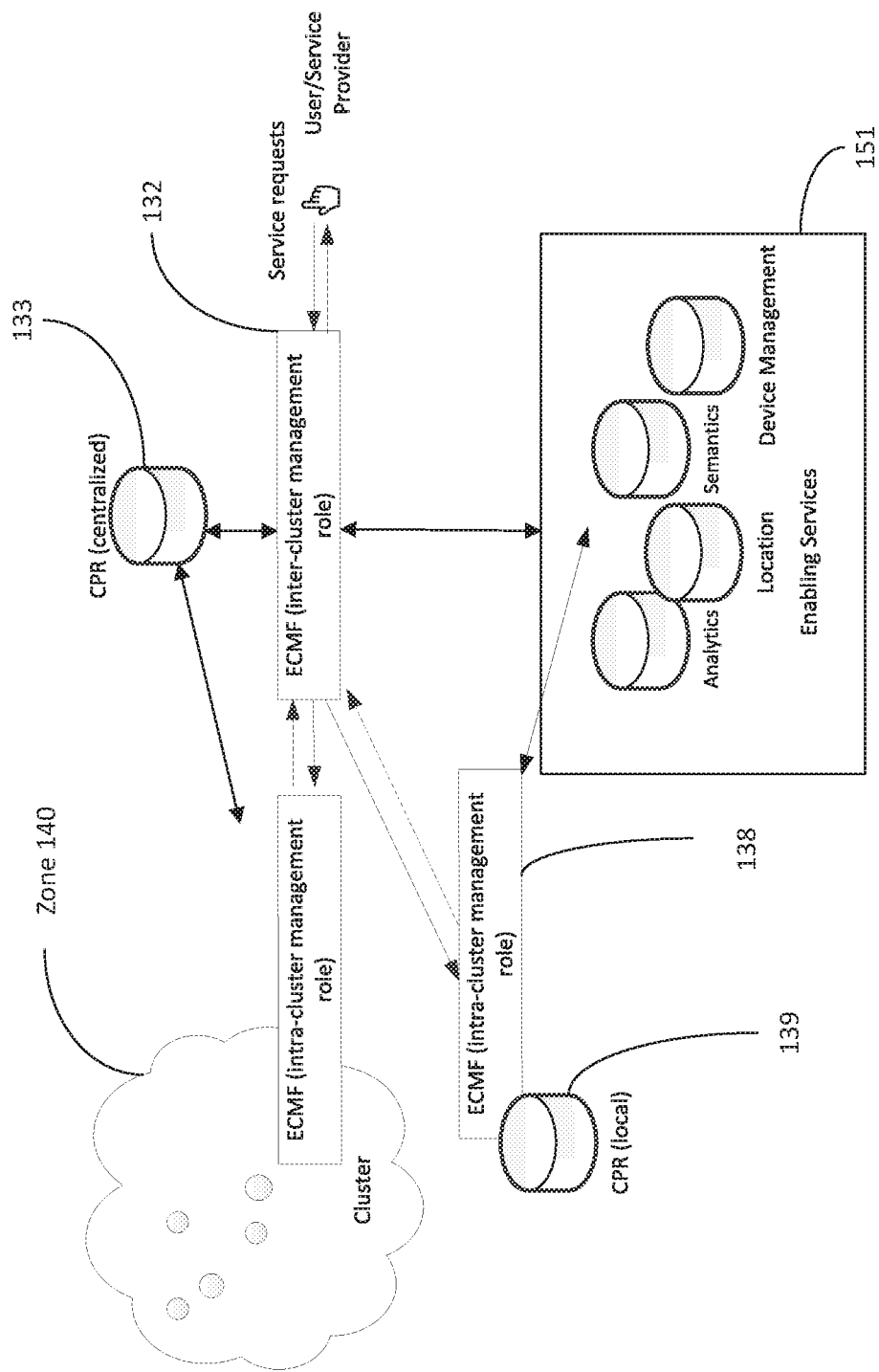
FIG. 14 illustrates an exemplary logical interaction between ECMFs and CPRs, as well as other SLs.

FIG. 14 illustrates an exemplary logical interaction between ECMFs and CPRs, as well as other SLs (e.g., enabling services). Enabling services (ES) are accessible to SLs and may be located anywhere within the platform. For this disclosure, the term "enabling services" (ES) is a term for services such as location, semantics, analytics, or functionality such as device management that may be leveraged for clustering enhancements within the SL.

Table 4 illustrates exemplary information that may be provided by a CPR (e.g., CPR 133) and may be considered in a cluster profile. CPR 133 may provide information in the following general categories (e.g., in Table 5): description, policy, enrichment, topology, and metrics, among others. Some of the parameters in the examples provided herein With regard to the description category, it includes parameters generally defining and identifying a cluster. Except for composition, most description parameters are available or set early in the clustering process and should be available at registration with CPR 133. Some may be available for re-configurations (owner, name, etc.), but most tend to be rather static. This category may include security parameters (e.g., access control list—ACL) or services offered by nodes, although they may be considered in the policy category. The cluster profile is normally configured by a user that is a stakeholder in maintaining or optimizing a sensor network. The parameters may be configured and re-configured throughout the lifetime of the cluster, but tend to be rather static. Table 5 provides exemplary parameters for a cluster description category.

TABLE 5

Cluster Description

| Parameter | Description |
| --- | --- |
| clusterID | Local or global identifier |
| clusterName | Local or global name |
| clusterOwner | Cluster Owner |
| clusterECMFid | Local or global identifier of the ECMF entity managing the cluster. In cases where there are multiple ECMF entities in the hierarchy it indicates the one managing the cluster configuration and able to perform reconfigurations. Intermediary ECMF may act as pass-through for ECMF related information. |
| clusterRegistrationCPRlist | List of identifier (e.g., URI) of CPRs with which the cluster is registered |
| clusterACL | Access Control List (ACL) for access to the nodes |
| clusterComposition | Without describing the topology, a description of the current cluster composition: Number of nodes List of identifiers of nodes. Identifiers unique thein the cluster. List of identifiers of base stations. Identifiers unique within the deployment (or globally unique). List of fixed attributes by node, e.g. supported clustering algorithms, range, operating power range, sleep schedule, PHY/MAC/IP/Transport/Application protocol under Service Layer, memory, exception handling, interoperability, configurability, sensitivity, availability to become CH List of variable attributes, unless contained in the metrics: battery level, mobility List of services |

With regard to the policy category, it includes parameters that may describe how the cluster should be used or configured. Table 6 provides exemplary parameters for the policy category. Many of the key parameters describing or determining the choice of clustering algorithm are included in this category, such as clustering algorithm optimization goals or node characteristics to be considered in algorithm selection (e.g., mobility, data rates, and constraints). These parameters may be configured by a user. The parameters may be configured and re-configured throughout the lifetime of the cluster, but are usually less dynamic than other parameters (e.g., topology). As applicable herein for the other categories, a policy may be automatically set based on historical information, such as similar WSN, time of day, and type of sensor, among other things.

The purpose of algorithm selection, the way the role of CH is assigned may be limited to a specific category such as fixed CH roles, set rotation in a list of CHs, random selection of CHs, etc. For example, some or all of the CHs in FIG. 12 may be nodes which are plugged in rather than battery powered. As such, in the cluster configuration they are assigned to be fixed as CH node because power and the amount of communication to support may not be an issue. So power more generally (e.g., remaining battery life or projected battery life) may be factor in choosing a CH. CH roles may be assigned randomly (if minimum criteria is met) in order to spread out the communication burden. In FIG. 12, if LEACH, which uses random selection, were used, any node meeting minimum criteria may become a CH.

Optimization goals (e.g., parameter availableOptimizationGoals) may be specified such as level of energy efficiency, network lifetime, residual energy, etc. These parameters may be used in conjunction with other parameters defining the cluster. For example, used to measure performance, which in turn is used for selecting CH or for selecting the algorithm. Note that the measure used to select CH (within the algorithm) may be different than the measure to select the algorithm. For example the CHs may change simply when they reach a threshold residual energy, to the node with the highest residual energy. The algorithm may change when the network lifetime is not optimized and too many nodes die too quickly. Other parameters defining the cluster: number of nodes per (sub) cluster, max message delay, etc. even parameters form the "enrichment" category such as location. For example, certain policies (including optimization goals) may be dependent on the location of the cluster The parameters of the policy category allow for enablement of SL enhanced cluster management and may be stored locally by ECMF or in centralized or distributed CPRs. Examples of the parameters follow. Energy efficiency may be defined by a threshold in several ways, such as max energy per message, max energy consumed per node per unit of time, max energy to be consumed per cluster per unit of time, etc. Network lifetime may be defined by minimum time before first node dies, minimum time before a number of nodes become isolated with no neighbors, etc. Residual energy may be defined as giving a set of numbers to be used simultaneously, such as minimum residual energy for a node to be a cluster head, min/max number of CH, delay, etc. In another aspect, residual energy may be a single threshold for min residual energy per node to trigger a reconfiguration or single threshold of min residual energy in all nodes to trigger a reconfiguration.

TABLE 6

Policy Profile

| Parameter | Description |
| --- | --- |
| clusteringPolicyList | List of policy parameters governing the clustering algorithm selection such as clustering optimization goal, service optimization, etc. |
| availableOptimizationGoals | List of allowed optimization goals to be considered in clustering algorithm selection such as energy efficiency, data delivery delays, etc. |
| clusterMaxNofMembers | Maximum number of nodes in the cluster |
| clusterTopologyChoices | List of types of topologies allowed or parameters limiting topology choices |
| clusterAlgorithmChoices | List of types of algorithms allowed or parameters limiting algorithm choices. |
| clusterProfileAccessControlList | Access control information for the clustering information |
| assesmentTriggerThresholds | Thresholds to be used in ending a Setup phase and triggering an Assessment phase, e.g. timer or when all notification set-up is completed. This list may indicate different conditions under which the different thresholds may be applied, such as after a reconfiguration of the timer is applied or weather at initial set up the notification criteria applies. For example, list may provide two thresholds: NofNotificationsInitialX, reconfigTimerY. In setup phase measurements for critical data delivery delays are set up by requesting notifications every time one is received. If this setup phase |

TABLE 6-continued

Policy Profile

| Parameter | Description |
|---|---|
| | was entered when the cluster was just setup ("Initial") then NofNotificationsInitialX is used and the phase exists after this number of notifications is received. Nothing else is counted. If this setup phase was entered after a setup change (see FIG. 20), then reconfigTimerY is used and the phase is exited after a certain time. |
| evaluationPolicies | List of trigger threshold types allowed to start a new Evaluation Phase, in addition to any periodic configurations, e.g. policy updates, optimization thresholds, etc. evaluationTriggerThresholds is a metric from going from assessment to evaluation. It is similar to assesmentTriggerThresholds (at a different phase change though) in that it is used for metrics evaluationPolicies tells what type of actions, in addition to crossing the evaluationTriggerThresholds might cause you to go to evaluation phase. For example a change of policy setting by the user may also be a reason, no matter where the metrics are in rapport to the thresholds. In a different case the set-up might say that only the thresholds can cause this phase change, so even if the user changes policies the algorithm will wait for the metrics to cross the threshold. |
| periodicEvaluationParams | Parameters defining a periodic Evaluation schedule, if any. |
| evaluationTriggerThresholds | Thresholds to be used in triggering an Evaluation phase, such as thresholds or conditions for each optimization attribute, e.g. energy consumption rate, number of nodes with minimal residual energy, etc. |
| reconfigurationTriggerThreshold | Thresholds to be used in triggering a Reconfiguration phase, e.g. minimal evaluated energy gain |
| requiredCharact | List of required characteristics to be considered in all algorithm choices e.g. BS mobility, Node residual energy, threshold A, metric rankings |
| allowedManagementType | List of allowed management operations for the cluster, e.g. SL level topology reconfiguration. In an example, only profile changes may be allowed. In another example, a cluster may allow a command that may be used to trigger a reconfiguration (topology change) directly. This is captured in the GUI. |
| availableReconfigOptions | List of methods for node reconfiguration available for cluster management, e.g. re-programming, signalling options, etc. In an example, to change the clustering algorithm in the nodes, i.e. node reconfiguration, in some cases the cluster might allow reprogramming which is firmware change and may cause down time, interruptions, etc. In a different example, only signalling might be allowed, e.g. you can only change timer values in the nodes via signalling. In this case the changes may not be that great, the changes in the timer alters the algorithm but not change it as much |
| interClusterECMFidList | as in the first case. This list may include weights to be considered in the choice of each re-configuration type. List of ECMFid, (i.e. list of identifiers of ECMF) of ECMF modules with inter-cluster functionality allowed to propose inter-cluster optimizations for this cluster. |

With reference to the enrichment category, it includes parameters that enrich information associated with a cluster and may be stored locally or may be provided externally as ESs (e.g., location, semantics, or analytics servers). Table 7 provides exemplary parameters with regard to the enrichment category. Links (e.g., URI or other reference to a resource) to associated ES may be provided as a part of a configuration of a cluster profile. Parameters of the enrichment category may be updated directly by an ES throughout the life of a cluster. These parameters may be configured by a user. Enrichment associated parameters may be configured and re-configured throughout the lifetime of the cluster, but tends to be less dynamic than other profile parameters (e.g., topology profile parameter).

TABLE 7

Enrichment Profile

| Parameter | Description |
|---|---|
| availableEnrichmentMethods | List of method or resource types available for enrichment, e.g. location, semantics, etc. |
| semanticInfo | Link to database containing relevant ontology and semantic resources |
| analyticInfo | Link to database containing relevant analytic resources |
| locationInfo | Link to available location server or resources |
| deviceManagementInfo | Link to DM servers |

With reference to the topology category, it includes parameters that may be used to describe the hierarchical structure of the cluster and are usually affected by the chosen clustering algorithm. Table 8 provides exemplary parameters for the topology category. Various levels of detail may be employed in describing the cluster topology. For example a graph representation or lists of nodes by CH might be given, or the topology might include all end nodes or be described only at CH level. Location information may or may not be available or relevant, or may be located instead on an ES.

The topology related parameters (e.g., clusterNofMembers, currentClustering Algorithm) may be configured initially be a user. However, these parameters are expected to be updated as a result of the optimization logic in ECMF (e.g., ECMF 142). For example, upon selection of a new conventional clustering algorithm (e.g. APTEEN instead of LEACH) the currentClusteringAlgorithm is updated to reflect the change, as well as currentOptimizationGoal, candidateAlgorithmList and algorithmRankingList. After cluster reconfiguration by re-programming, the nodes of the topology is likely to change, so, ECMF 142 may update the subClusterList, parentClusterID, etc. to correspond to the new configuration and topology. The topology related parameters are based on attributes which may be defined or used at lower or higher layers. For example, as discussed herein, topology related parameters may be at SL level, which can enable SL enhanced clustering functionality.

TABLE 8

Topology Profile

| Parameter | Description |
| --- | --- |
| currentOptimizationGoal | Current choice from several specified optimization goals such as: Energy Efficiency, Network Lifetime, etc . . . |
| currentClusteringAlgorithm | Type of clustering algorithm currently employed, along with a list of relevant configurable thresholds and their current values. With regard to thresholds, below is an example. For example, APTEEN has two Thresholds: hard threshold (HT) and a soft threshold (ST). HT is a particular value of an attribute beyond which a node can be triggered to transmit data. ST is a small change in the value of an attribute which can trigger a node to transmit data again. |
| clusterNofMembers | Number of nodes in the cluster |
| subClusterList | List of sub-clusters (clusterIDs) whose CHs are part of this cluster in a multi-level topology. |
| parentClusterID | In a multi-level topology, the clusterID of the cluster which includes the CH of this sub-cluster |
| clusterTopology | List of nodes in the cluster including topology information such as levels |
| routingMetricList | List of metrics used by the routing protocol in creating the routing table, includes: name type, values |
| additionalMetricList | List of metrics available from the SL that may augment the routing metrics These may include but not limited to: bandwidth, interference levels, signal strength, etc. |
| candidateAlgorithmList | List of algorithm candidates identified |
| algorithmRankingList | List of algorithms being currently evaluated, the metrics considered and the rankings. |

With reference to parameters in the metrics category, it includes parameters obtained from the clusters, ES or derived during the running of the clustering algorithm. Table 9 provides exemplary parameters in the metrics category. Metric parameters are usually used for decision logic in determining the efficiency of an algorithm or any optimizations needed. Metric parameters may be considered dynamic parameters that reflect information from or about cluster nodes. Metric parameters provide raw data for optimization employed by ECMF. These parameters may be used within this logic together with the external ones provided by the ESs, in order to create a complete view of the cluster status.

TABLE 9

Cluster Metrics

| Parameter | Description |
| --- | --- |
| groupingInfo | Metrics may be captured by node, sub-cluster, cluster, etc. A mapping between the metrics, the cluster node list and the topology provides context for the metrics. |
| measQuality | List of parameters describing measurement accuracy, variance, resolution, frequency, range, etc. May include assigned or calculated qualitative characteristics (e.g. rough, averaged, etc.) |
| serviceParams | List of parameters describing service quality such as reliability, availability, etc. |
| serviceRating | Rating based on service usefulness, redundancy, etc. |

TABLE 9-continued

Cluster Metrics

| Parameter | Description |
| --- | --- |
| serviceCost | Considered costs of service e.g. ownership, generation, transmission, storage, etc. |

A cluster profile (e.g., Table 4—ID 1 row) may include all or some of the parameters described herein (e.g., Table 4 through Table 9) based on the deployment use case scenario. Given the variations in the use of the different categories of parameters, parts of a profile may be stored in different entities across the SL.

In an example, topology and metrics parameters of a profile of a cluster (e.g., cluster 152) may be co-located with ECMF 142 in CH 141, especially when the majority of the information may be collected from sensor nodes. Parameters associated with policy and enrichment, which may not be as dynamic, may reside in BS 134 or IN 131, especially for inter-cluster coordination. In distributed cases the correlation of information can be made across entities via parameters such as the unique clusterID and clusterName, links to parameters in a profile, etc.

CPR 133 may create or store single or multiple cluster profiles. CPR 133 may distribute profiles or parts of a profile across nodes. Functions of CPR 133 and ECMF 132 may be integrated into one device or distributed among more than one device. Information provided during the initial registration may include parameters associated with description and topology. Table 10 provides exemplary parameters that may be included in one or more registration messages for a cluster profile. Not all the parameters described in Table 10 may be provided by a CH (e.g., CH 141) or other node associated with a cluster, or the CH might provide additional profile parameters (e.g., link to the device management (DM) server, if provided in the initial configuration.). The profile parameters supported by CPR may be included in a registration message for a cluster profile.

At the cluster level (e.g., a cluster with a plurality of nodes, such as cluster 152) registration information may include information such as ownership, membership information (nodes), associated semantic, analytic or location servers, management information including algorithm goals, thresholds and parameters, topology, mobility characteristics, and CH and BS characteristics, among other things. At the node level within each cluster (e.g., node 145), registration information may include individual capabilities, list of services provided, and location, among other things. With consideration of per cluster or per node registrations might include only a small subset of possible parameters which create only an initial description of the cluster, which is later enriched over the lifetime of the cluster, or may be very detailed from the inception of the cluster. Per node and per cluster are distinguished only to provide context for the type of info. Membership info is valid for a cluster, while other things may be valid by a per node basis. This is a way to structure the type of information given. Additionally, with regard to registrations, registration might be very basic. For example, the registration may be just a cluster id composed of nodes A-Z, but not much other information is known. So, via device management commands, for example, the information about who the nodes might be is added later. There are other ways depending of what parameters are needed.

Figure 29A:
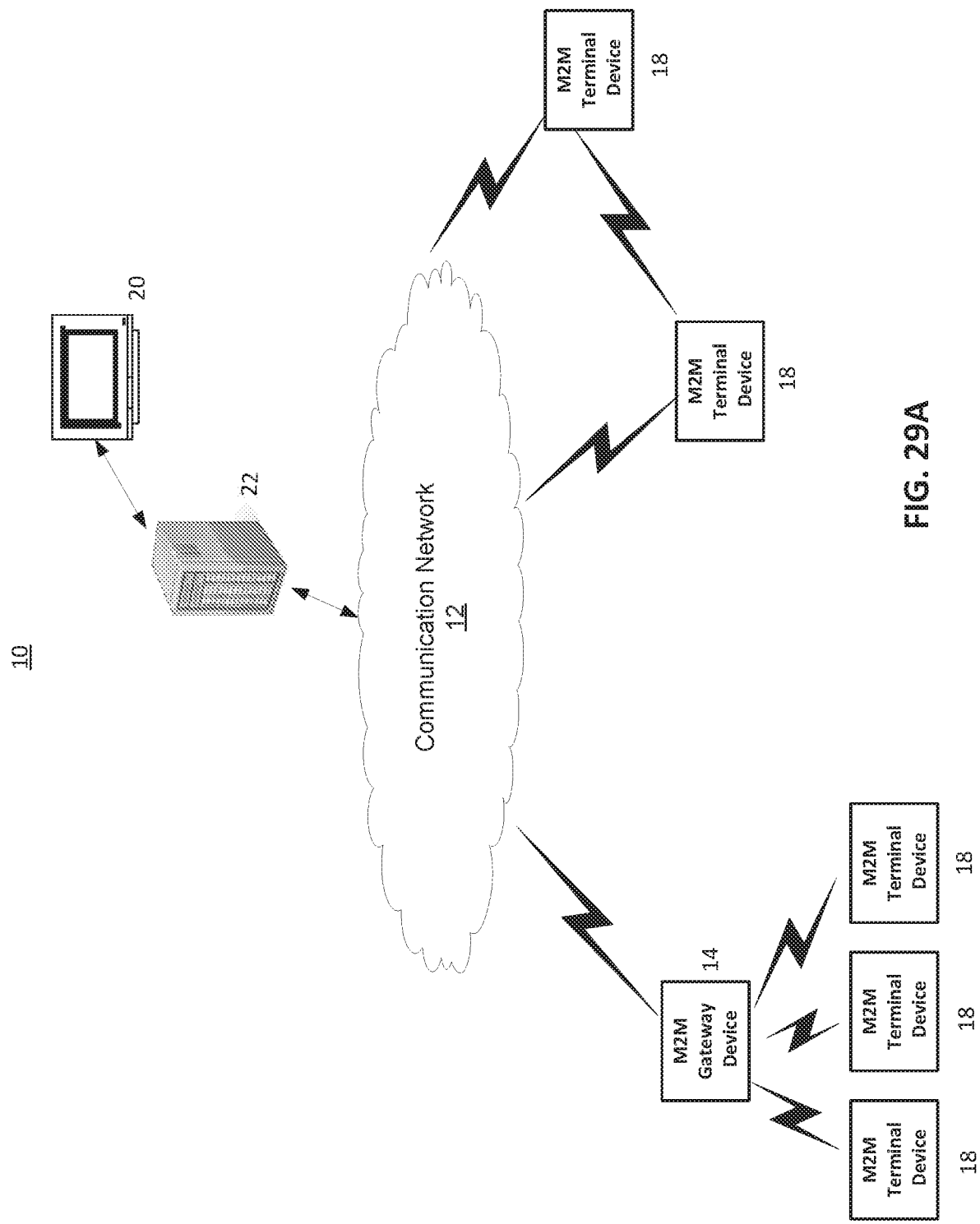
FIG. 29A illustrates an exemplary machine-to-machine (M2M) or Internet of Things (IoT) communication system in which the disclosed subject matter may be implemented.
Figure 29B:
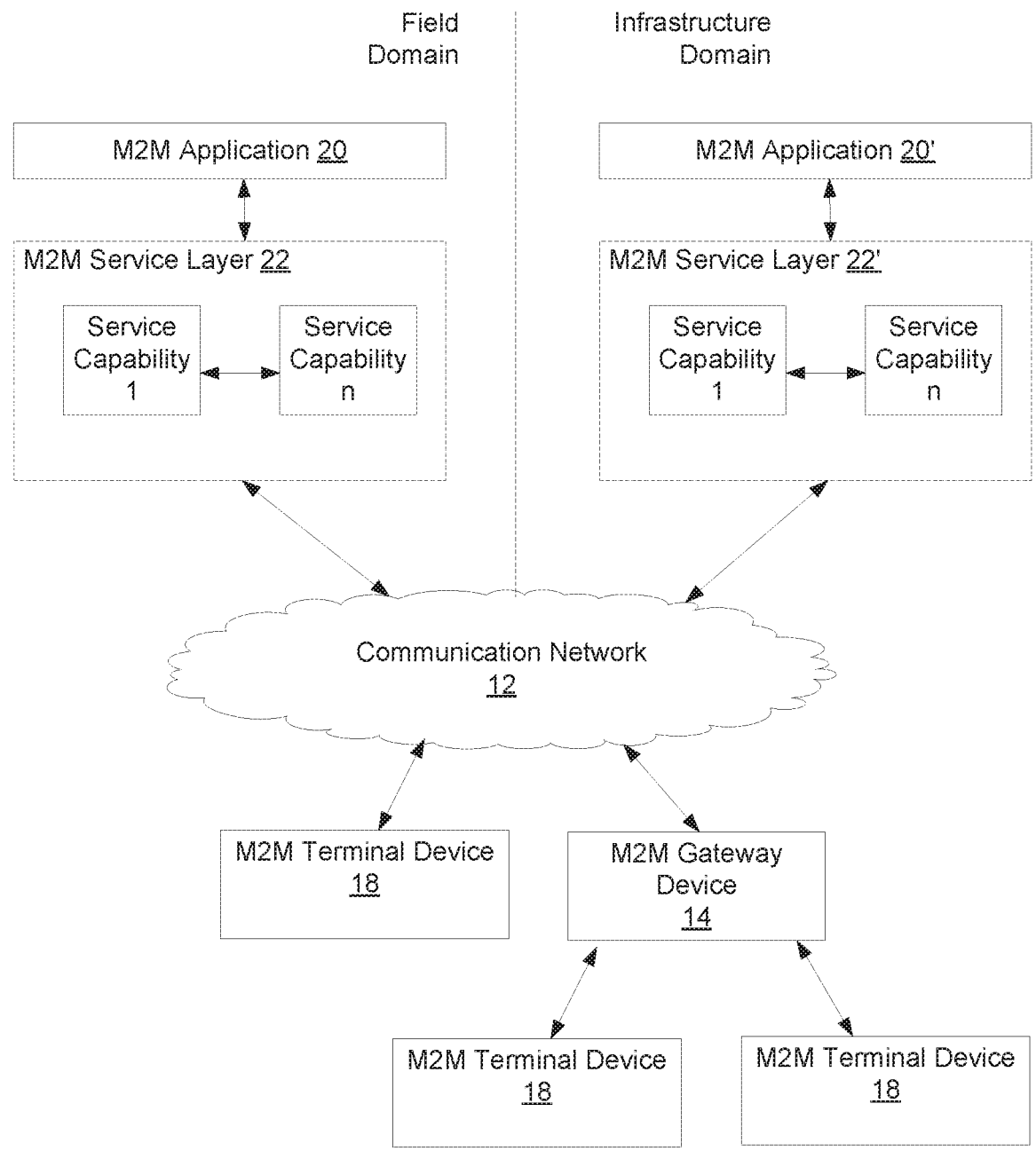
FIG. 29B illustrates an exemplary architecture that may be used within the M2M/IoT communications system illustrated in FIG. 29A.
Figure 29C:
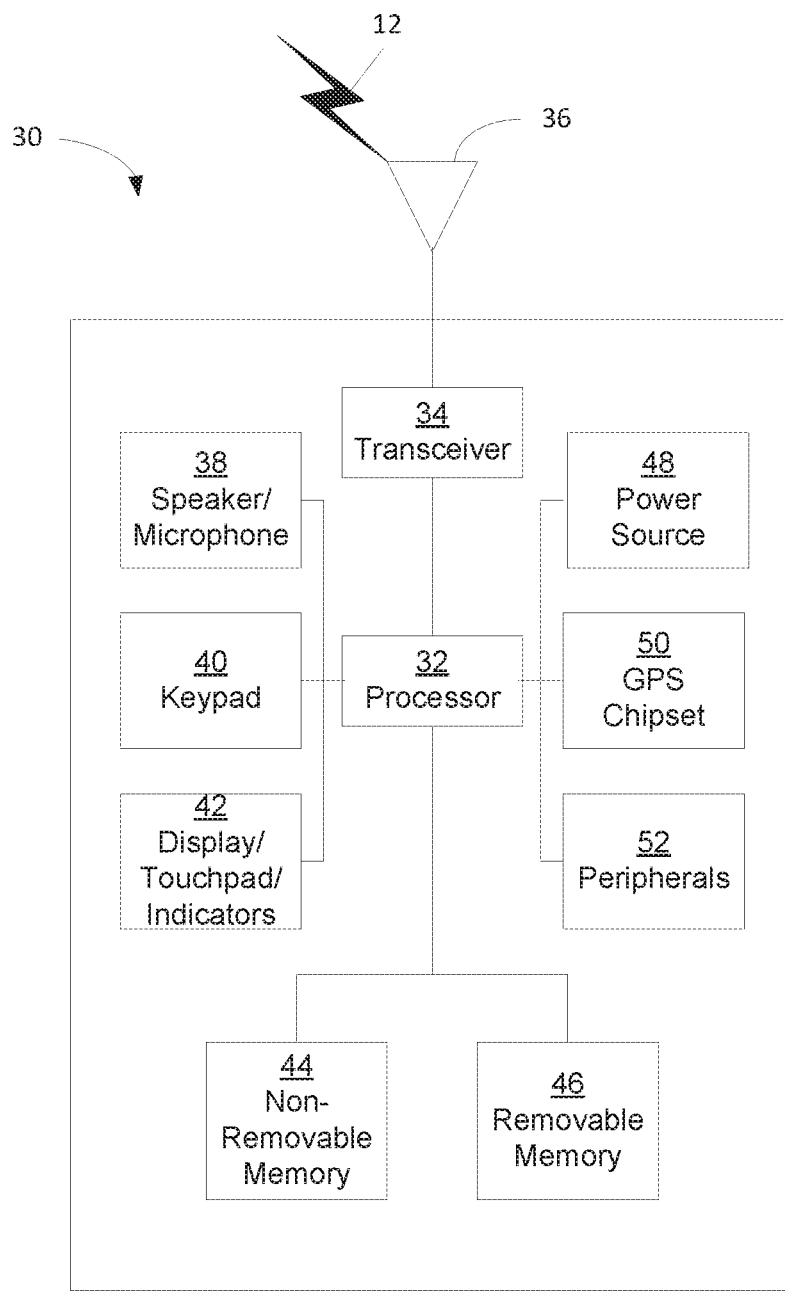
FIG. 29C illustrates an exemplary M2M/IoT terminal or gateway device that may be used within the communications system illustrated in FIG. 29A.
Figure 29D:
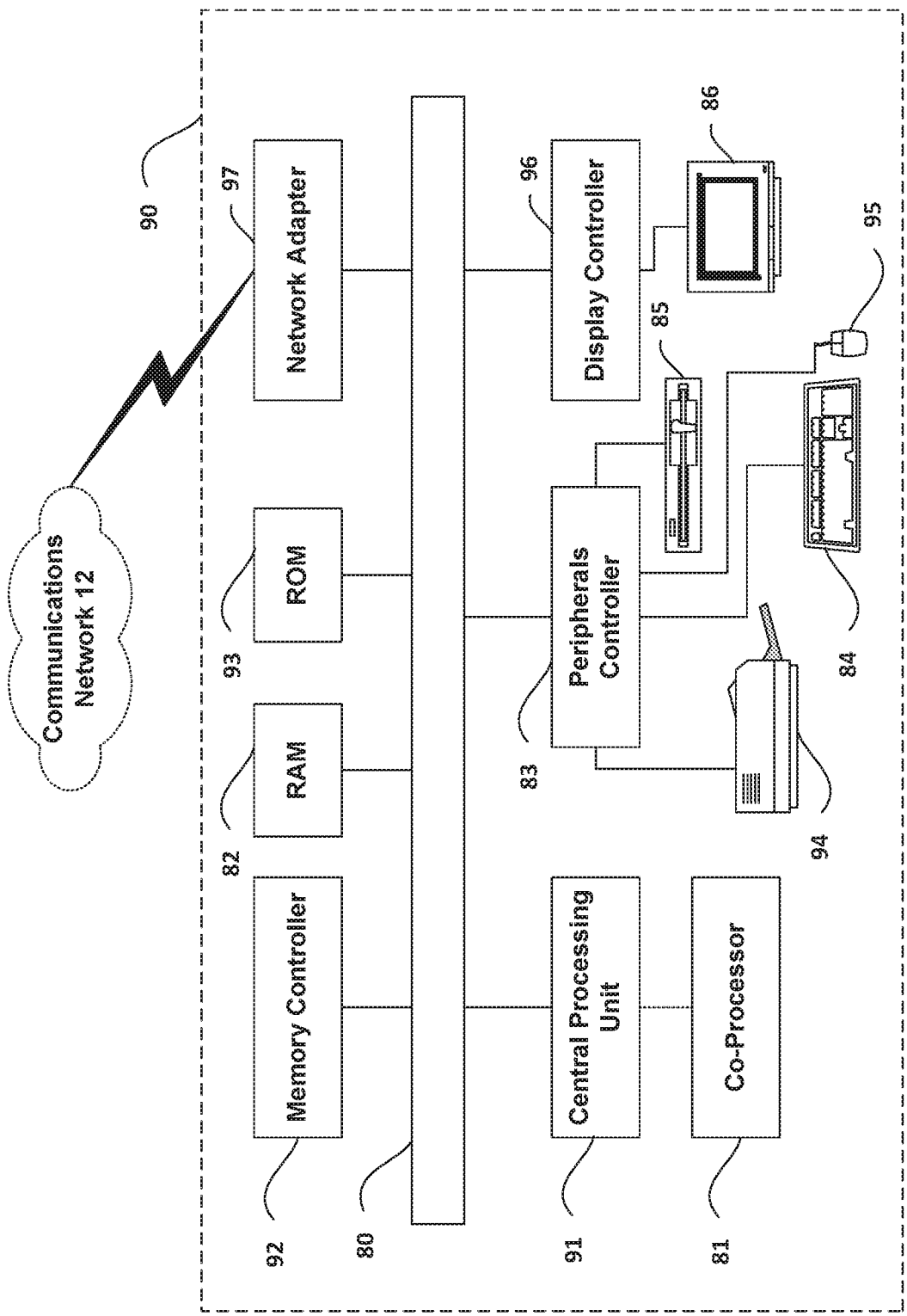
FIG. 29D illustrates an exemplary computing system in which aspects of the communication system of FIG. 29A may be embodied.

It is understood that the entities performing the steps illustrated in FIG. 15-FIG. 19 are logical entities that may be implemented in the form of software (e.g., computer-executable instructions) stored in a memory of, and executing on a processor of, a device, server, or computer system such as those illustrated in FIG. 29C or FIG. 29D. That is, the method(s) illustrated in FIG. 15-FIG. 19 may be implemented in the form of software (e.g., computer-executable instructions) stored in a memory of a computing device, such as the device or computer system illustrated in FIG. 29C or FIG. 29D, which computer executable instructions, when executed by a processor of the computing device, perform the steps illustrated in FIG. 15-FIG. 19. In an example, with further detail below with regard to the interaction of M2M devices, ECMF 142 of FIG. 12 and FIG. 15 may reside on M2M terminal device 18 of FIG. 29A, while CPR 133 and ECMF 132 of FIG. 12 and FIG. 15 may reside on M2M gateway device 14 of FIG. 29A.

Figure 15:
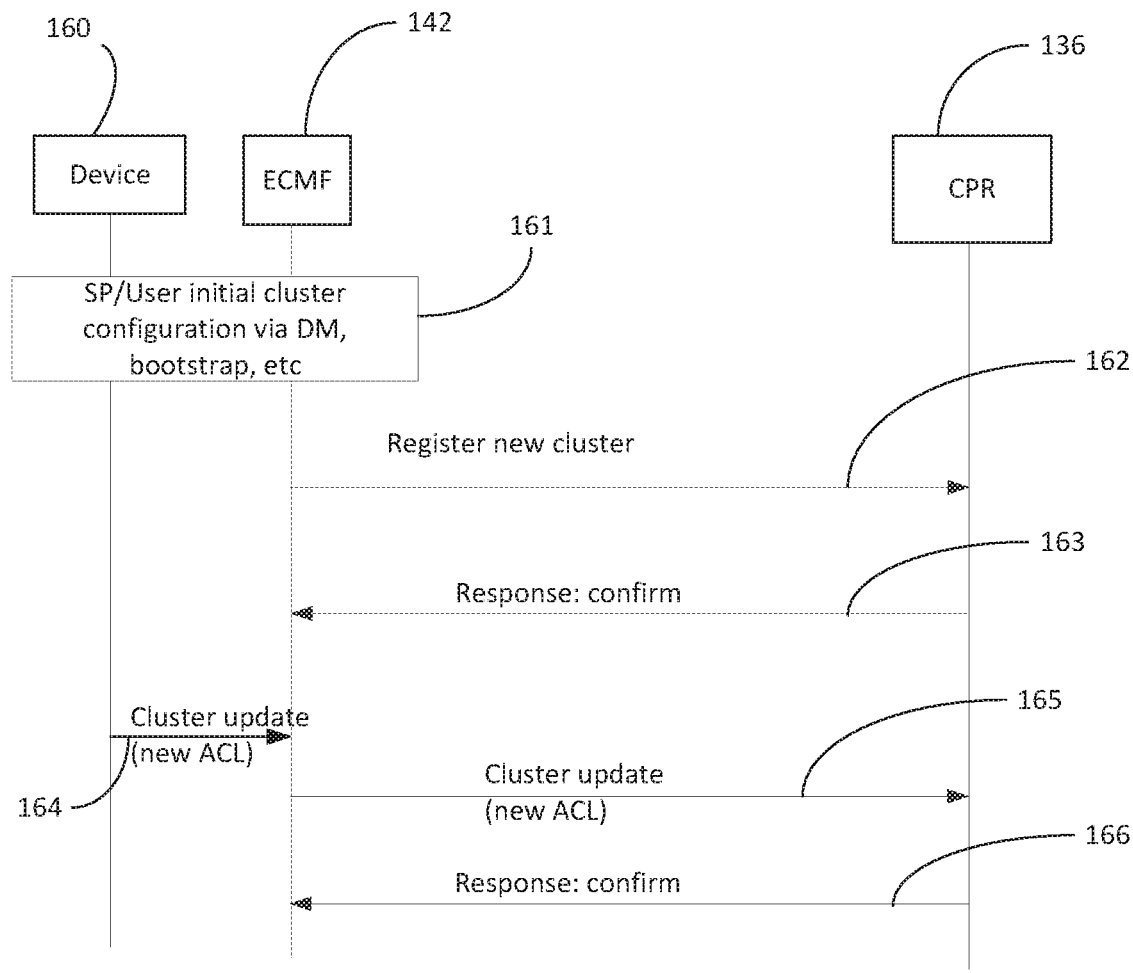
FIG. 15 illustrates an exemplary message flow for cluster profile registration.

FIG. 15 illustrates an exemplary message flow for cluster profile registration. At step 161, device 160 makes an initial communication with ECMF 142. The initial communication may be a configuration via DM or bootstrap, among other things. At step 162, ECMF 142 sends a message to CPR 136 for registration. The message of step 162 may include information of Table 10. The profile registration message (step 162) may come from ECMF 142, but not all these parameters may be provided or known by ECMF. It depends on the configuration setup, which may be done by an SP. For example, more or less parameters may be provided during a first time registration. At step 163, ECMF 142 receives a response confirming registration based on information (e.g., one or parameters of Table 4 through Table 10) from the message of step 162. At step 164, ECMF 142 receives a message for updating the cluster. The update may be a parameter from any of the categories (e.g., description, topology, etc.) discussed herein. In an example, at step 164, a new ACL is received by ECMF 142. At step 165, ECMF 142 may send the cluster update instructions of step 164 (which may include the new ACL) to CPR 136. At step 166, ECMF 142 may receive a message from CPR 136, the message may include a confirmation of receiving the information or implementing the instructions of step 165. With reference to FIG. 15 and FIG. 12, ECMF 142 may communicate with BS 134 and register with CPR 136 and the cluster profile of cluster 152, which includes ECMF 142, is built and stored. FIG. 15 also illustrates interactions introducing profile updates after the initial registration (e.g., providing an access control list (ACL) at step 164) that had not been included in the initial registration of the cluster.

TABLE 10

Example Profile Registration Message

| Item | Description |
| --- | --- |
| clusterID | Local or global identifier |
| clusterName | Local or global name |
| clusterOwner | Cluster Owner |
| clusterECMFid | Local or global identifier of the ECMF entity managing the cluster. In cases where there are multiple ECMF entities in the hierarchy it indicates the one managing the cluster configuration and able to perform reconfigurations. Intermediary ECMF may act as pass-through for ECMF related information. |
| clusterRegistrationCPRlist | List of CPRs with which the cluster is registered |
| clusterACL | Access Control List for access to the nodes |
| clusterComposition | Without describing the topology, a description of the current cluster composition: Number of nodes List of nodes List of base stations List of fixed attributes by node, e.g. supported clustering algorithms, range, operating power range, sleep schedule, PHY/MAC/IP/Transport/ Application protocol, memory, exception handling, interoperability, configurability, sensitivity, availability to become CH List of variable attributes, unless contained in the metrics: battery level, mobility List of services |
| clusteringPolicyList | List of policy parameters governing the clustering algorithm selection such as optimization goal, energy efficiency, service optimization, |
| availableOptimizationGoals | List of allowed optimization goals to be considered in clustering algorithm selection |
| clusterMaxNofMembers | Maximum number of nodes in the cluster |
| clusterTopologyChoices | List of topologies allowed or parameters limiting topology choices |
| clusterAlgorithmChoices | List of algorithms allowed or parameters limiting algorithm choices |
| clusterProfileAccessControlList | Access control information for the clustering information |
| assesmentTriggerThresholds | Thresholds to be used in ending a Setup phase and triggering an Assessment phase, e.g. timer or when all notification set-up is completed. This list may indicate different conditions under which the different thresholds may be applied, e.g. after a reconfiguration the timer is applied, weather at initial set up the notification criteria applies. |
| evaluationPolicies | List of trigger types allowed to start a new Evaluation Phase, in addition to any periodic configurations, e.g. policy updates, optimization thresholds, etc. |
| periodicEvaluationParams | Parameters defining a periodic Evaluation schedule, if any. |
| evaluationTriggerThresholds | Thresholds to be used in triggering an Evaluation phase, such as thresholds or conditions for each optimization attribute, e.g. energy consumption rate, number of nodes with minimal residual energy, etc. |
| reconfigurationTriggerThreshold | Thresholds to be used in triggering a Reconfiguration phase, e.g. minimal evaluated energy gain |
| requiredCharact | List of required characteristics to be considered in all algorithm choices e.g. BS mobility, Node residual energy, threshold A, metric rankings |
| allowedManagementType | List of allowed management operations for the cluster, e.g. SL level topology reconfiguration. |
| availablbeReconfigOptions | List of methods for node reconfiguration available for cluster management, e.g. re-programming, signalling options, etc. This list may include weights to be considered in the choice of each re-configuration type. |

TABLE 10-continued

Example Profile Registration Message

| Item | Description |
| --- | --- |
| interClusterECMFidList | List if ECMF modules with intercluster functionality allowed to propose inter-cluster optimizations for this cluster. |
| currentOptimizationGoal | Current choice from several specified optimization goals such as: Energy Efficiency, Network Lifetime, etc . . . |
| currentClusteringAlgorithm | Type of clustering algorithm currently employed, along with a list of relevant configurable thresholds and their current values |
| clusterNofMembers | Number of nodes in the cluster |
| subClusterList | List of nodes included in each subcluster |
| parentClusterID | ID of the cluster with which a CH communicates, if it doesn't send the information directly to BS |
| clusterTopology | List of nodes in the cluster including topology information such as levels |
| routingMetricList | List of metrics used by the routing protocol in creating the routing table, includes: name type, values |
| additionalMetricList | List of metrics available from the SL that may augment the routing metrics These may include but not limited to: bandwidth, interference levels, signal strength, etc. |
| candidateAlgorithmList | List of algorithm candidates identified |
| algorithmRankingList | List of algorithms being currently evaluated, the metrics considered and the rankings. |

Figure 16:
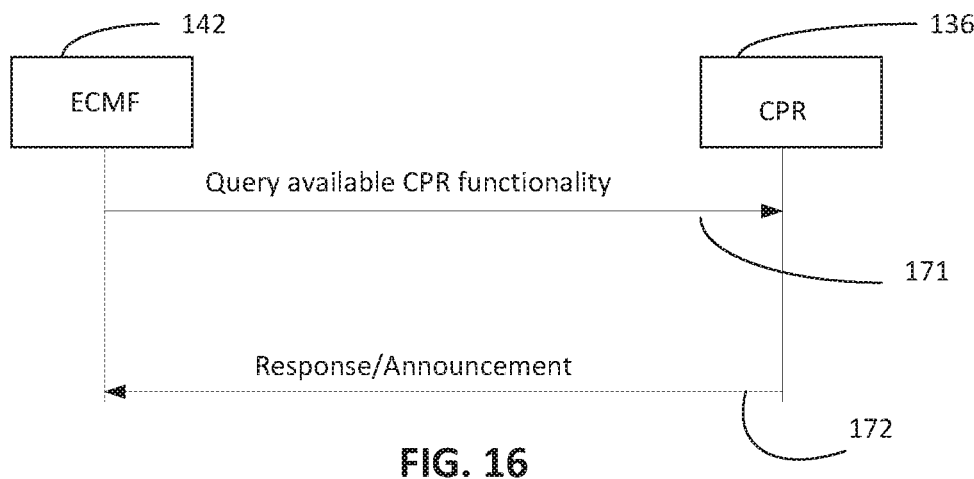
FIG. 16 illustrates an exemplary message flow for querying a CPR.

FIG. 16 illustrates an exemplary message flow for querying a CPR. At step 171, ECMF 142 may send a query for available CPR functionality. At step 172, ECMF 142 may receive a response from CPR 136. As shown, CPR 136 may provide a list of the available parameters and functional capabilities as a response to step 171, which may enable a wide variety of implementations and registry functionality. For example, external requests, such as at step 171, may be used whenever CPR 136 is discovered and may be done before queries of profile parameters are performed. All the parameters included in a cluster profile may be included, as well as associated functionality. For example, the response at step 172 from CPR 136 may indicate if CPR 136 has location storage per node capabilities, or if it provides direct interfaces to analytics databases. In an example, a SL may be provided with the message of step 172 as an announcement, which is not necessarily in response to a query. Resource announcement can facilitate resource discovery and it is a process initiated (in this case) by CPR 136. The message at step 172 may be a response to step 171, but may be periodically broadcast by CPR 136, or provided in other ways. Below is a brief discussion about parameters and functional capabilities. In this case of FIG. 16, the SL wants to know what capabilities are available at the CPR. It is true that since there is a database most of this is shown in the parameters supported in the database (not only to register). For example, the parameters show if this CPR holds information about policies or only about metrics. But functional capabilities may be more than parameters, because some CPR might not have a field/parameter for location, but it has the ability to go to a location server to ask for it if needed although it is not stored locally.

Figure 17:
FIG. 17 illustrates an exemplary message flow for a query of information from a CPR.

FIG. 17 illustrates an exemplary message flow for a query of information from a CPR. Queries for information associated with a particular cluster (e.g., cluster 153) may be used by ECMF 142 or may be done by other SL entities. At step 174, ECMF 142 may request to retrieve particular cluster information from CPR 136. For example, cluster information may include location and type of services. At step 175, ECMF 142 may receive a response indicative of being from CPR 136. The response may include the requested information. The method of FIG. 17 allows for servicing requests of adding, modifying, or deleting information associated with a cluster.

Figure 18:
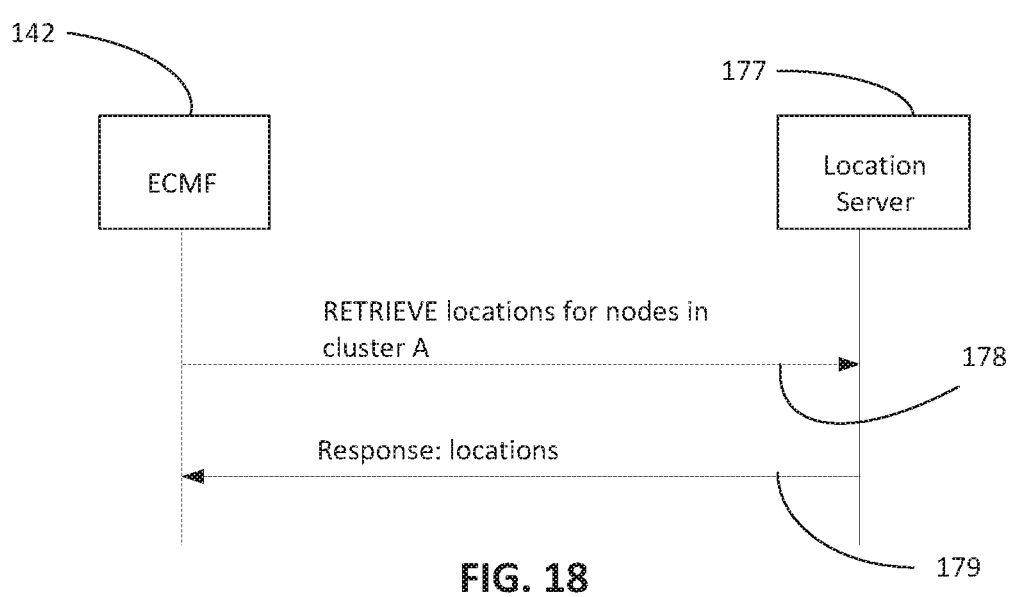
FIG. 18 illustrates an exemplary message flow for interactions with an ES.

FIG. 18 illustrates an exemplary message flow for interactions with an ES. At step 178, ECMF 142 sends a request to location server 177 (e.g., an enabling service). The request of step 178 may be to retrieve a location for a node in a cluster (e.g., node 150 in cluster 153). At step 179, ECMF 142 may receive a response indicative of being from location server 177. The response of step 179 may include location (e.g. geographical location of the CH based on GPS) as requested at step 178. FIG. 18 is an example of ECMF 142 using functionality supported by SL implementations (e.g., subscriptions, notifications, queries, etc.) to provide enhanced services. ECMF 142 may be configured to provide notifications or respond to queries from other SL entities.

With reference to FIG. 11 and FIG. 12 and accompanying discussions, in order to provide optimizations after time T2, ECMF 142 may obtain atmospheric pressure monitored by sensors in each zone (e.g., zone 140 and zone 146), within a geographical area. The available ESs may be specified in the parameters associated with cluster enrichment (e.g., Table 7), as detailed herein, and an example of a procedure addressing this is given with reference to FIG. 21. Within the larger procedure, the interaction with the ES (location server 177 in this example) is represented in the FIG. 18.

Figure 19:
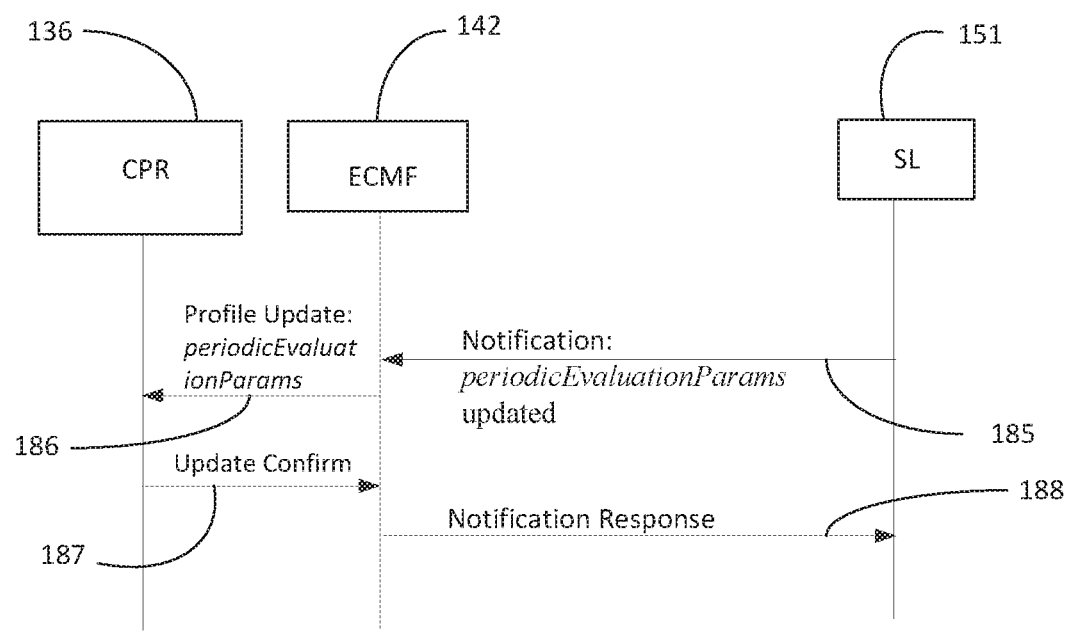
FIG. 19 illustrates exemplary ECMF interactions with SL showing associated CPR interactions.

FIG. 19 illustrates exemplary ECMF interactions with SL showing associated CPR interactions. It should be understood that FIG. 19 and accompanying discussion abstracts the role of the CPR in interactions with other SL entities. It would not be uncommon that when ECMF 142 provides the interface to a SL entity (e.g., ES) or devices of users via an API, associated CPR interactions may ensue and the retrieval of location information is followed by an update of the associated profile (e.g., all or some of the cluster profile).

With continued reference to FIG. 19, at step 185, ECMF 142 may receive a notification from SL entity 151. The notification of step 185 may include periodicEvaluationParams as discussed in Table 10. At step 186, ECMF 142 provides a message to update CPR 136. The message of step 186 may include the periodicEvaluationParams received at step 185. CPR 136 may then update its profile for use later. At step 187, a confirmation of the update is sent to ECMF 142. At step 188, a response confirms the update of CPR 136.

With continued reference to FIG. 19, for ease of representation some interactions with CPR 136 are not represented and ECMF 142 may be shown as the sole consumer or provider of information. It should be understood that ECMFs, CPRs, and SL entities, among others may be involved in interactions although not shown in figures. FIG. 19 in view of other FIG.'s and accompanying discussions conveys that operations such as the cluster update in FIG. 15 (e.g., step 165) or the Retrieve in FIG. 17 (e.g., step 174 for queries) might really be the result of another operation from a different SL entity.

Interactions with a device of a user may be provided through specialized APIs in the SL and may result in partial or full updates of a profile of a cluster, or in triggering cluster reconfigurations as detailed herein. It is assumed that multi-user access may be arbitrated within the SL. The cluster profile update may be made available by ECMF 142 to a device of a user (e.g., M2M device 30 of FIG. 29C) through APIs. Also updates of cluster profile may be the same or extensions of CPR methods described herein (e.g., FIG. 15-FIG. 19) for profile registrations, updates and queries, and for CPR functionality query. Methods for updating cluster profiles may trigger internal ECMF 142 processing and may also be forwarded to CPR 136. ECMF 142 may reconfigure each individual node in cluster 152 (e.g., a managed cluster). The methods used to reconfigure each node may be specified by a device of a user with consideration of the parameters in the policy category, as discussed herein (e.g., Table 6).

In summary, one or more ECMFs may help manage a cluster (e.g., zone 140) or sub-cluster (cluster 152 of zone 140) with use of conventional clustering algorithms in the lower layers. In an example, ECMF 142 may use the cluster profile available at CPR 136, interactions with other SL entities (e.g., SL 151), as well as any information available at CH 141 and derived from a conventional clustering algorithm used.

Figure 20:
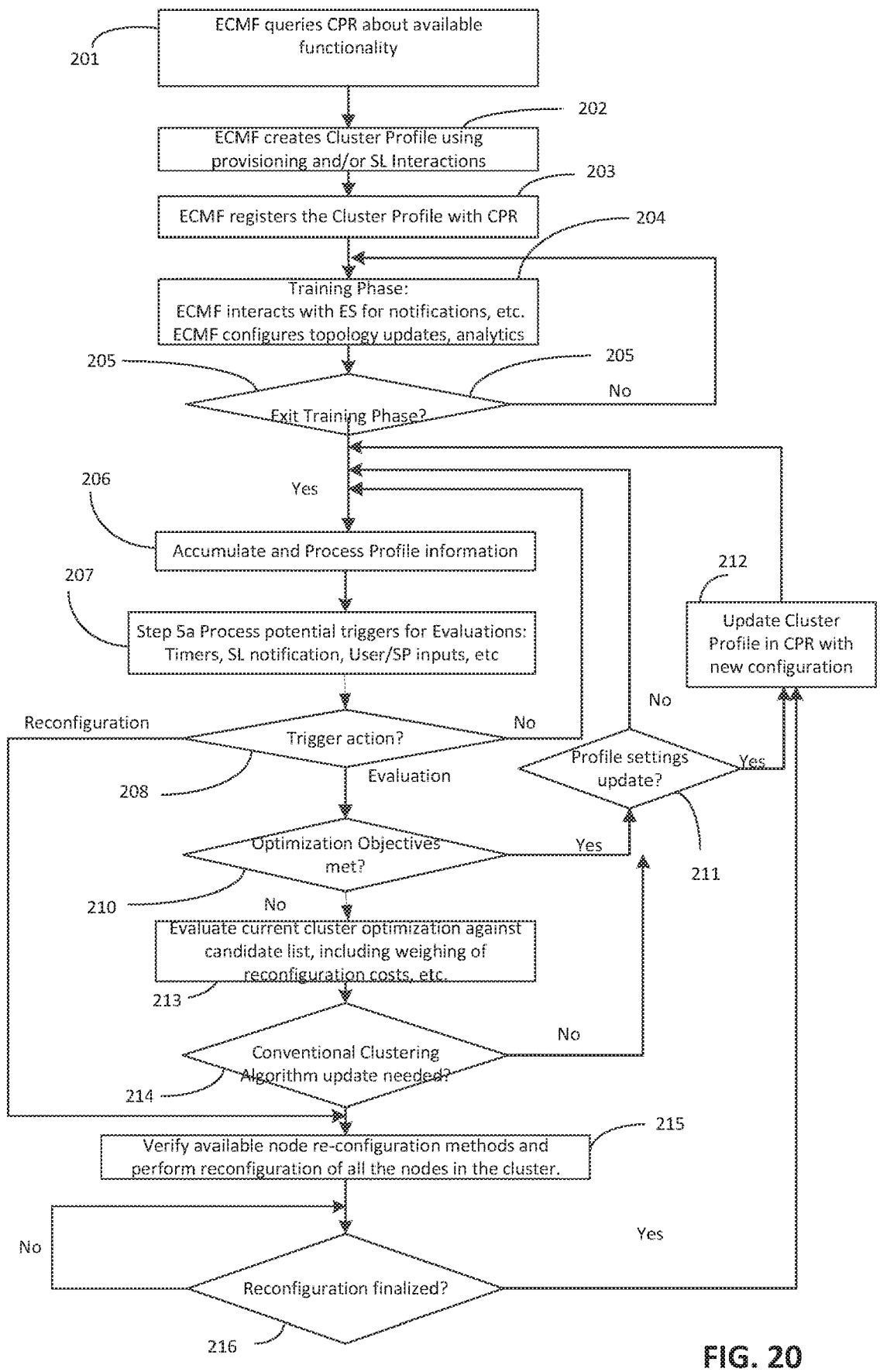
FIG. 20 illustrates an exemplary intra-cluster management procedure.

FIG. 20 illustrates an exemplary intra-cluster management procedure with reference to the system of FIG. 11 through FIG. 13, among others. At step 201, ECMF 135 at BS 134 queries the associated CPR 136 for available functionality and parameters. For example, step 171 of FIG. 16. At step 202, ECMF 135 creates a cluster profile for its cluster (e.g., zone 140). Description, policy, and enrichment parameters may be configured via pre-provisioning or via SL interactions with a user (e.g., device 160 or M2M device 18). Creating or updating a cluster profile may include information associated with registering a new device 160 with corresponding profile parameters. For example, step 161 of FIG. 15. At step 203, the cluster profile of step 202 is registered with CPR 136 and ECMF 135 enters a setup phase. For example step 162 and step 163 of FIG. 15.

At step 204, which may be considered part of the setup phase, ECMF 135 interacts with SL entities 151 based on the enrichment profile. The enrichment profile may be considered a compilation of one or more enrichment parameters (e.g., Table 7). ECMF 135, for example, may configure location update notifications to update the related metrics profile (e.g., compilation of one or more metrics parameters—see Table 9). ECMF 135 may set up updates of some or all of a profile of a cluster (e.g., zone 140) based on locally available information such as topology. ECMF 135 may also set up custom analytics to extract additional metrics parameters from SL 151 information (e.g., measurements for critical information delivery delays based on incoming queries). Also, ECMF 135 may configure the cluster candidate algorithm list (see Table 8) and configure the collection of associated parameters as well as the analytics to be performed. For example, step 178 and step 179 of FIG. 18. At step 205, setup phase may end when specific criteria set in assesmentTriggerThresholds are met (e.g., a list of key parameters in the cluster profile of zone 140 has been configured, etc.). In an example after initial set up, as soon as ES notifications have been configured setup may be exited. Later after a reconfiguration only a timer may be set.

At step 206, an assessment phase (steps 206-207) begins. The assessment phase may be considered a relatively long lived stage of the ECMF flow during, which information is accumulated in the topology and metrics profiles, and the information is processed by ECMF 135. The long-lived stage may be considered more than mere seconds (e.g., usually longer than IP routing changes) and could be hours, days, weeks, months, or the like of information accumulation and assessment. This accumulated information is obtained throughout iterations of a conventional clustering algorithm (e.g., LEACH) and updated accordingly. SL information from SL 151 related to the cluster functioning may be updated at CPR 136 based on SL notifications from SL 151 or from periodic queries by ECMF 135. At step 207, during this time ECMF 135 may constantly process potential triggers for evaluations such as timers, SL notifications, etc.

At step 208, a policy profile may be updated by ECMF 135 based on the new operational requirements and triggers. In an example the optimization metrics and related thresholds have been updated; triggers for the Evaluation Phase may be set to occur on a regular basis, without policy updates, or based on other types of updates of CPR 136. Information from device 160 may result in other transitions, such as jumping to the setup phase (step 204), if the configuration created during the setup phase at step 204 needs to be updated, e.g. when notifications based on analytics or semantics need to be reconfigured. At step 209, input may also result in transitioning directly to the reconfiguration phase (step 215) if there is sufficient information to decide a new configuration for the cluster without the use of ECMF evaluation. In this case at the T1 update it may specify the exact conventional clustering algorithm to be used (e.g. APTEEN), etc.

At step 210, which begins an evaluation phase (step 210-214), ECMF 135 processes the available information to determine if the optimization objectives have been achieved. For example delivery delay thresholds for the critical information are compared with accumulated metrics for delivery delays triggering an alert for sub-optimal functionality using LEACH. At step 211, if the optimization objectives have been met there might be a check if any updates to the Profile are needed (e.g., if evaluation is triggered by User/SP update, calculated values might need updates as well), otherwise the assessment phase is resumed.

At step 213, if the objectives have not been met a comparison between the current clustering algorithm and candidate clustering algorithm is performed. In making the evaluation ECMF 135 may use information or logic other than those provided by the optimization metrics and tied to the conventional clustering algorithm performance in meeting the optimization objective. For example, ECMF 135 may weigh the assumed performance of a candidate replacement algorithm based on the degree of accuracy of the modeling. Another weighing may be introduced to account for the cost of re-configuration of the nodes (e.g. energy, operational downtime, etc.) depending on the reconfiguration methods available. At step 214, assuming (for example) the evaluation concluded that the cluster functioning is sub-optimal and a better configuration has been found, a reconfiguration phase is triggered. Otherwise the assessment phase is resumed after performing any necessary profile updates.

At step 215, reconfiguration phase (215-216) begins and ECMF 135 uses the available node reconfiguration methods (see availablbeReconfigOptions in the Policy profile) to update the conventional clustering algorithm used in the nodes in the cluster. At step 216, the phase concludes when the nodes in the cluster have been re-configured and the cluster is operational based on the newly selected conventional clustering algorithm. This phase may include calculated delays e.g. when ECMF 135 is aware of an upcoming DM operation (from the associated DM enabling service specified in the Enrichment profile) it may synchronize the reconfiguration/re-programming with it. At step 212, based on the reconfiguration responses, ECMF 135 updates the cluster profile at associated CPR 136 and may send SL notifications of clustering changes if so configured, and then ECMF 135 enters a new setup phase. In an example, triggering reconfiguration of the new setup phase may be based only on a timer, but other types of triggers based on assesmentTriggerThresholds may be applied. The end of the setup phase triggers a new assessment phase and the process continues from step 204.

The flow and procedural steps of FIG. 20 illustrate one use of the ECMF functionality for the use case described with regard to FIG. 12. Additional examples of functionality enabled by the Intra-cluster ECMF are discussed below. In a first example, there may be an adaptation of conventional clustering algorithm parameters (e.g., timers, thresholds) based on the given or new optimization goals. Many conventional clustering algorithms (e.g., APTEEN) rely on parameters such as timers and thresholds which are fixed within the algorithm, but depending on implementation may be re-configurable, for example a small table download for these parameters may be possible instead of firmware change. This information may be provided via the availableReconfigOptions setting and provides an alternative in the way the reconfiguration step is performed.

In a second example, ways to introduce new or separate clustering optimization goals may be provided for the conventional clustering algorithms, using clustering policies and metrics. Discussed previously was a change in optimization goal (availableOptimizationGoals) from simple energy consumption minimization to include delivery delay thresholds for the critical information to modify the clustering algorithm from LEACH to APTEEN. ECMF functionality uses at the same time the clusteringPolicyList to consider the clustering optimization goal within the larger context of the service layer. Consider an example where the clusteringPolicyList specifies that service optimization is a higher goal than clustering optimization (e.g., weighted higher), and the new conventional clustering algorithm leads in time to lower service ratings (e.g., from users) although based on the metrics the currentOptimizationGoal is met or exceeded. ECMF 135 may use this policy to perform a cluster reconfiguration otherwise unavailable to the conventional clustering algorithm. It should be understood that service optimization may be different from clustering optimization is that most clustering algorithms (which work at layers lower than SL) cannot measure them. Another example of service optimization goal may be to reduce redundancy of readings, which is decided based on approximate location and measurements tracking each other for a certain amount of time. This may be evaluated only at the service layer because the sensors do not have GPS in this case, location is based only on the CH or BS location (they have more energy and may support GPS). The clustering goal of network lifetime may be met at all times, and yet there may be redundant measurements that may be detected only at SL and the clustering may be improved based on that.

In a third example, there may be a triggering of cluster reconfigurations which may include new cluster formation. In addition, the use of predictive analysis (e.g., anticipated battery life over a time period) may be used to eliminate several rounds on inter-node communication. It was previously discussed that the trigger ending the assessment phase may essentially skip the evaluation phase and lead directly to the reconfiguration phase. This feature may be used when the new configuration has already been evaluated or when it is desirable to trigger new cluster formation. Essentially conventional clustering algorithms (e.g., Heinzelman) have a set-up phase of organization preceding the steady state-phase, where the set-up phase requires communication overhead for organization. In some cases tools and information available via SL (e.g., likely interference in the area, non-cluster node mobility, more efficient energy consumption models, etc.) may allow ECMF 135 to make better estimates of the most optimized steady-state topology which may shorten the re-organization phase.

In a fourth example, there may be a triggering of conventional algorithm changes (using reconfiguration or parameter changes) on a regular basis without redoing the full analysis. Sensor use tends to be in many cases changing but periodic, not only in the way the information is used, but also in the way the sensors and clusters may be positioned and communicate and patterns may form: day/night, weekly, when hot/cold, on holidays, etc. ECMF 135 may be able to use these patterns in its logic and cause periodic conventional clustering algorithm changes without a full analysis being required each time (e.g., without the computational overhead or without full data sets being required locally at the BS 134 and CH 141).

Figure 21:
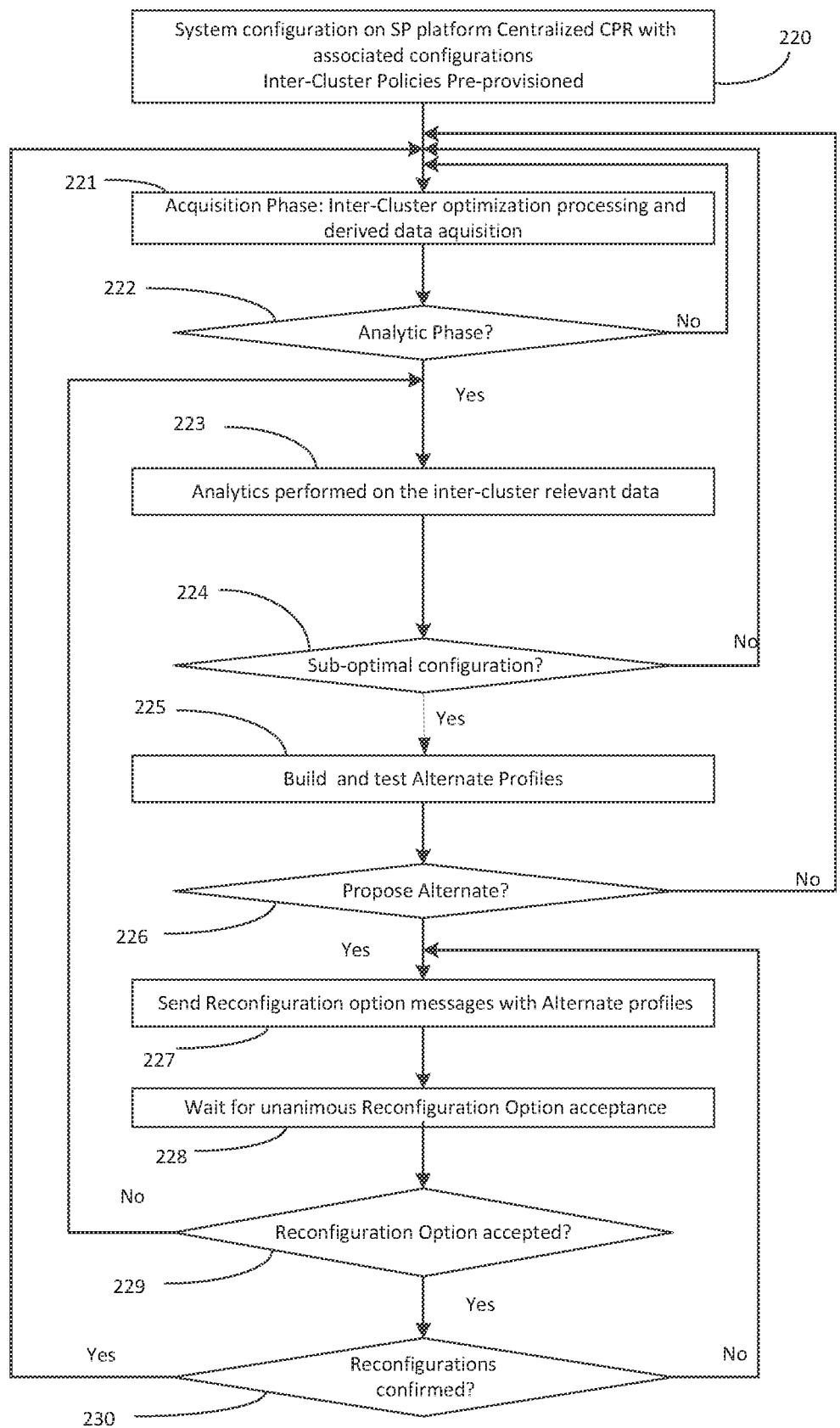
FIG. 21 illustrates an exemplary inter-cluster management procedure.

FIG. 21 illustrates an exemplary inter-cluster management procedure with reference to the systems of FIG. 11 through FIG. 13, among others. The functionality provided by the conventional clustering algorithms may be optimized jointly when multiple clusters are managed by an ECMF. To enable inter-cluster management, ECMF functionality may be implemented in a BS acting as a sink for multiple clusters or in a SL entity being accessed by multiple BS (such as IN 131), with an available CPR 133 for multiple clusters.

ECMF 132 has the ability use the local, cluster-related information with information available elsewhere in the service layer, such as that provided by the enabling services. In an example, CPR 133 provides links to location and semantic servers which are used in determining the information redundancy between sensors.

With reference to FIG. 21, the following method is an example of the inter-cluster management functionality of ECMF 132. At step 220, there are pre-conditions that may be assumed after integration in the common SP network platform. Centralized CPR 133 at IN 131 may contain full cluster profiles for all the clusters managed. The associated ES may be configured such that semantic and location information is updated in CPR 133 based on queries and notifications. ECMF 132 is pre-provisioned with inter-cluster optimization policies and analytics are provided locally or through external services. CPR 133 may include CPRs for BS 134 and 137, in other words there may be no CPR 136 and CPR 139 as shown in FIG. 12. Initial clusters may be registered by ECMF 135 and ECMF 138 via messaging as shown in FIG. 15 (e.g., step 162 and step 163).

At step 221, there is an acquisition phase. This may be a long lived stage in which cluster-related information is processed by the inter-cluster optimization ECMF 132 functionality and derived data is accumulated. During this time ECMF 132 may constantly process potential triggers for evaluations such as timers, SL notifications, etc.

At step 222, there may be a timer-based optimization trigger. At step 223 there may be an analytic phase. Here, ECMF 132 processes the available information against the inter-cluster optimization policies. In this case it processes the list of measurements provided by the platform, enriched with some semantic and location information. This may be done by the messaging of FIG. 19, such as message of step 185, timers, etc. This phase may include additional inputs solicited from the BS ECMFs via queries.

At step 224, there may be an evaluation of configuration. Here, ECMF 132 considers the configuration sub-optimal based on an inter-cluster optimization policy that considers redundant sensors providing the same measurement type, within a specified distance of each other and within a specified accuracy of each other. Depending on available information the analytics may further verify this conclusion by observing that the measurements track each other historically.

At step 225, during this evaluation of configuration, alternate profiles may be built in CPR 133 by ECMF 132 using modified configurations to de-facto model and analyze the test configuration for some time before actually proposing it. The alternate profiles may be modified during tests, for example to analyze if better outcomes are achieved by using a sensor only as backup with very long duty cycle, versus alternating the readings. Other information, such as sensor energy consumption, service user ratings, or sensor accuracy may be considered.

At step 226, if no reconfiguration option is found, the analytic phase may be stopped after a time and the acquisition phase resumed, otherwise proceed to sending a reconfiguration option. At step 227, there may be a service-based reconfiguration option. Cluster Reconfiguration Option messages are sent to ECMF of all clusters affected, e.g., ECMF 132 to ECMF 135 and ECMF 138. These messages include the alternate cluster profiles proposed and may indicate the type of inter-cluster optimization policy involved using the Cluster Reconfiguration Option Method discussed herein (e.g., associated discussion with Table 11-12 below). ECMF 132 waits for acceptance of the reconfiguration option from ECMFs 135 and 138. If there is no acceptance from all BS ECMFs involved the reconfiguration may be discarded.

At step 228, assuming the cluster reconfiguration option has been accepted at step 227, a cluster reconfiguration indication message is sent containing coordination information for the reconfiguration to take place (e.g., time period for reconfiguration, etc.) and associated acknowledgement messages expected (see Cluster Reconfiguration Option Method discussed herein—e.g., associated with Table 11-12). At step 229, assuming the Cluster Reconfiguration Option has been unanimously accepted a Cluster Reconfiguration Indication message is sent (e.g., by ECMF 132 to ECMF 135 and ECMF 138) containing coordination information for the reconfiguration to take place (e.g., time period for reconfiguration, etc.) and associated acknowledgement messages are expected (see Cluster Reconfiguration Option Method discussed herein). Whether ECMF 135 and ECMF 138 are allowed to accept a reconfiguration option and perform reconfigurations on each cluster may be indicated via the clusterECMFid attribute. At step 230, when associated confirmations are received from the BS ECMFs, then CPR 133 updated with the current configuration and the reconfiguration completed, otherwise resends the Reconfiguration Option messages.

Below is additional discussion with regard to possible reconfiguration scenarios. A cluster reconfiguration option may be used by the inter-cluster function of ECMF 132 to propose configuration changes to the ECMF 135 that manages zone 140. ECMF 132 may receive corresponding response message that indicates acceptance or refusal of the configuration proposal and causes for agreement or refusal. If the refusal cause indicates, for example, only reconfigurationParameters, the inter-cluster ECMF may decide to resend the same option with changed parameters. A message associated with the aforementioned reconfiguration option may include one or more of the parameters shown in Table 11. It should be understood that the inter-cluster management function is used between different clusters, one of which is managed by the ECMF hosting the function, e.g. ECMF 132 reconfigures ECMF 135 and a cluster which ECMF 135 manages itself In this case the reconfiguration of ECMF 132 is substantially internal and there would also be messages sent from ECMF 132 to ECMF 135.

TABLE 11

Example Cluster Reconfiguration Option

| Parameter | Description |
| --- | --- |
| clusterID | Local or global identifier |
| reconfigurationID | Local ID for the reconfiguration procedure proposed |
| ECMFid | ID of the ECMF entity proposing the reconfiguration, to be checked against interClusterECMFidList before accepting reconfigurations |
| authorizationInfo | Information to be used to authorize the procedure along with ACL |
| alternateClusterProfileProposed | Pointer to the alternate cluster profile proposed. Profile IDs may be used, pointers or IDs may be identifying full or partial profiles. |
| reconfigurationCause | Reconfiguration cause (e.g., suboptimal clustering, profile reconfiguration by User/SP, etc.) may be used by the receiver to accept or deny the reconfiguration option proposed. |
| reconfigurationParameters | Parameters proposed for reconfiguration, e.g. procedure start time. These parameters may be sent only later with the Indication message. However, if they are sent here they may be used to accept or refuse the provided option. |
| reconfigECMFidList | Optional list indicating other ECMFs affected by the inter-cluster reconfiguration. |

Subsequent to receiving agreement from ECMF 135, a message may be sent by ECMF 132 to trigger configuration changes in ECMF 135 for managing zone 140. A message associated with the aforementioned trigger may include one or more of the parameters shown in Table 12. A corresponding response message received by ECMF 132 may indicate when the cluster reconfiguration has been completed by ECMF 135. The response message may be used to transition the inter-cluster function to a different state.

TABLE 12

Example Cluster Reconfiguration Indication

| Item | Description |
| --- | --- |
| clusterID | Local or global identifier |
| reconfigurationID | Local ID for the reconfiguration procedure proposed may be mapped with a preceding Reconfiguration Option message. |
| ECMFid | ID of the ECMF entity proposing the reconfiguration, to be checked against interClusterECMFidList before accepting reconfigurations |
| authorizationInfo | Information to be used to authorize the procedure along with ACL |
| alternateClusterProfileProposed | Pointer to the alternate cluster profile proposed. Profile IDs may be used, pointers or IDs may be identifying full or partial profiles. May be skipped if provided in the Reconfiguration |

TABLE 12-continued

Example Cluster Reconfiguration Indication

| Item | Description |
| --- | --- |
| | Option, or provided again for confirmation. |
| reconfigurationCause | Reconfiguration cause (e.g., suboptimal clustering, indication of profile reconfiguration, etc.) may be used by the receiver to accept or deny the reconfiguration option proposed. May be skipped if provided in the Reconfiguration Option, or provided again for confirmation. |
| reconfigurationParameters | Parameters to be applied at reconfiguration, e.g. procedure start time, authorization info to be used by the reconfiguration processes at the node level. May be skipped if provided in the Reconfiguration Option, or provided again for confirmation. |

The procedural steps associated with FIG. 21 illustrate only exemplary use of the inter-cluster ECMF functionality for the use case described herein in relation to FIG. 12. The inter-cluster functionality of ECMF 132 (or other ECMFs) may be used also to optimize procedures for cluster transfer between base stations. Algorithms for rotating the BSs for load sharing purposes have been proposed and may be enhanced by the inter-cluster ECMF by using SL-specific information. See Zhang, F. Ingelrest, G. Barrenetxea, P. Thiran and M, Vetterli, "The Beauty of the Commons: Optimal Load Sharing by Base Station Hopping in Wireless Sensor Networks", CoRR, 2014 (hereinafter Zhang), which is incorporated by reference in its entirety. The cluster reconfiguration messages and cluster profiles disclosed above may be used in a BS-hopping procedure to provide each BS (e.g., BS 134 and BS 136) with full profile information for clusters as soon as a new BS is chosen for a cluster. For example, BS 137 may be chosen for zone 140 instead of or in addition to zone 146, while BS 134 goes offline.

The interactions discussed herein with regard to cluster management may be used together with functionality supported by conventional SL implementation (e.g., subscriptions, notifications, queries, etc.) to provide additional capabilities. The clustering management functionality discussed herein (e.g., FIG. 11 through FIG. 27) may be made available to APIs using the same or extensions of the CPR and ECMF methods introduced herein. These APIs may in turn enable applications on the infrastructure domain and provide user interactions via display (e.g., graphical user interface) or other input devices (e.g., display 42 of FIG. 29C). FIG. 27 illustrates an exemplary display that may be generated based on the methods and systems discussed herein. Display interface 155 (e.g., touch screen display) may provide text in block 156 associated with clustering management, such as the parameters of Table 4 through Table 12. In another example, progress of any of the steps (e.g., sent messages or success of steps) discussed herein may be displayed in block 156. In addition, graphical output 157 may be displayed on display interface 155. Graphical output 157 may be the topology of the devices in a cluster, a graphical output of the progress of any method or systems discussed herein, or the like.

Figure 28:
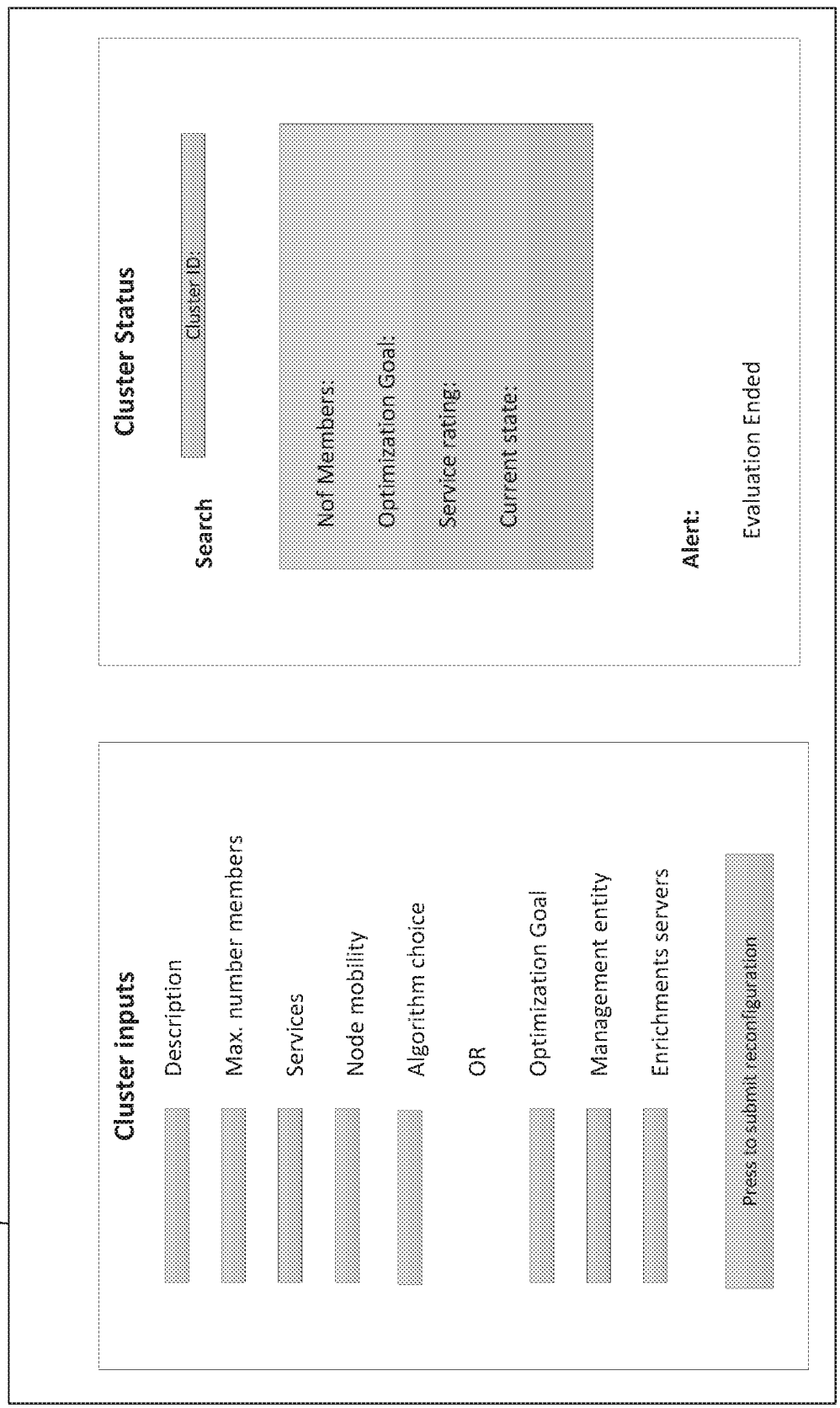
FIG. 28 illustrates an exemplary display that may be generated based on the methods and systems discussed herein.

Additional examples are provided below with regard to receiving and displaying information associated with clustering management. Display interface 155 may display a prompt to introduce cluster profile parameters corresponding to a specific cluster. In an example, parameters included in the description, policy, and enrichment profiles may be configured via display interface 155 or another input device. Also parameters in the topology or metrics profiles, e.g. clusterNofMembers, currentOptimizatinGoal, or serviceRating, may be provided via display interface 155 or another input device. The profile registration or update methods may be displayed via display interface 155 or may be used to update the CPR based on the inputs provided. The current information available for a given cluster (e.g., regular snapshots of a cluster profile or portions of it) may be shown via display interface 155. State information for a given cluster (e.g., optimization metrics reaching a specific threshold) may be shown via display interface 155. When used in conjunction with a dedicated SP Application for cluster management the inputs may be locally processed and the values provided in the method, which may be calculated values. Such an application may be used in examples above where the SP sets up new queries (see above with regard to queries set at time T1), based on which the application reconfigures the currentOptimizatinGoal to include maximum data delivery delay. FIG. 28 illustrates an exemplary display that may be generated based on the methods and systems discussed herein. Display interface 155 may display prompts to input or display Cluster Profile parameters corresponding to a specific cluster and providing the ability to configure or reconfigure a cluster. Display interface 155 may display prompts to input or display searches for a cluster and displaying current status parameters available in the Cluster Profile or continuously monitoring the status, e.g. algorithm state or parameters changes, alerts, etc.

A query method as discussed herein for a CPR may be used for the state information and the thresholds may be set via a dedicated SP application which triggers the query. In another example, an alert (e.g., sound or graphical) via display interface 155 about reaching specific states of the procedure (e.g., based on assesmentTriggerThresholds the assessment phase has been started or periodic updates during the evaluation phase). Interactions via display interface 155 or other input devices may result in partial or full updates of a cluster's profile, or in triggering ECMF processing as discussed herein. Generally, multi-user access may be arbitrated within applications or SL.

Several potential examples for enhancing the conventional oneM2M architecture to support the cluster management functionality defined in this disclosure are presented below.

Figure 22:
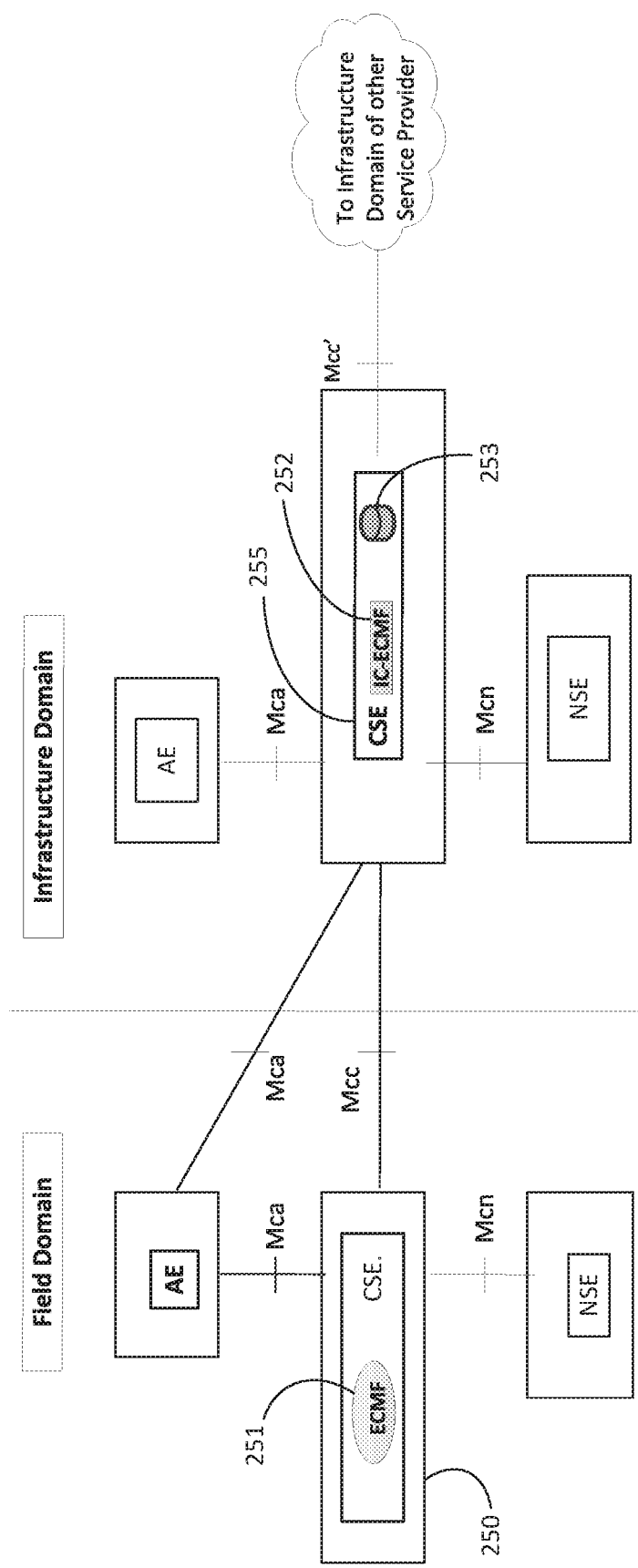
FIG. 22 illustrates exemplary positions of ECMF and CPR functions within a oneM2M functional architecture.

FIG. 22 illustrates exemplary positions of ECMF and CPR functions within a oneM2M functional architecture. IC-ECMF 252 residing on IN-CSE node 252 may provide an ECMF with inter-cluster management functionality, which is made accessible to nodes in the field domain (e.g., CSE node 250 with ECMF 251) hosting the intra-cluster management functionality. IN-CSE 255 in FIG. 22 also hosts CPR 253. In the Field Domain, CSE 250 is likely the device acting as a CH or BS and may be implemented as either MN or ASN oneM2M nodes.

Figure 23:
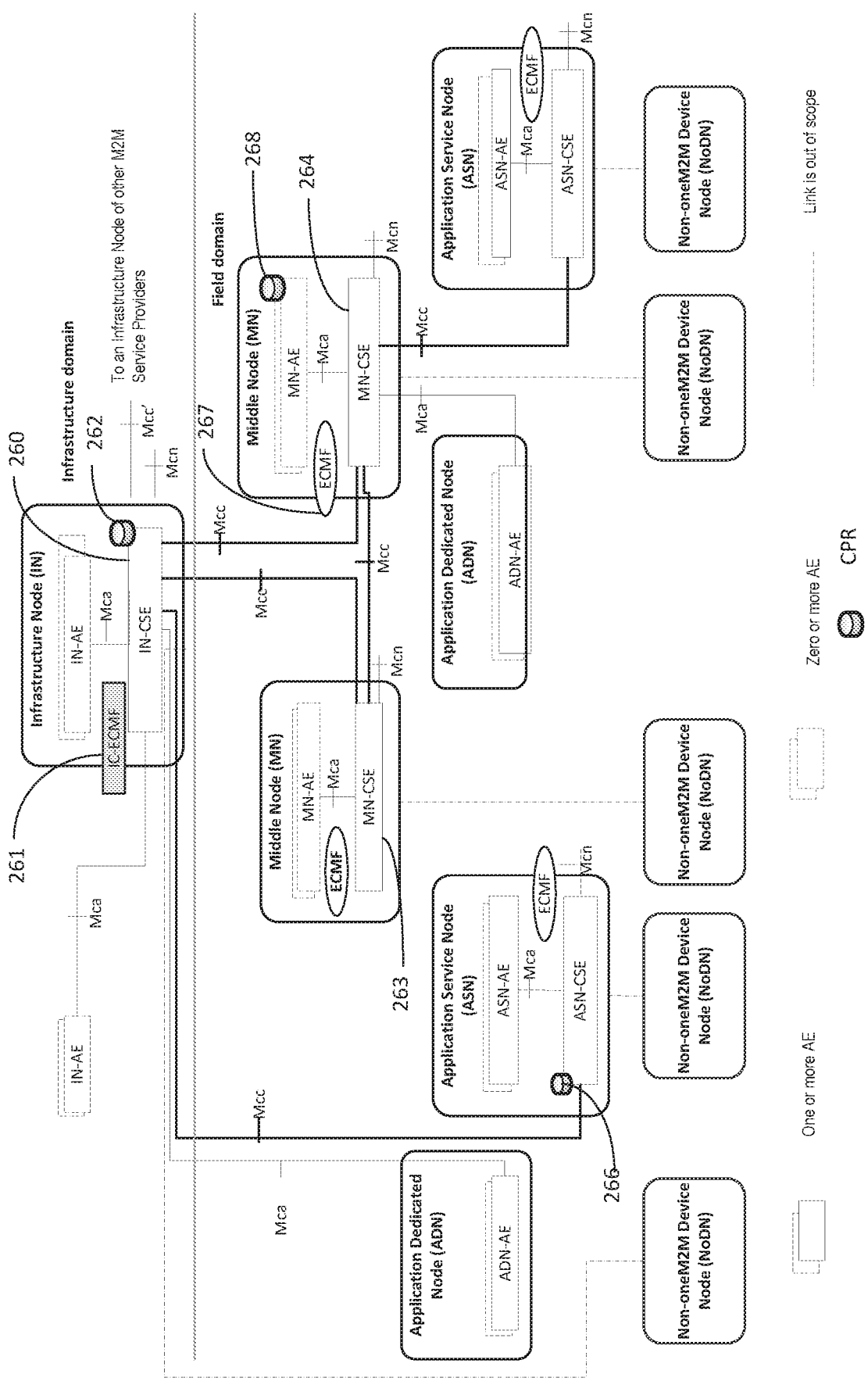
FIG. 23 illustrates exemplary positions of ECMF and CPR functions within a oneM2M functional architecture.

FIG. 23 illustrates exemplary positions of ECMF and CPR functions within a oneM2M functional architecture. The architecture of FIG. 23 may be suitable for a large deployment of environmental monitoring systems which are long lived, broadly spread, and difficult to physically access. Changes in a geographical area (e.g., earthquake) might affect clusters in a very different area which will need to be re-configured (e.g., from proactive, water level measurement systems to reactive, flood alert ones) based on very different operational requirements. The two systems might have different BS nodes implemented as MN-CSEs (e.g., MN-CSE 263 and MN-CSE 264), but a central ECMF (e.g., IC-ECMF 261) in the IN-CSE 260 may be used for broad area inter-cluster functionality. The distributed functionality may use local/partial CPRs (e.g., CPR 266) or might have continuous access to the central CPR (e.g., CPR 262). Similarly, some ECMFs (e.g., ECMF 267) may be implemented with local CPRs (e.g., CPR 268) containing the full profile of the managed cluster. There may be instances where ECMF 267 and CPR 268 are associated with the MN-AE instead of MN-CSE.

Figure 24:
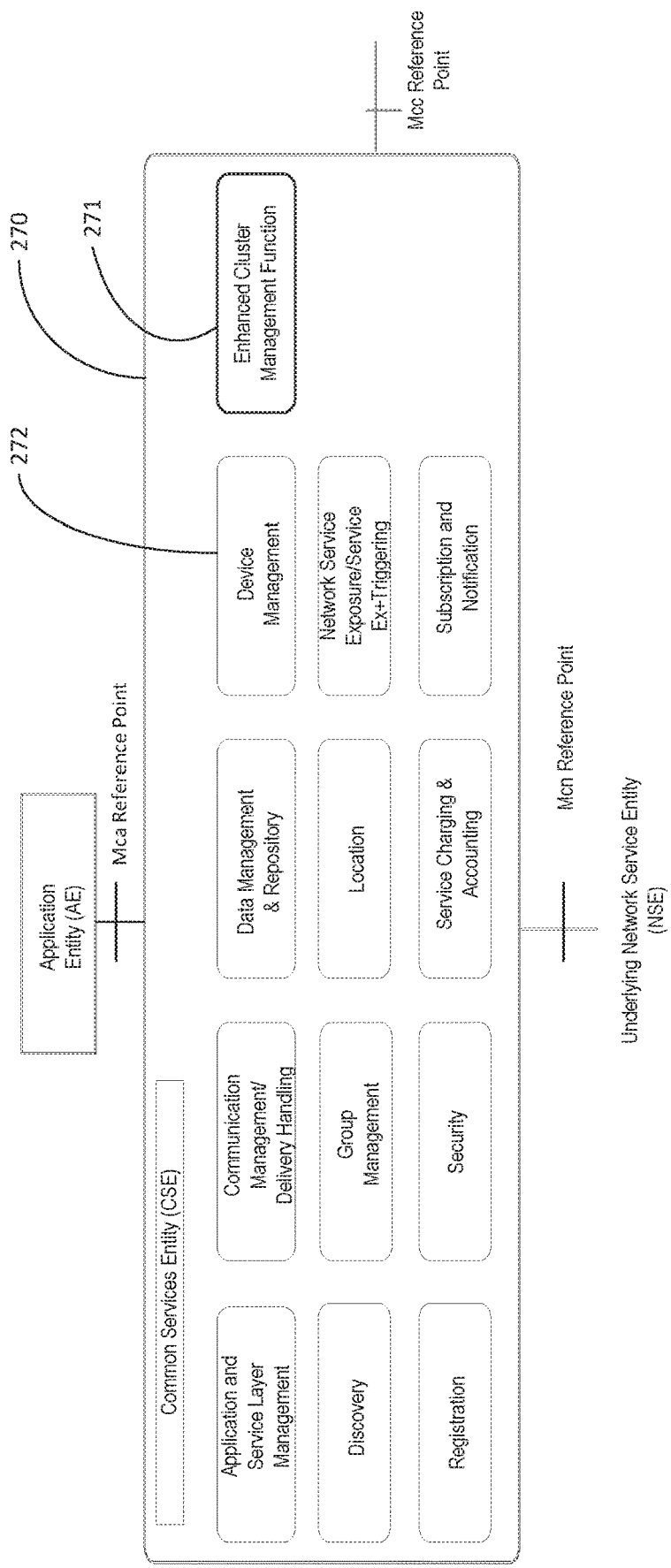
FIG. 24 illustrates one example for implementing the disclosed clustering management based on the current oneM2M RoA architecture.

FIG. 24 illustrates one example for implementing the disclosed clustering management based on the current oneM2M RoA architecture. In this case ECMF 271 may be implemented as a stand-alone common services function (CSF) within CSE 270, incorporating any local CPR. In another example (not shown), an ECMF and CPR (not shown) may be implemented within the Device Management 272 functionality of the CSE 270, or CPR functionality might be implemented in a stand-alone node.

Figure 25:
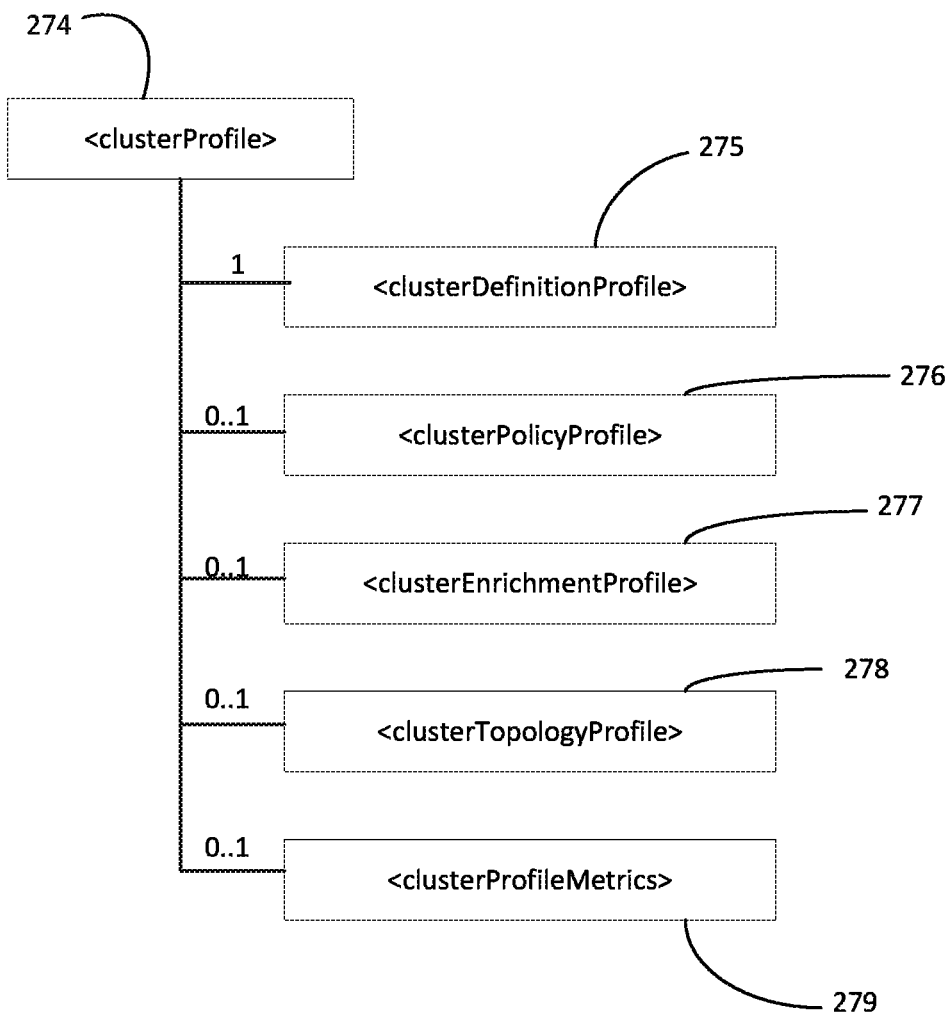
FIG. 25 illustrates resources that may be used within oneM2M RESTful in order to describe the cluster profiles.

FIG. 25 illustrates resources that may be used within oneM2M RESTful in order to describe the cluster profiles. <clusterProfile> resource 274 may be used by an ECMF (e.g., ECMF 142) to register or update a cluster or to query available cluster information, or may be used within the inter-cluster procedure for cluster reconfigurations providing alternate cluster profile configurations. <clusterProfile> resource may have as child resources individual resources representing each of the following: description profile (e.g., <clusterDefintionProfile> resource 275), policy profile (e.g., <clusterPolicypProfile> resource 276), enrichment profile (e.g., <clusterEnrichmentProfile> resource 277), topology profile (e.g., <clusterTopologyProfile> resource 278), and profile metrics (e.g., <clusterProfileMetrics> resource 279). Alternatively, the individual attributes of the exemplary five child resources may be attributes of the main <clusterProfile> resource 274. Descriptions for the attributes of the child resources are provided herein.

When any of the disclosed functions are implemented outside or independent of a CSE, the <clusterProfile> resource can be instantiated independently of the oneM2M defined CSE resource tree (e.g., as a separate resource tree on its own node in the network). In implementations within a CSE or CSF, the <clusterProfile> resource can be instantiated at various levels within the oneM2M CSE resource tree (e.g., under a <node> or under a CSE's <baseURI> or <remoteCSE> resource).

Figure 26:
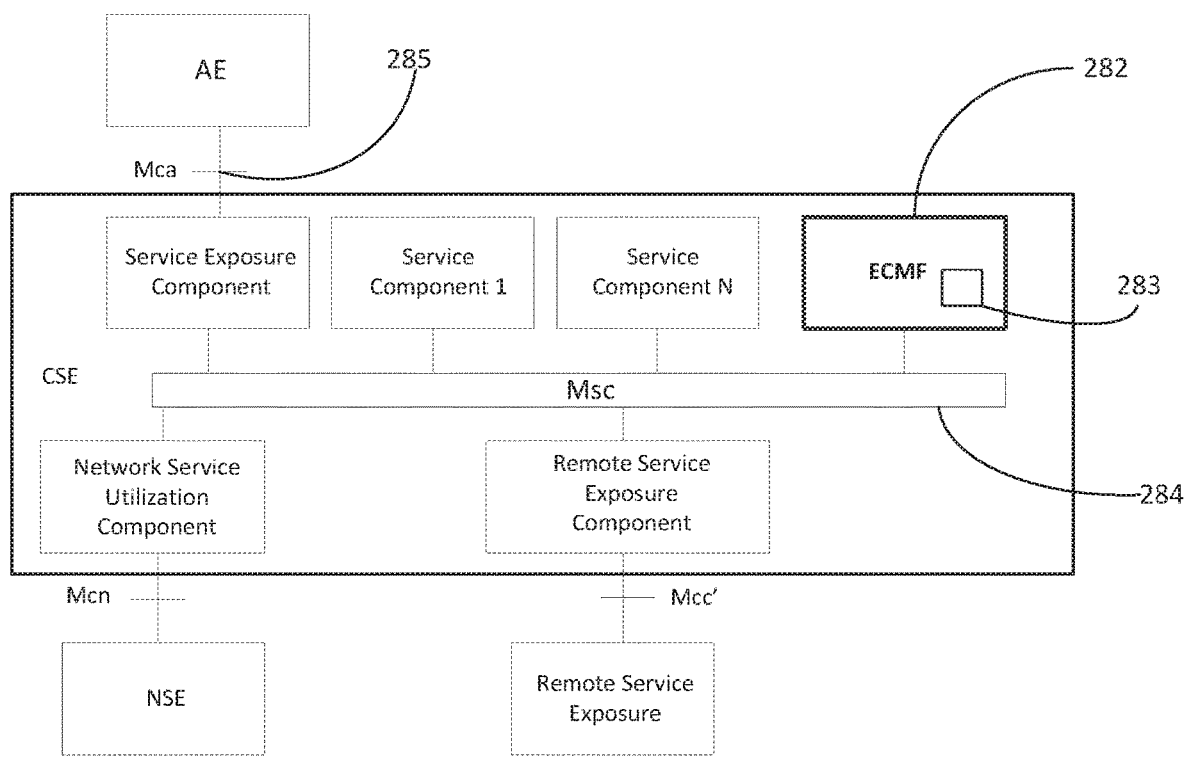
FIG. 26 illustrates an exemplary cluster management based on the current oneM2M SoA architecture.
Figure 27:
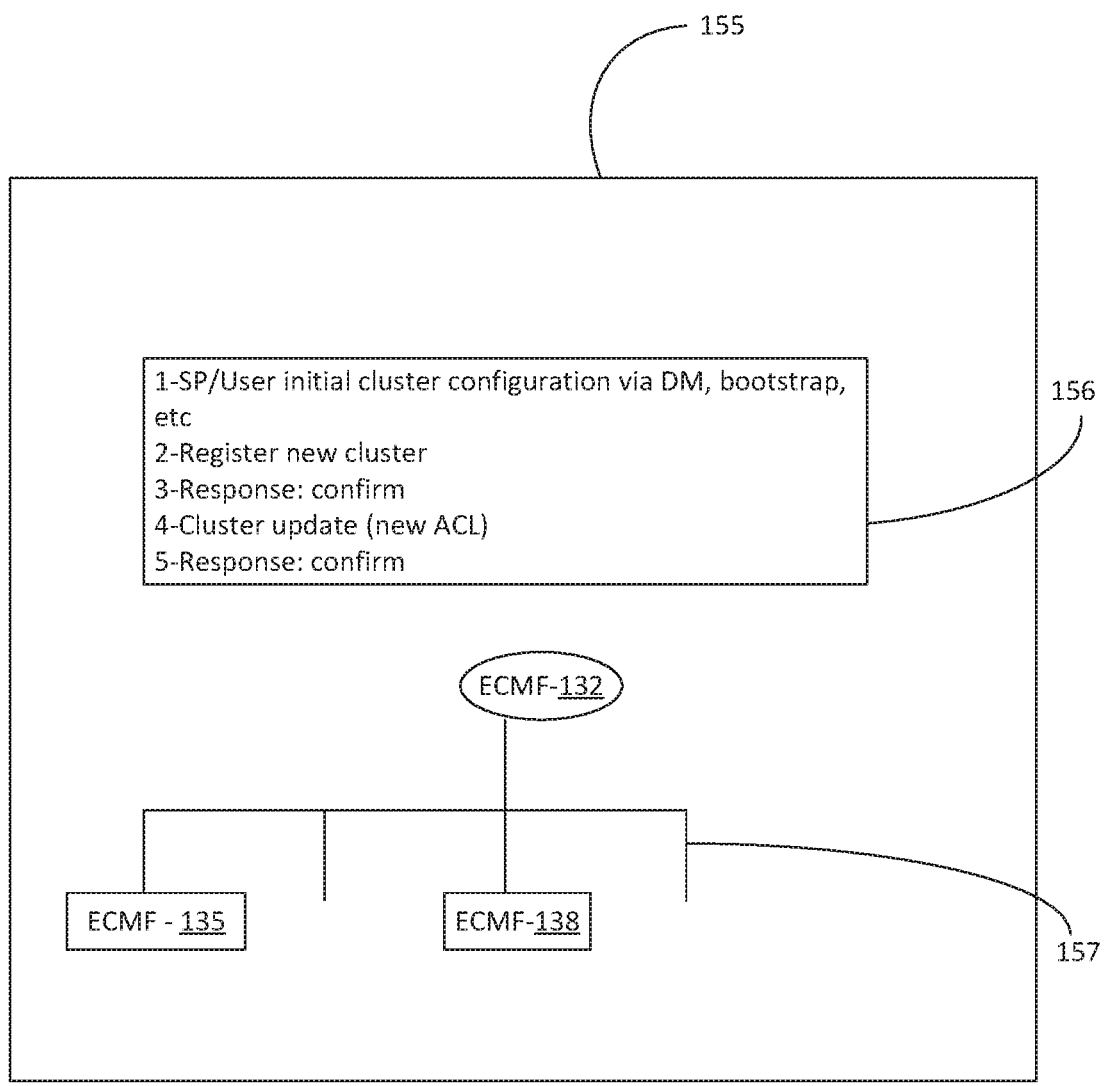
FIG. 27 illustrates an exemplary display that may be generated based on the methods and systems discussed herein.

FIG. 26 illustrates an exemplary cluster management based on the current oneM2M SoA architecture. In this case ECMF 282 may be implemented as a service component, which may contain an associated CPR 283. The logical functions of ECMF 282 defined herein are service capabilities for the ECMF 282 service. ECMF 282 service component could communicate with other services through the Msc reference point 284 and with applications via the Mca reference point 285.

The data structure and messages in this disclosure may be applied to the SOA architecture as well. The parameters described herein may be considered the service signature used to invoke each service capability. The service signature may be composed of the parameters exposed over interfaces to invoke the service.

FIG. 29A illustrates an exemplary machine-to machine (M2M), Internet of Things (IoT), or Web of Things (WoT) communication system 10 in which M2M cluster management as disclosed herein may be implemented. Generally, M2M technologies provide building blocks for the IoT/WoT, and any M2M device, M2M gateway or M2M service platform may be a component of the IoT/WoT as well as an IoT/WoT service layer, etc.

As shown in FIG. 29A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 29A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 29B, the illustrated M2M service layer 22 (e.g., SL 151 as described herein) in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 29B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using M2M clustering management, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The M2M clustering management of the present application may be implemented as part of a service layer. The service layer (e.g., SL 151) is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain the M2M clustering management of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). Further, the M2M clustering management of the present application can be implemented as part of an M2M network that uses a Service Oriented Architecture (SOA) and/or a resource-oriented architecture (ROA) to access services such as the M2M clustering management of the present application.

As discussed herein, the term "service layer" may be considered a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications or various devices with access to a collection of or a set of the above mentioned capabilities or functionalities, supported by the service layer, which can be referred to as a CSE or service capability layer (SCL). A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (e.g., functional interfaces between such functional entities) in order for them to use such capabilities or functionalities.

FIG. 29C is a system diagram of an example M2M device 30, such as an M2M terminal device 18 or an M2M gateway device 14 for example. As shown in FIG. 29C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., CH 141, CH 143, BS 137, IN 131, node 145, and others) may be an exemplary implementation that performs the disclosed systems and methods for M2M clustering management.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 29C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, the transmit/receive element 36 may be an antenna configured to transmit and/or receive RF signals. The transmit/receive element 36 may support various networks and air interfaces, such as WLAN, WPAN, cellular, and the like. In an example, the transmit/receive element 36 may be an emitter/detector configured to transmit and/or receive IR, UV, or visible light signals, for example. In yet another example, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 29C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the LMS in some of the examples described herein are successful or unsuccessful (e.g., thresholds associated with the metrics category.), or otherwise indicate a status of ECMF, CPR, and SL (e.g., ECMF 132, CPR 133, and SL 151) interactions and parameters (e.g., Table 4-Table 12, and others). The control lighting patterns, images, or colors on the display or indicators 42 may be reflective of the status of any of the method flows or components in the FIG.'s illustrated or discussed herein (e.g., FIG. 15 -FIG. 21). Disclosed herein are messages and procedures of M2M clustering management. The messages and procedures can be extended to provide interface/API for users to request M2M clustering management-related resources (e.g., parameters) via an input source (e.g., speaker/microphone 38, keypad 40, or display/touchpad 42) and request, configure, or query M2M clustering management, among other things that may be displayed on display 42.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 29D is a block diagram of an exemplary computing system 90 on which, for example, the M2M service platform 22 of FIG. 29A and FIG. 29B may be implemented. Computing system 90 (e.g., M2M terminal device 18 or M2M gateway device 14) may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for M2M clustering management, such as receiving SL, ECMF, or CPR associated messages.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 29A and FIG. 29B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

Below are explanations of terms that are discussed herein. Algorithm metric may be considered a term to denote attributes used by an algorithm to operate, such as the received power or energy level of a node. Cluster may be considered to denote a grouping of devices. Herein it may refer to the group of sensors or other devices (e.g., wireless temperature sensors) that may communicate with a designated cluster head. As discussed herein, in an example, devices of a cluster may implement an algorithm for intra-cluster communications to enable efficient delivery of sensor information. Clustering may be considered the process of forming and maintaining a cluster based, hierarchical network. The process may include CH assignment, routing, and topology management. Delivery delay as discussed herein may be considered the amount of time required to transmit a packet from source to destination. This delay may be associated with wired or wireless communication transport, processor of a device, memory, or the like.

In describing preferred methods, systems, or apparatuses of the subject matter of the present disclosure—M2M cluster management—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably.

This written description uses examples to disclose the invention, including the best mode, and also to enable any person skilled in the art to practice the invention, including making and using any devices or systems and performing any incorporated methods. The patentable scope of the invention is defined by the claims, and may include other examples (e.g., skipping steps, combining steps, or adding steps between exemplary methods disclosed herein) that occur to those skilled in the art. Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for device cluster management (e.g., M2M clustering management). A method, system, computer readable storage medium, or apparatus has means for receiving a list of parameters that enable cluster management with a cluster profile registry; creating a profile of a cluster of devices associated with the apparatus based on the parameters, the cluster of devices communicating based on a current clustering algorithm; and registering the profile of the cluster of devices with the cluster profile registry. The method, system, computer readable storage medium, or apparatus has means for determining, based on the profile, that an optimization objective has not been met; and in response to determining that the optimization objective has not been met, evaluating performance to meet the optimization objective between the current clustering algorithm and a candidate clustering algorithm. The determination may be done based on more than the profile, e.g. statistics for aforementioned and below. The method, system, computer readable storage medium, or apparatus has means for determining, based on the profile, that an optimization objective has not been met; and in response to determining that the optimization objective has not been met, evaluating performance to meet the optimization objective between the current clustering algorithm and a candidate clustering algorithm, wherein the optimization objective comprises a threshold energy consumption for the cluster of devices. The method, system, computer readable storage medium, or apparatus has means for determining, based on the profile, that an optimization objective has not been met; evaluating performance to meet the optimization objective between the current clustering algorithm and a candidate clustering algorithm; based on evaluating the performance, determining that the performance of the candidate clustering algorithm to meet the optimization objective meets or exceeds the performance of the current clustering algorithm to meet the optimization objective; and in response to determining that the performance of the candidate clustering algorithm to meet the optimization objective meets or exceeds the performance of the current clustering algorithm to meet the optimization objective, providing instructions to reconfigure the cluster of devices to the candidate clustering algorithm. The evaluation of the candidate might be going on in parallel with the main algorithm all along, even before the main one becomes sub-optimal (e.g., objective not met). The method, system, computer readable storage medium, or apparatus has means for updating the profile based on a threshold change of a parameter associated with the profile, wherein the parameter comprises communication cost. Communication cost may be cost of energy, delay, etc. The method, system, computer readable storage medium, or apparatus has means for updating the profile with a new optimization goal. The method, system, computer readable storage medium, or apparatus has means for triggering a cluster topology reconfiguration. The cluster of devices may include wireless devices. The apparatus above may be a cluster head or a base station. The method, system, computer readable storage medium, or apparatus has means for two or more device clusters evaluating performance of the clustering algorithms to meet the optimization objective; based on evaluating the performance, determining that the performance of at least one of the clustering algorithms optimization objective has not been met; and in response to determining that the performance of a clustering algorithm has not been met, providing instructions to reconfigure at least one cluster of devices. The method, system, computer readable storage medium, or apparatus has means for determining that an optimization objective has not been met; and in response to determining that an optimization objective has not been met, providing instructions to reconfigure the clustering algorithm. All combinations in this paragraph (including the removal or addition of steps) are contemplated in a manner that is consistent with the other portions of the detailed description.

What is claimed:

1. An apparatus for managing clustering, the apparatus comprising:
    a processor; and
    memory coupled with the processor, the memory comprising executable instructions that when executed by the processor cause the processor to effectuate operations comprising:
        receiving a list of parameters that enable cluster management with a cluster profile registry;
        creating a profile of a cluster of devices associated with the apparatus based on the parameters, the cluster of devices communicating based on a current clustering algorithm;
        registering the profile of the cluster of devices with the cluster profile registry;
        determining, based on the profile, that an optimization objective has not been met;
        evaluating performance to meet the optimization objective between the current clustering algorithm and multiple candidate clustering algorithms;
        based on the evaluating the performance, determining that the performance of a first candidate clustering algorithm of the multiple candidate clustering algorithms to meet the optimization objective exceeds the performance of the current clustering algorithm to meet the optimization objective; and
        in response to the determining that the performance of the first candidate clustering algorithm to meet the optimization objective exceeds the performance of the current clustering algorithm to meet the optimization objective, providing instructions to reconfigure the cluster of devices to the first candidate clustering algorithm.

2. The apparatus of claim 1, wherein the cluster of devices comprises wireless devices, the operations further comprising triggering a cluster topology reconfiguration.

3. The apparatus of claim 1, further operations comprising updating the profile based on a threshold change of a parameter associated with the profile, wherein the parameter comprises a communication cost or delivery delay.

4. The apparatus of claim 1, wherein the cluster of devices use integrated, cross-layer-based platforms for integration with other clusters and cluster types within the same service layer.

5. The apparatus of claim 1, further operations comprising updating the profile with a new optimization objective.

6. The apparatus of claim 1, wherein the apparatus is a cluster head or a base station, and the operations further comprising using predictive analysis for evaluating the performance.

7. The apparatus of claim 1, wherein the performance is based on service layer analytics.

8. A method for managing clustering, the method comprising:
    receiving, by a processor, a list of parameters that enable cluster management with a cluster profile registry;
    creating, by the processor, a profile of a cluster of devices associated with the apparatus based on the parameters, the cluster of devices communicating based on a current clustering algorithm;
    registering, by the processor, the profile of the cluster of devices with the cluster profile registry,
    determining, by the processor, based on the profile, that an optimization objective has not been met;
    evaluating, by the processor, performance to meet the optimization objective between the current clustering algorithm and multiple candidate clustering algorithms;
    based on the evaluating the performance, determining, by the processor, that the performance of a first candidate clustering algorithm of the multiple candidate clustering algorithms to meet the optimization objective exceeds the performance of the current clustering algorithm to meet the optimization objective; and
    in response to the determining that the performance of the first candidate clustering algorithm to meet the optimization objective exceeds the performance of the current clustering algorithm to meet the optimization objective, providing, by the processor, instructions to reconfigure the cluster of devices to the first candidate clustering algorithm.

9. The method of claim 8, wherein the optimization objective comprises a communication cost for the cluster of devices.

10. The method of claim 8, further comprising updating, by the processor, the profile based on a threshold change of a parameter associated with the profile, wherein the parameter comprises delivery delay.

11. The method of claim 8, further comprising, by the processor, triggering a cluster topology reconfiguration.

12. The method of claim 8, further comprising updating, by the processor, the profile with a new optimization objective.

13. The method of claim 8, wherein the performance is based on service layer analytics.

14. A method for managing two or more device clusters, the method is performed in an apparatus including a processor, the method comprising:
- evaluating, by the processor, performance of clustering algorithms within the two or more clusters of devices to meet an optimization objective;
- based on evaluating the performance of the clustering algorithms, determining, by the processor, that the performance of a first clustering algorithm of the clustering algorithms has not been met;
- in response to determining that the performance of the first clustering algorithm of the clustering algorithms has not been met, evaluating, by the processor, performance to meet the optimization objective between the first clustering algorithm and multiple candidate clustering algorithms;
- based on the evaluating the performance to meet the optimization objective between the first clustering algorithm and the multiple candidate clustering algorithm, determining, by the processor, that the performance of a first candidate clustering algorithm of the multiple candidate clustering algorithms to meet the optimization objective exceeds the performance of the first clustering algorithm to meet the optimization objective; and
- in response to the determining that the performance of the first candidate clustering algorithm to meet the optimization objective exceeds the performance of the first clustering algorithm to meet the optimization objective, providing, by the processor, instructions to reconfigure at least one cluster of devices of the two or more device clusters to the first candidate clustering algorithm.

15. The method of claim 14, wherein the two or more device clusters are connected via a base station.

* * * * *